(12) United States Patent
Fiala et al.

(10) Patent No.: US 10,122,798 B2
(45) Date of Patent: *Nov. 6, 2018

(54) SYSTEM AND PROCESS FOR MANAGING NETWORK COMMUNICATIONS

(71) Applicant: Intermec IP Corp., Everett, WA (US)

(72) Inventors: Garrick Fiala, Seminole, FL (US); Radek Kasal, Dobrichovice (CZ)

(73) Assignee: Intermec IP Corp., Everett, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/392,001

(22) Filed: Dec. 28, 2016

(65) Prior Publication Data

US 2017/0201589 A1 Jul. 13, 2017

Related U.S. Application Data

(63) Continuation of application No. 13/494,983, filed on Jun. 12, 2012, now Pat. No. 9,536,081.

(51) Int. Cl.
| | |
|---|---|
| *H04L 29/08* | (2006.01) |
| *G06F 21/53* | (2013.01) |
| *H04W 12/08* | (2009.01) |
| *H04W 12/06* | (2009.01) |
| *H04W 4/50* | (2018.01) |
| *H04L 29/06* | (2006.01) |

(52) U.S. Cl.
CPC ............ *H04L 67/141* (2013.01); *G06F 21/53* (2013.01); *H04L 63/083* (2013.01); *H04W 12/06* (2013.01); *H04W 12/08* (2013.01); *H04L 63/20* (2013.01); *H04L 67/26* (2013.01); *H04L 67/42* (2013.01); *H04W 4/50* (2018.02)

(58) Field of Classification Search
CPC .................................................... H04L 67/141
See application file for complete search history.

(56) References Cited

U.S. PATENT DOCUMENTS

| | | | |
|---|---|---|---|
| 6,859,834 B1 | 2/2005 | Arora et al. | |
| 7,089,294 B1 | 8/2006 | Baskey et al. | |
| 7,292,588 B2 | 11/2007 | Milley et al. | |
| 7,380,271 B2 | 5/2008 | Moran et al. | |
| 8,271,429 B2* | 9/2012 | Ghuneim | G06F 17/30554 707/602 |
| 8,387,155 B2* | 2/2013 | Gregg | G06F 21/335 726/29 |

(Continued)

FOREIGN PATENT DOCUMENTS

WO 2011162644 A1 12/2011

*Primary Examiner* — Kambiz Zand
*Assistant Examiner* — Thanh Le
(74) *Attorney, Agent, or Firm* — Additon, Higgins & Pendleton, P.A.

(57) ABSTRACT

A communication protocol and system is disclosed for network communications between a data service residing on a client that provides network communications between one or more mobile applications on a source and a network based on a process number. The shared data service communicates with a data service plug-in on the server side associated with the process number, in order to handle requests from the mobile applications that access the network through the data service. Predetermined network connection, priority, and additional rules can be used to control what plug-in can be reached through what type of network connection.

30 Claims, 24 Drawing Sheets

(56) References Cited

U.S. PATENT DOCUMENTS

| | | | |
|---|---|---|---|
| 8,782,103 B2 * | 7/2014 | Ahlborn | G06Q 10/0633 707/812 |
| 8,788,815 B1 | 7/2014 | Garcia et al. | |
| 9,536,081 B2 | 1/2017 | Fiala et al. | |
| 2008/0132257 A1 | 6/2008 | Fok et al. | |
| 2009/0099864 A1 | 4/2009 | Cronrath et al. | |
| 2010/0087181 A1 | 4/2010 | Chen et al. | |
| 2013/0086265 A1 | 4/2013 | Bao et al. | |
| 2013/0091537 A1 | 4/2013 | Parla et al. | |
| 2013/0103585 A1 | 4/2013 | Carapelli | |
| 2013/0332511 A1 | 12/2013 | Hala et al. | |
| 2013/0332524 A1 | 12/2013 | Fiala et al. | |

* cited by examiner

```
Plug-In Process A

Connectivity Permitted      (e.g., GSM, LAN, 802.11,...)
    Connectivity Priority
    Connectivity Availability
    Data to be Managed          (e.g., customers, price lists, stock status,...)
    System Code                 (assigned to the Plug-In)
        SC-A
        SC-B,...
        SC-N
    Process Number
    Process Version
```

FIG. 10        Plug-In - 26

```
Device Set Template

250 ── Device Set Properties              ── 252
             IP Address = 120.156.10.105,...
             —
             —
  260 ── Devices          ── 263
          ── Primary
  262 ──     Mobile Device        ── 264
             Device Properties
                GPRS Access Point Name = ATTAPN32
       259 ── Modem Name = Cellular Line
             ── Connection Name = MyEnterprise GPRS
                Password = 1234ASDF
                IP Address = 120.156.10.105   ── 265
                Properties         Shared
  266 ── Secondary
             Printer   ── 267
             Device Properties  ── 268
                Shared   ── 269
  270 ── Scan Reader
  271 ── Device Properties
                Individual   ── 272
```

FIG. 11        Template - 71

SYSTEM AND PROCESS FOR MANAGING NETWORK COMMUNICATIONS

CROSS REFERENCE TO RELATED APPLICATIONS

This application is related application Ser. No. 13/494,969 entitled "Data Service on Mobile Device" filed contemporaneously herewith on Jun. 12, 2012, and application Ser. No. 13/494,978 entitled "Communication Protocol and System for Network Communications" filed contemporaneously herewith on Jun. 12, 2012.

TECHNICAL FIELD

The teachings herein relate to a communications system, and in particular to systems for managing network communications between business applications on a mobile computing device and a network.

BACKGROUND

Mobile computing systems are used daily, in a wide range of industries, with applications such as route accounting, pre-sales, field services, parcel delivery, medical services, retail, warehousing, public safety and public services. To tailor a mobile computing device used in a mobile computing system to a particular industry application, the mobile computing device is typically provided with one or more business applications that configure the mobile computing device for that particular industry application use. For example, a mobile computing device such as a scanning device, may be provided with a business application for managing inventory. This business application will generally set the settings of the scanner to the settings required to satisfy the communication needs of the business application, such as sending and receiving data to and from the business application. With the scanner so configured, the business application will then be able to recognize and store inventory data captured by the scanner into data files and to manipulate and communicate that data to allow the user to manage the inventory at, for example, a warehouse.

Each of these business applications is generally designed to meet the special needs of that industry's mobile workforce, and as a result, these applications have different functionality which leads to different data structures, dataflow, work-flow, user interfaces, and supported peripherals.

Conventional business applications may manage communications with the network directly in which case the business application will handle details of the communication itself. For example, each business application will typically open a network connection with a a host server, such as a web server, and interact directly with the host system through whatever interface it exposes to address commands to the server, receive results, etc. Alternatively, business applications may use an application program interface (API) to assist in that management that allows them to access the network using a set of pre-defined functions that are part of the API. A business application that uses the API to handle communications over the network will typically manage details of the network communication itself, using the API. For example, the API will assist the business application in opening a network connection with a host server, such as a web server, and interact directly with the host system through whatever interface it exposes to, address commands to the server, receive results, etc. In either case, all of this requires that the designer of business applications have a thorough understanding of all of the details of the network, network protocols, servers, etc., and, in the case of the business application that uses the API, have a thorough understanding of the API as well. This can be a considerable burden for the developers of business applications with typical communication needs.

The requirement that a business application typically manages details of the network communication itself, alone or using the API, makes it difficult to scale the mobile computing system since diverse business applications have different network communication requirements. This requirement that a business application typically manages details of the network communication itself, alone or using the API, also leads to segmentation of the business applications at the network communication level; making it harder for the administrator to manage the rules that govern the network communications. It is harder to manage communications because typically each mobile application would independently, only for its own use, establish a communications session, through any network that was available, to any host system and the administrator has no way to monitor or manage what mobile applications are communicating from the device, with what server side resources, what data is being requested and submitted between the device/application and host system, who was the device user associated with the data exchange, how long the session took, through what network its being executed, etc. It also makes the network less open and less extendible to meet the specific needs of each organization since some business applications may not be configurable for use with or it may be difficult to configure the business application for use with the network which means that a business application may not get used with a network. The requirement that a business application typically manages details of the network communication itself, alone or using the API, also means that each business application will have a separate communication link with the network which creates more channels of communication with the network. This means that there are more communication channels that the network needs to manage. It also means that there are more channels of communication that are open to a security breach.

There is a need for a mobile computing system in which any number of mobile business applications running on the same device (and running on any number of devices and device types) can exchange data in parallel with any number of host system resources. There is a need for a mobile computing system in which the details of the network communication between a business application residing on a mobile computing device and a network or host system are made more uniform. There is a need for a unified approach to implementing connectivity between mobile applications and host systems that improves mobile communication flexibility and reliability, enhances data transmission security, enables better mobile device management and mobile application support, enables extensive control over mobile data exchange transactions, enables mobile computing devices to be more quickly and efficiently used on the network, provides an integrated and yet highly scalable solution, and enables comprehensive monitoring of all communications and data processing. This disclosure addresses those needs.

SUMMARY OF THE INVENTION

In one embodiment, a system for use in establishing network communications between a plurality of mobile applications on a mobile computing device and a network includes a plug-in residing on one or more servers on a network. The plug-in is associated with a process number for configuring a data service residing on a client on a mobile computer that provides network communications between a plurality of mobile applications on the mobile computer and the network. The plug-in is adapted to manage a data communication between the one or more mobile applications on the mobile computer and the plug-in.

In another embodiment, the system further includes a database of one or more predetermined rules for establishing network communications between one or more mobile applications on a mobile computing device and the plug-in, the predetermined rules including a set of data on the properties of a set of one or more mobile computers within a network that are permitted to use the plug-in within the network. They may also include a set of data on the priorities that each mobile computer of the set of one or more mobile computers that are permitted to use the plug-in is to follow when establishing network communication between one or more of the mobile applications on the each mobile computer of the set of one or more mobile computers and the plug-in.

In another embodiment, the set of data on the priorities that each mobile computer of the set of one or more mobile computers that are permitted to use the plug-in is to follow when establishing network communication between the one or more mobile applications on the each mobile computer of the set of the one or more mobile computers and the plug-in includes a first set of one or more devices associated with one or more mobile computers of the set of one or more mobile computers that are permitted to use the plug-in having a primary priority and a second set of one or more devices associated with one or more mobile computers of the set of one or more mobile computers that are permitted to use the plug-in having a secondary priority.

In another embodiment the first set of the one or more devices associated with the one or more of the set of the one or more mobile computers that are permitted to use the plug-in have a primary priority includes a mobile computer.

In another embodiment, the second set of the one or more devices associated with the one or more mobile computers of the set of one or more mobile computers that are permitted to use the plug-in having a secondary priority is taken from the group consisting of a printer, a scanner, and a facsimile device.

In another embodiment, the first set of one or more devices associated with the one or more mobile computers of the set of mobile computers that are permitted to use the plug-in having a primary priority includes a set of device properties.

In another embodiment, the set of device properties of the first set of the one or more devices associated with the one or more mobile computers of the set of mobile computers that are permitted to use the plug-in having a primary priority is taken from the group consisting of a form of communication, a modem, a connection name, a password, an IP address, and one or more properties.

In another embodiment the set of priority data associated with the one or more mobile computers of the set of one or more mobile computers that are permitted to use the plug-in includes a time zone associated with the one or more mobile computers of the set of one or more mobile computers. In another embodiment, the set of priority data associated with the one or more mobile computer of the set of one or more mobile computers that are permitted to use the plug-in includes a rule regarding whether the one or more mobile computer of the set of one or more mobile computers that are permitted to use the plug-in is required to use a different plug-in when the one or more mobile computer of the set of one or more mobile computers is in a different time zone. In another embodiment, the second set of the one or more devices associated with the one or more mobile computers of the set of one or more mobile computers that are permitted to use the plug-in having a secondary priority includes a set of device properties. In another embodiment, the set of device properties of the second set of the one or more devices includes data indicating whether a one of the set of the one or more devices is a shared or individual resource.

In another embodiment, the data service residing on the client on the mobile computer that provides network communications between the one or more mobile applications on the mobile computer and the network configures the mobile computer for communication between the one or more mobile applications and the network based upon the process number that the data service requests from network.

In another embodiment, the requested process number is transmitted to a gateway server for assignment to a server on the network having the plug-in associated with the process number for managing the data communication between the one or more mobile applications on the mobile computer and the plug-in.

In another embodiment, the assignment of the requested process number to one of the one or more servers on the network having the plug-in associated with the process number is based on active load balancing of the plurality of servers.

In another embodiment, the assignment of the requested process number to one of of the one or more servers on the network having the plug-in associated with the process number is based on active fail-over.

In another embodiment, the one or more predetermined rules for establishing network communications between one or more mobile applications on a mobile computing device and the plug-in r includes a restriction based on a priority between a plurality of periods of time and wherein the data service is configured to establish the connection of the requesting one or more mobile applications to the network during one of the periods of time according to the priority.

In another embodiment, the one or more predetermined rules for establishing network communications between one or more mobile applications on a mobile computing device and the plug-in includes a restriction based on a priority between a plurality of communication protocols and wherein the data service is configured to use a one of the plurality of communication protocols available to the mobile computer according to the priority for the connection to the network requested by the one or more of the mobile applications.

In another embodiment, the one or more predetermined rules for establishing network communications between one or more mobile applications on a mobile computing device and the plug-in includes a system code for identifying a group of network users (whether a specific device user or a "virtual user") within the network.

In another embodiment, the group of network users within the network identified by the system code is taken from the group consisting of deployment group, connection group, mandatory server group, and remote assist operator group. In another embodiment, the group of network users identified by the system code includes an identification of individual users of the network. In another embodiment, the group of network users identified by the system code includes a user associated with the mobile computer. In another embodiment, the system code for identifying a group of network users within the network includes an identification of a permissible software for use with the plug-in.

In another embodiment, the database further includes the permissible software. In another embodiment, the permissible software downloaded to the client is installed on the mobile computer for use by the one or more mobile application on the mobile computer in providing a network communication between the one or more mobile applications and the plug-in.

In another embodiment, the assignment of the requested process number to one of one or more servers on the network having the plug-in associated with the process number is based on the source code.

In another embodiment, the data communication includes business or personal data. In another embodiment, a format for the data is taken from the group consisting of text, XML, and binary. In another embodiment, the database of one or more predetermined rules for establishing network communications between one or more mobile applications on a mobile computing device and the plug-in includes a plurality of versions of a business application.

In another embodiment, a first of the one or more mobile applications on the mobile computer requests a first version of the mobile application for downloading from the database and a second of the one or more mobile applications on the mobile computer requests a second version of the application for downloading from the database and the plug-in establishes a first connection with the first of the one or more mobile applications for downloading a first set of data associated with the first version of the mobile application and a second connection with the second of the one or more mobile applications for downloading a second set of data associated with the second version of the mobile application.

In another embodiment, a method for managing network communications between a plurality of mobile applications on a mobile computer and a network includes the steps of: defining a set of one or more in a database; associating the set of one or more rules with a process number for configuring a data service residing on a client on a mobile computer that provides network communications between one or more mobile applications on the mobile computer and a network; initiating a request from the client on the mobile computer that provides network communications between the one or more mobile applications on the mobile computer and the network for the process number for configuring the data service residing on the client; and configuring the data service residing on the client on the mobile computer for network communications between the one or more mobile applications on the mobile computer and the network according to the set of one or more rules associated with the process number requested by the client on the mobile computer. In another embodiment, the method further includes the step of providing a plug-in adapted to manage a data communication between the one or more mobile applications on the mobile computer and the plug-in.

In another embodiment, a method for establishing network communications between one or more mobile applications on a mobile computer and a network includes the steps of: defining a set of one or more rules in a database; associating the set of one or more rules with a process number for configuring a data service residing on a client on a mobile computer that provides network communications between one or more mobile applications on the mobile computer and a network; initiating a request from the client on the mobile computer that provides network communications between the one or more mobile applications on the mobile computer and the network for the process number for configuring the data service residing on the client; and configuring the data service residing on the client on the mobile computer for network communications between the one or more mobile applications on the mobile computer and the network according to the set of one or more rules associated with the process number requested by the client on the mobile computer.

In another embodiment, a method for establishing network communications between one or more mobile applications on a mobile computer and a network includes the steps of: initiating a request from the client on the mobile computer that provides network communications between the one or more mobile applications on the mobile computer and a gateway server for the process number for configuring the data service residing on the client; determining if the client is within a private network; forwarding the client to a server having a data plug associated with the requested process number using an IP address of the server inside the network if the client is within the private network; determining if the client is a virtual private network client if the client is outside the private network; forwarding the client to the server having a data plug associated with the requested process number using a virtual private network tunnel layer if the client is a virtual private network client; forwarding the client to the server having a data plug associated with the requested process number using an external IP address of the server through a router or firewall using network address translation between the gateway server and the server having a data plug associated with the requested process number. The virtual private network client illustrative is a Microsoft VPN client but any VPN client, such as a Cisco's VPN Client may be used.

In another embodiment, a method for managing network communications between one or more mobile applications on a mobile computer and a server includes the steps of: defining a system code for identifying a group of network users within the network; associating the system code with a process number for configuring a data service residing on a client on a mobile computer that provides network communications between one or more mobile applications on the mobile computer and the network; initiating a request from a client on the mobile computer that provides network communications between the one or more mobile applications on the mobile computer and a gateway server for the process number for configuring a data service residing on the client; and configuring the data service residing on the client on the mobile computer for network communications between the one or more mobile applications on the mobile computer and the network according to the system code associated with the process number requested by the client on the mobile computer.

In another embodiment, a method for managing communication between a mobile computer and a network includes the steps of: defining one or more connection paths for use by a mobile computer to establish communication with a network; defining a set of rules for the configuration of the defined one or more connection paths in establishing the communication with the network; and establishing communication with the network by the mobile device using the defined one or more connection paths based on the defined set of rules.

In another embodiment, a method for establishing communication between a mobile application on a mobile computer and a network includes the steps of: defining a process for communication between a mobile computer and a network; assigning a process number to that process; assigning data associated with that process number to a plug-in; assigning the plug-in to a server; initiating a data request from a mobile application on the mobile computer using the process number; routing the data request to the server assigned the plug-in based on the process number; establishing a connection path between the mobile computer and the plug-in based on the defined process assigned to the process number. In another embodiment, a method for provisioning a subset of a plurality of mobile devices includes selecting a template comprising a setting for at least one property of a device in a subset of a plurality of mobile devices of a communications network; identifying one or more devices to be provisioned by the template; and configuring each of the one or more devices by automatically applying the setting for the at least one property of the device of the template to the one or more identified devices through the network.

Other embodiments are also disclosed.

BRIEF DESCRIPTION OF THE DRAWINGS

FIG. 10 is another illustration that further depicts use of rules by the network in managing network requests;

FIG. 11 illustrates some rules that a system manager may program into a plug-in;

DETAILED DESCRIPTION

Figure 1:
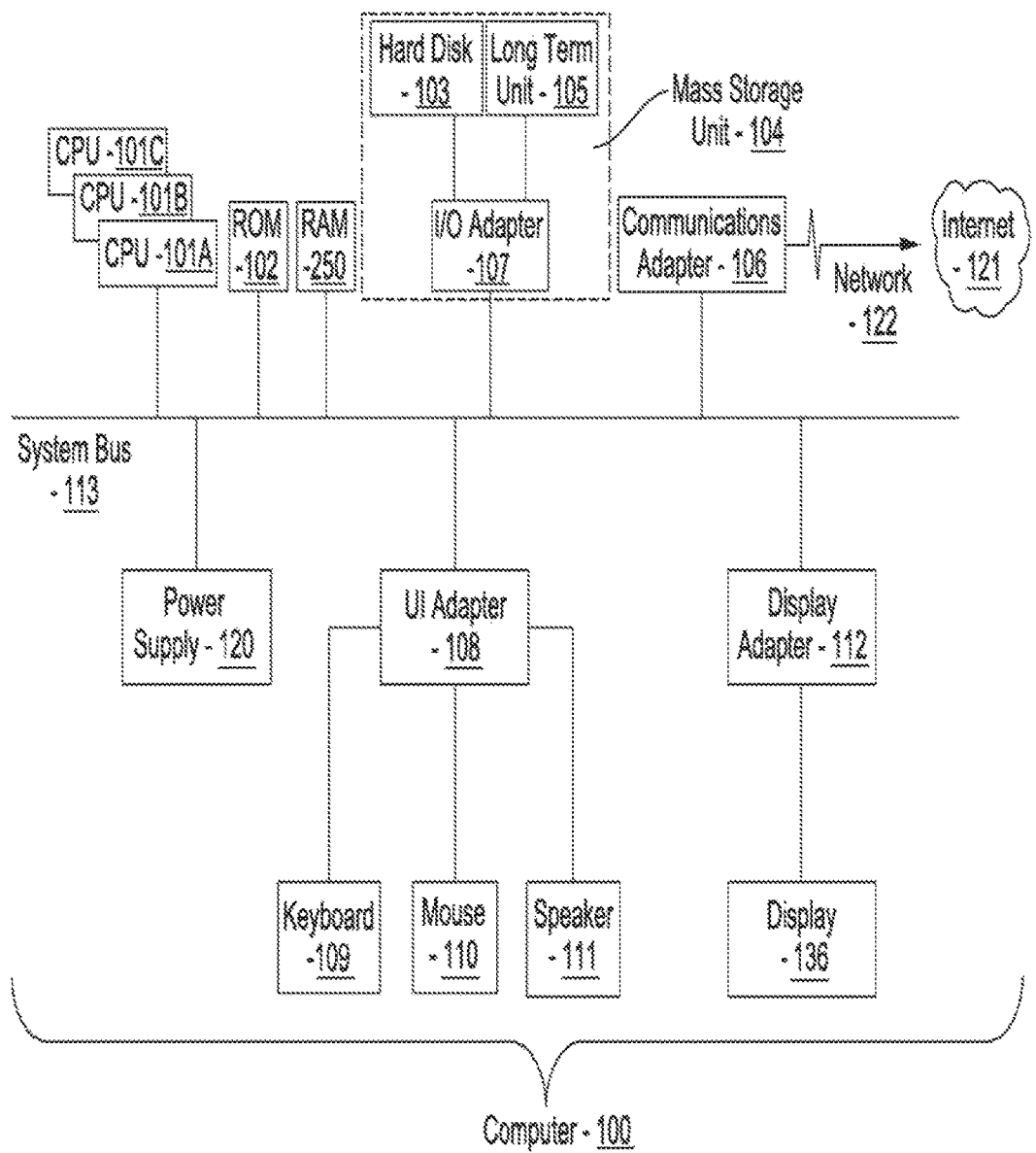
FIG. 1 is a block diagram depicting exemplary components of a computer useful for implementing a communications network.

A system is disclosed for managing communications of one or more mobile devices in a network. The system includes a host which, among other things, manages the communications network. Each mobile device includes a client that provides for communication from at least one application running on the mobile device to the network. The client hosts a data service which coordinates the communications with a source and a network by use of a process number.

Each process request that a mobile application generates via the client includes a process number. The mobile application may be a business or mobile application. Similarly, the host includes a server that hosts, among other things, at least one plug-in. The process number generated by the client corresponds to a process number that is associated with the plug-in process that is assigned to run on the server.

By using a system manager, various connection paths may be defined with different types of connectivity, thus limiting aspects such as the time of day when different types of connections can be established, and as well as permissible connection paths. For each process request by a mobile business application, the client will use defined connection path information to automatically determine the type and priority of connections that may be established. Configuration settings, including connection path rules, defined in the system manager that are to be used by the client on the mobile device are automatically replicated to the mobile device and processed by the client each time the client attempts to connect to the computing system.

The data service is configured to accept commands from the plurality of mobile applications using, for example, a text-based mark-up language. The shared data service may be a single instance of a process executing on the source, such as a mobile device, that handles the typical communication needs of business applications, such as sending and receiving data. The shared data service process takes care of details such as initiating network communications, opening a network connection to a gateway server, determining the server with which it will communicate, etc. Generally, the shared data service communicates with a data service plug-in on the server side associated with the process number, in order to handle requests from the business applications that access the network through the data service. The particulars of the data service residing on the client for use with the disclosed system in providing network communications between a plurality of mobile applications on a source and a network for a process number can be found in application entitled "Data Service on a Mobile Device" filed contemporaneously herewith and is incorporated herein by reference. The particulars of the protocol for use with the disclosed system for managing communications between a plurality of mobile applications on a source and a network for a process number can be found in application entitled "Communication Protocol and System for Network Communications" filed contemporaneously herewith and is incorporated herein by reference.

More specifically, the system provides for network communications between a data service residing on a client. In general, the data service provides network communications between a plurality of mobile applications running on a source and a network. The data service is configured to accept commands from a plurality of mobile applications using a text-based mark-up language. The shared data service is a single instance of a process executing on the source, such as a mobile device, that generally handles all of the communication needs of business applications, such as sending and receiving of data. For example, the shared data service process takes care of details such as initiating network communications, opening a network connection to a gateway server, determining the server with which it will communicate and the like. Generally, the shared data service communicates with a data service plug-in on the server side, in order to handle requests from the business applications that access the network through the data service. In one embodiment, a system for use in establishing network communications between a plurality of mobile applications on a mobile computing device and a network includes a plug-in residing on one or more servers. The plug-in is associated with a process number for configuring a data service residing on a client on a mobile computer that provides network communications between a plurality of mobile applications on the mobile computer and the network. In another embodiment, the plug-in is adapted to manage a data communication between the one or more mobile applications on the mobile computer and the plug-in In another embodiment, the system further includes a database of one or more predetermined rules for establishing network communications between one or more mobile applications on a mobile computing device and the plug-in, the predetermined rules including a include a set of data on the properties of a set of one or more mobile computers within a network that are permitted to use the plug-in within the network. They may also include a set of data on the priorities that each one of the set of one or more mobile computers that are permitted to use the plug-in is to follow when establishing network communication between one or more of the mobile applications on the each mobile computer of the one or more set of mobile computers and the plug-in.

In another embodiment, the set of data on the priorities that each mobile computer of the set of one or more mobile computers that are permitted to use the plug-in is to follow when establishing network communication between of the one or more mobile applications on the each mobile computer of the set of one or more mobile computers and the plug-in includes a first set of one or more devices associated with one or more mobile computers of the set of one or more mobile computers that are permitted to use the plug-in having a primary priority and a second set of one or more devices associated with one or more mobile computers of the set of one or more mobile computers that are permitted to use the plug-in having a secondary priority.

In another embodiment the first set of the one or more devices associated with one or more mobile computer of the set of one or more mobile computers that are permitted to use the plug-in having a primary priority includes a mobile computer.

In another embodiment, the second set of the one or more devices associated with the one or more mobile computers of the set of one or more mobile computers that are permitted to use the plug-in having a secondary priority is taken from the group consisting of a printer, a scanner, and a facsimile device.

In another embodiment, the first set of one or more devices associated with the one or more mobile computers of the set of one or more mobile computers that are permitted to use the plug-in having a primary priority includes a set of device properties.

In another embodiment, the set of device properties of the first set of the one or more devices associated with the one or more mobile computers of the set of mobile computers that are permitted to use the plug-in having a primary priority is taken from the group consisting of a form of communication a modem, a connection name, a password, an IP address, and one or more properties.

In another embodiment the set of priority data associated with the one or more mobile computers of the set of one or more mobile computers that are permitted to use the plug-in includes a time zone associated with the one or more mobile computers of the set of one or more mobile computers. In another embodiment, the set of priority data associated with the one or more mobile computers of the set of one or more mobile computers that are permitted to use the plug-in includes a rule regarding whether the one or more mobile computers of the set of one or more mobile computers that are permitted to use the plug-in is required to use a different plug-in when the one or more mobile computer of the set of one or more mobile computers is in a different time zone. In another embodiment, the second set of the one or more devices associated with the one or more mobile computers of the set of one or more mobile computers that are permitted to use the plug-in having a secondary priority includes a set of device properties. In another embodiment, the set of device properties of the second set of the one or more devices includes data indicating whether a one of the set of the one or more devices is a shared or individual resource.

In another embodiment, the data service residing on the client on the mobile computer that provides network communications between the one or more mobile applications on the mobile computer and the network configures the mobile computer for communication between the one or more mobile application and the network based upon the process number that the data service requests from network.

In another embodiment, the requested process number is transmitted to a gateway server for assignment to a server on the network having the plug-in associated with the process number for managing the data communication between the one or more mobile applications on the mobile computer and the plug-in.

In another embodiment, the assignment of the requested process number to one of the one or more servers on the network having the plug-in associated with the process number is based on active load balancing of the plurality of servers.

In another embodiment, the assignment of the requested process number to one of of the one or more servers on the network having the plug-in associated with the process number is based on active fail-over.

In another embodiment, the one or more predetermined rules for establishing network communications between one or more mobile applications on a mobile computing device and the plug-in includes a restriction based on a priority between a plurality of periods of time and wherein the data service is configured to establish the connection of the requesting one or more mobile applications to the network during one of the periods of time according to the priority.

In another embodiment, the one or more predetermined rules for establishing network communications between one or more mobile applications on a mobile computing device and the plug-in includes a restriction based on a priority between a plurality of communication protocols and wherein the data service is configured to use a one of the plurality of communication protocols available to the mobile device according to the priority for the connection to the network requested by the one or more mobile applications.

In another embodiment, the one or more predetermined rules for establishing network communications between one or more mobile applications on a mobile computing device and the plug-in includes a system code for identifying a group of network users (whether a specific device user or a "virtual user" within the network.

In another embodiment, the group of network users within the network identified by the system code is taken from the group consisting of deployment group, connection group, mandatory server group, and remote assist operator group. In another embodiment, the group of network users identified by the system code includes an identification of individual users of the network. In another embodiment, the group of network users identified by the system code includes a user associated with the mobile computer. In another embodiment, the system code for identifying a group of network users within the network includes an identification of a permissible software for use with the plug-in.

In another embodiment, the database further includes the permissible software. In another embodiment, the permissible software downloaded to the client is installed on the mobile computer for use by the one or more mobile application on the mobile computer in providing a network communication between the one or more mobile application and the plug-in.

In another embodiment, the assignment of the requested process number to the one or more servers on the network having the plug-in associated with the process number is based on the source code.

In another embodiment, the data communication includes business or personal data. In another embodiment, a format for the data is taken from the group consisting of text, XML, and binary. In another embodiment, the database of one or more predetermined rules for establishing network communications between one or more mobile applications on a mobile computing device and the plug-in includes a plurality of versions of a business application.

In another embodiment, a first of the one or more mobile applications on the mobile computer requests a first version of the mobile application for downloading from the database and a second of the one or more mobile applications on the mobile computer requests a second version of the mobile application for downloading from the database and the plug-in establishes a first connection with the first of the one or more mobile applications for downloading a first set of data associated with the first version of the mobile application and a second connection with the second of the one or more mobile applications for downloading a second set of data associated with the second version of the mobile application.

In another embodiment, a method for managing network communications between a plurality of mobile applications on a mobile computer and a network includes the steps of: defining a set of one or more rules in a database; associating the set of one or more rules with a process number for configuring a data service residing on a client on a mobile computer that provides network communications between one or more mobile applications on the mobile computer and a network; initiating a request from the client on the mobile computer that provides network communications between one or more mobile applications on the mobile computer and the network for the process number for configuring the data service residing on the client; and configuring the data service residing on the client on the mobile computer for network communications between the one or more mobile applications on the mobile computer and the network according to the set of one or more rules associated with the process number requested by the client on the mobile computer. In another embodiment, the method further includes the step of providing a plug-in adapted to manage a data communication between the one or more mobile applications on the mobile computer and the plug-in.

In another embodiment, a method for establishing network communications between one or more mobile applications on a mobile computer and a network includes the steps of: initiating a request from the client on the mobile computer that provides network communications between the one or more mobile applications on the mobile computer and a gateway server for the process number for configuring the data service residing on the client; determining if the client is within a private network; forwarding the client to a server having a data plug associated with the requested process number using an IP address of the server inside the network if the client is within the private network; determining if the client is a virtual private network client if the client is outside the private network; forwarding the client to the server having a data plug associated with the requested process number using a virtual private network tunnel layer if the client is a virtual private network client; forwarding the client to the server having a data plug associated with the requested process number using an external IP address of the server through a router or firewall using network address translation between the gateway server and the server having a data plug associated with the requested process number. The virtual private network client illustrative is a Microsoft VPN client but any VPN client, such as a Cisco's VPN Client may be used.

In another embodiment, a method for managing network communications between one or more mobile applications on a mobile computer and a network includes the steps of: defining a system code for identifying a group of network users within the network; associating the system code with a process number for configuring a data service residing on a client on a mobile computer that provides network communications between one or more mobile applications on the mobile computer and the network; initiating a request from a client on the mobile computer that provides network communications between the one or more mobile applications on the mobile computer and a gateway server for the process number for configuring a data service residing on the client; and configuring the data service residing on the client on the mobile computer for network communications between the one or more mobile applications on the mobile computer and the network according to the system code associated with the process number requested by the client on the mobile computer.

In another embodiment, a method for managing communication between a mobile computer and a network includes the steps of: defining one or more connection paths for use by a mobile computer to establish communication with a network; defining a set of rules for the configuration of the defined one or more connection paths in establishing the communication with the network; and establishing communication with the network by the mobile computer using the defined one or more connection paths based on the defined set of rules.

In another embodiment, a method for establishing communication between a mobile application on a mobile computer and a network includes the steps of: defining a process for communication between a mobile computer and a network; assigning a process number to that process; assigning data associated with that process number to a plug-in; assigning the plug-in to a server; initiating a data request from a mobile application on the mobile computer using the process number; routing the data request to the server assigned the plug-in based on the process number; establishing a connection path between the mobile computer and the plug-in based on the defined process assigned to the process number.

In another embodiment, a method for provisioning a subset of a plurality of mobile devices includes selecting a template comprising a setting for at least one property of a device in a subset of a plurality of mobile devices of a communications network; identifying one or more devices to be provisioned by the template; and configuring each of the one or more devices by automatically applying the setting for the at least one property of the device of the template to the one or more identified devices through the network.

A description of the system is now provided.

As discussed herein, the term "computing system" generally makes reference to computers (and other components, as appropriate) equipped with functionality (e.g., appropriate software) for implementing the teachings disclosed herein. Aspects of the teachings herein are implemented with a plurality of computing systems and devices. In order to provide some context, embodiments of a computer are presented. As used herein, the terms "computing system" and "communications system" may be interchanged herein. That is, the computing system generally implements the communications system disclosed herein, and for the most part, is the same system (differences may relate to, for example, context of the discussion or use of the system).

Referring now to FIG. 1, exemplary aspects of a computer 100 are depicted. Computer 100 has one or more central processing units (processors) 101a, 101b, 101c, etc. (collectively or generically referred to as processors) 101). Processors 101 are coupled to system memory 250 and various other components via a system bus 113. Read only memory (ROM) 102 is coupled to the system bus 113 and may include a built-in operating system (BIOS), which controls certain basic functions of computer 100.

FIG. 1 further illustrates an input/output (I/O) adapter 107 and a communications adapter 106 coupled to the system bus 113. I/O adapter 107 may be a small computer system interface (SCSI), or include any other type of interface deemed appropriate. The I/O adapter 107 generally provides for communicating with a hard disk 103 and/or long term storage unit 105 (such as a tape drive) or any other similar component (such as an optical drive). I/O adapter 107, hard disk 103, and long term storage unit 105 (and other similar components as may be included) are collectively referred to herein as mass storage 104.

A communications adapter 106 interconnects system bus 113 with an outside network 122 enabling computer 100 to communicate with other such systems. The communications adapter 106 may be supportive of at least one of wired and wireless communication protocols. For example, the communications adapter 106 may support protocols such as wired Ethernet, wi-fi (e.g., 802.11 protocols), UMTS, dial-up, active-sync, cellular (using protocols such as, for example, GSM, GPRS, EDGE, CDMA, TDMA, 3G, 4G, and the like). Generally, the communications adapter 106 communicates with a network 122, and may communicate (directly or indirectly) with the Internet 121.

The computer 100 is powered by a suitable power supply 120. In some embodiments, the power supply 120 includes at least one transformer for receiving alternating current (AC) and transforming the AC into a suitable form of direct current (DC). In other embodiments, the power supply 120 includes at least one battery. The power supply may include appropriate circuitry for receiving and controlling various forms of input power;

Input/output devices are shown as connected to system bus 113 via user interface (UI) adapter 108. A keyboard 109, a pointing device (e.g., a mouse) 110, and speaker 111 may be included and interconnected to system bus 113 via user interface adapter 108. Other user interface components may be included as deemed appropriate.

A display adapter 112 connects display monitor 136 is connected to system bus 113. The display adapter 112 and/or display monitor may be configured with various components, such as a graphics adapter to improve the performance of graphics intensive applications, a video controller, a capacitive (i.e., touch screen) display, and the like.

In some embodiments, adapters 106, 107, 108 and 112 may be connected to one or more I/O busses that are connected to system bus 113 via an intermediate bus bridge (not shown). Suitable I/O buses for connecting peripheral devices such as hard disk controllers, network adapters, and graphics adapters may include common protocols, such as the Peripheral Components Interlace (PCI) bus.

Generally, the computer 100 stores machine readable instructions on machine readable media (such as in ROM, RAM, or in the mass storage unit 104). The machine readable instructions (referred to herein as "software," as an "application," as a "client," a "process" a "plug-in" and by other similar terms) generally provide for functionality as will be discussed in detail further herein.

Some of the machine readable instructions on machine readable media may include an operating environment. For example, and as presented herein, a suitable operating environment is WINDOWS (available from Microsoft Corporation of Redmond Wash.). Software as provided herein may be developed in, for example, SQL language, which is a cross-vendor query language for managing relational databases. Aspects of the software may be developed in and/or implemented with other software. For example, user interfaces may be provided in XML, HTML and the like.

The computer 100 may include, or exclude, as appropriate, the foregoing components and other components. For example, other components such as routers, bridges, firewalls, switches, servers, middleware and other components may be available.

In some embodiments, the computer 100 may be designed and configured for stationary operation, while in some other embodiments the computer 100 is designed and configured for mobile operation. Some exemplary embodiments of commonly available mobile computers 100 that may be suited for practice of the teachings herein include laptops, smart-phones, and the like.

A computing system may include a plurality of computers 100. For example, in the system, at least one computer 100 in the plurality may include substantial storage, memory, processors, mass storage and the like. Generally, such a configuration is useful as a "host computer" or a "base station." At least one computer 100 in the plurality may be designed with mobility as a primary purpose. For example, memory may replace a hard disk due to a physically compact nature of the memory. Generally, such a configuration is useful as a "mobile computer," a "mobile station" or by other similar terms.

A particular computer 100 in a computing system may be purpose-oriented. For example, a computing infrastructure may use one computer 100 principally as a file server (i.e., a data storage device for efficient storing of data within the computing infrastructure), a plurality of other computers 100 as input devices (e.g., as mobile stations operated remotely by users for interfacing with the computing infrastructure), as a console (e.g., a dedicated system for managing the computing infrastructure), and the like.

Some functionality as may be described herein may be implemented by hardware (such as by the foregoing components), or by software, as appropriate. Accordingly, where reference is made to implementation in one manner or another, such implementation is merely illustrative and is not limiting of techniques described. In short, the foregoing description of the computer 100, and systems making use of or incorporating the computer 100, merely provides an environment for the teachings herein and is not to be construed as limiting, but as illustrative of aspects of the computer 100 and systems that incorporate the computer 100.

Figure 2:
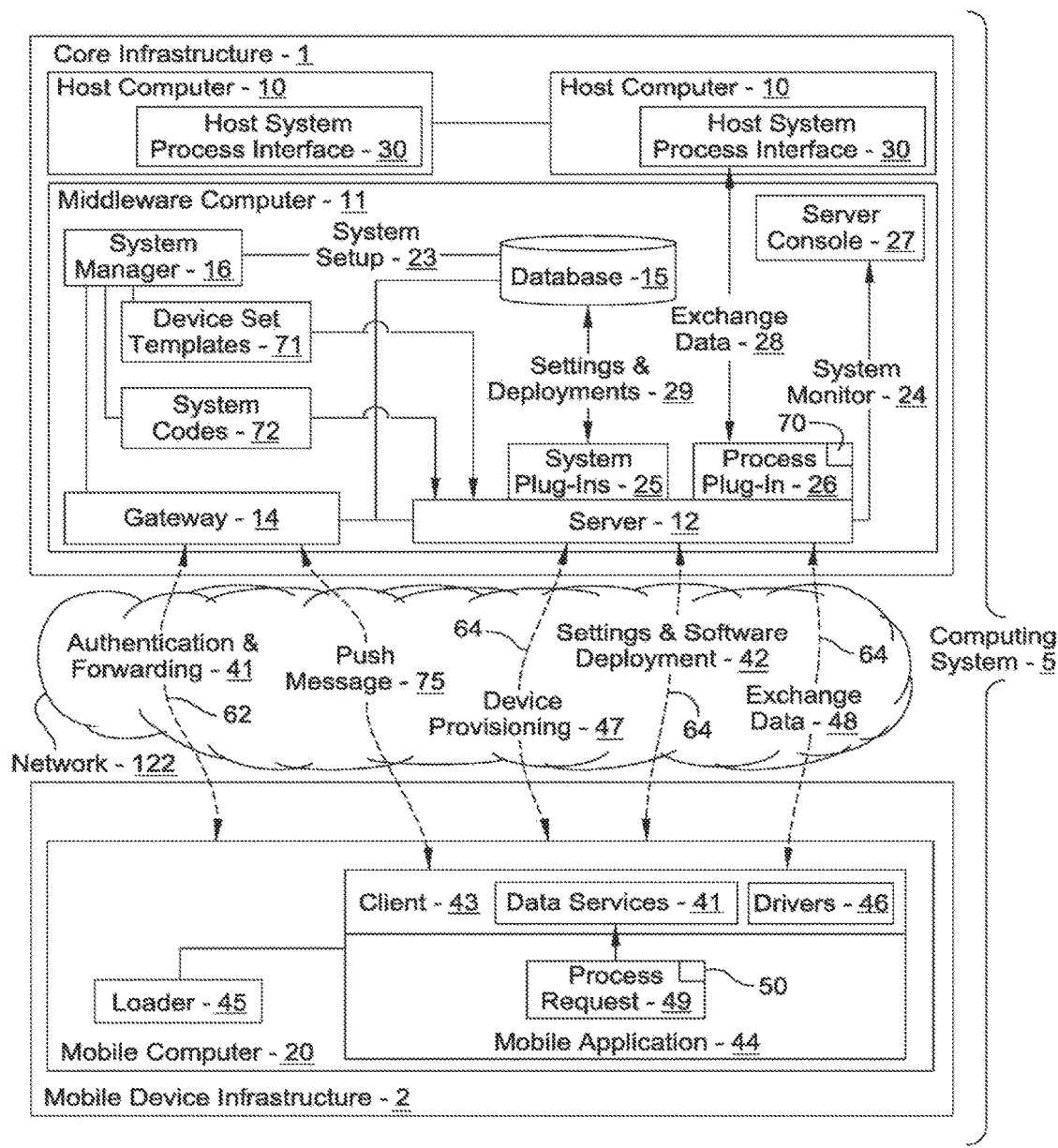
FIG. 2 is a block diagram depicting exemplary components and communications for a computing system according to the teachings herein.

Referring now to FIG. 2, there is shown a configuration of a computing system 5. In this embodiment, the computing system 5 includes a core infrastructure 1 and a mobile device infrastructure 2. The core infrastructure 1 includes at least one host computer 10, and at least one middleware computer 11. The core infrastructure 1 is adapted for communicating with the mobile device infrastructure 2 through the network 122. Generally, the mobile device infrastructure 2 includes a plurality of mobile computers 20.

Illustratively, the computing system 5 may include more than one of any of the components introduced herein. For example, in a large enterprise, it may be appropriate to include a plurality of servers 12. Accordingly, unless it is not feasible to implement a plurality of any given component, one should recognize that a plurality may be implemented.

Turning to the middleware computer 11 in more detail, it may be seen that the middleware computer 11 supports a few different aspects of the computing system 5. For example, the middleware computer 11 includes a gateway 14, a database 15, a system manager 16, a server 12 and a server console 27. Each of these components will be discussed further herein.

Generally, the middleware computer 11 communicates with each of the mobile computers 20 in the mobile device infrastructure 2. The middleware computer 11 generally communicates with the mobile computers 20 through the network 122, which is accessed through at least one of the gateway 14 and the server 12. The mobile computer 20, in turn, operates a client 43 for enabling the communications. The client 43 interfaces with at least one mobile application 44 on board the mobile computer 20.

Exemplary aspects of some of the components in the computing system 5 are now provided. In general, the gateway 14 is a server-side application that functions as an entry point into the computing system 5. The server 12 is a server-side application that accepts and handles process requests 49 (49a, 49b) from a particular client 43. The server console 27 is a server-side application that provides a visual monitor of the communications processing within the computing system 5. A "remote-assist server" (not shown in FIG. 2) is a server-side application that acts as a bridge between a remote assist console (not shown in FIG. 2) and each client 43. The remote assist console is a Microsoft Windows application (available from Microsoft Corporation of Redmond Wash.) that allows remote assist operators to collaboratively support users of the mobile device infrastructure 2. A "system monitor" is a server-side application that provides users with a visual indicator of the operating status of servers 12 and gateways 14 within a single implementation of the computing system 5. A process plug-in 26 (26a, 26b) is a server-side application that processes data exchanged for each request 49 from a client 43. A system plug-in 25 is a special plug-in application that is used to perform system-level functions. A "test plug-in" (not shown in FIG. 2) is an application that works with test client applications to verify connectivity and to test system performance for a given communications infrastructure. The system manager 16 is a server-side application that operates as a control center. A "packager" is a stand-alone application that provides for bundling files into packages. The client 43 is an application run on the mobile device 20 to provides for processing data transfer requests 49 from a mobile application 44. "Data services" are a set of interfaces that provide mobile applications 44 with communications and data management functions. A device driver 46 is an application designed to work with a respective client 43 and control a specific type of mobile computer 20. A loader 45 is a client-side application used to register each mobile computer 20 with a specific computing system 5. The database 15 is a central structured repository that contains system configuration settings, such as settings that control how the computing system 5 operates. "SQL Server" is a separate application that handles requests from applications of the computing system 5 to access the database and retrieve or store information. SQL Server is a product of Microsoft Corporation of Redmond Wash. Also, in general, a "mobile business application" or simply a "mobile application" 44 is a software application that runs on a mobile computer 100 (also referred to as a "mobile device").

As discussed herein, the term "business data" and other similar terms (i.e., those terms described as "business" oriented) refer to application data generated on behalf of a user or as throughput in the computing system 5. Such data (and other components that are analogous to a "business" component) are distinct from "system" data, "system" components, "management" data, "management" components and the like. Generally, these latter embodiments of data and/or components refer to items that are generated and/or used internally in the operation of the computing system 5 (as will become more apparent further herein).

Figure 3:
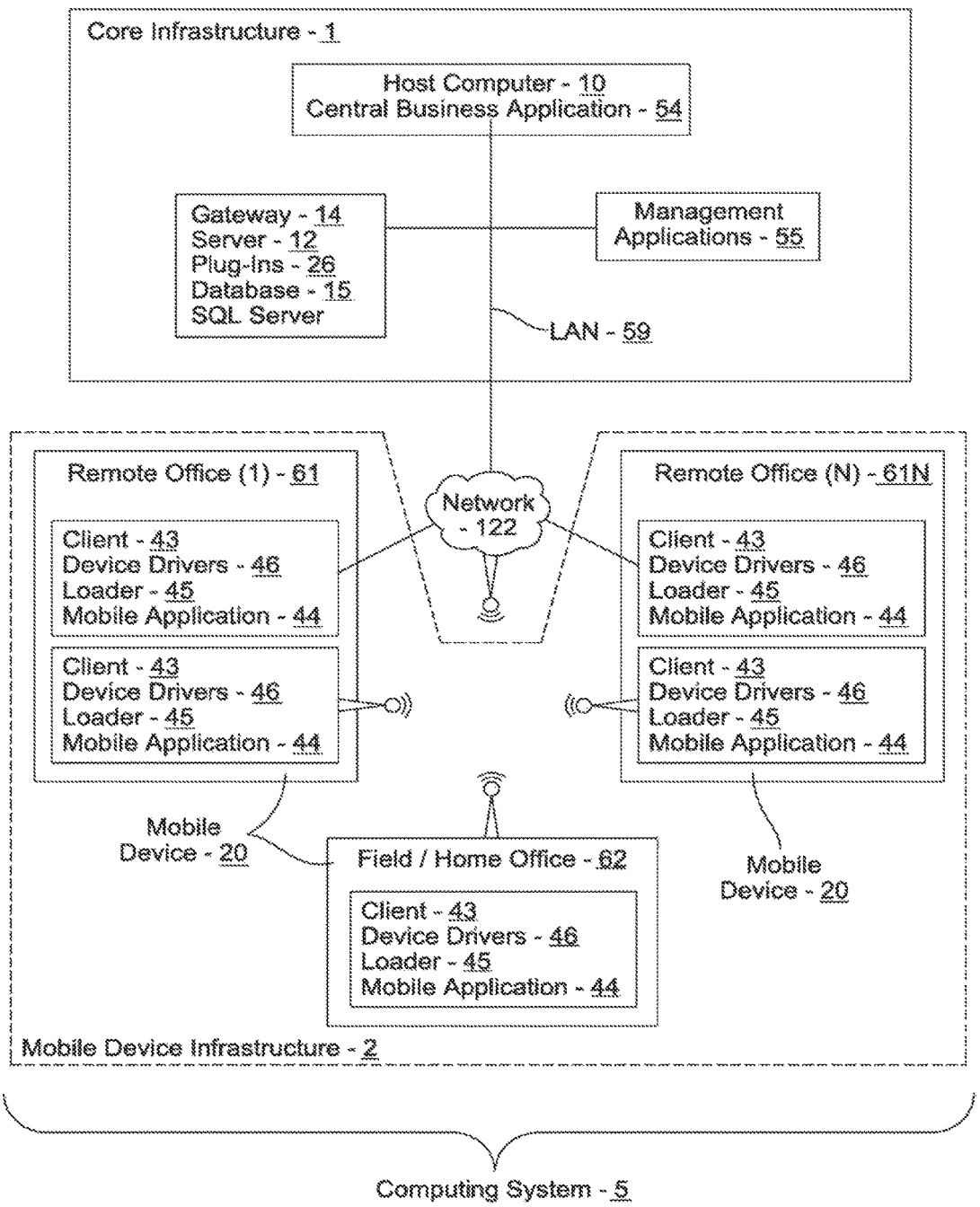
FIGS. 3 and 4 are block diagrams depicting embodiment of computing systems for implementing the system of FIG. 2.
Figure 4:
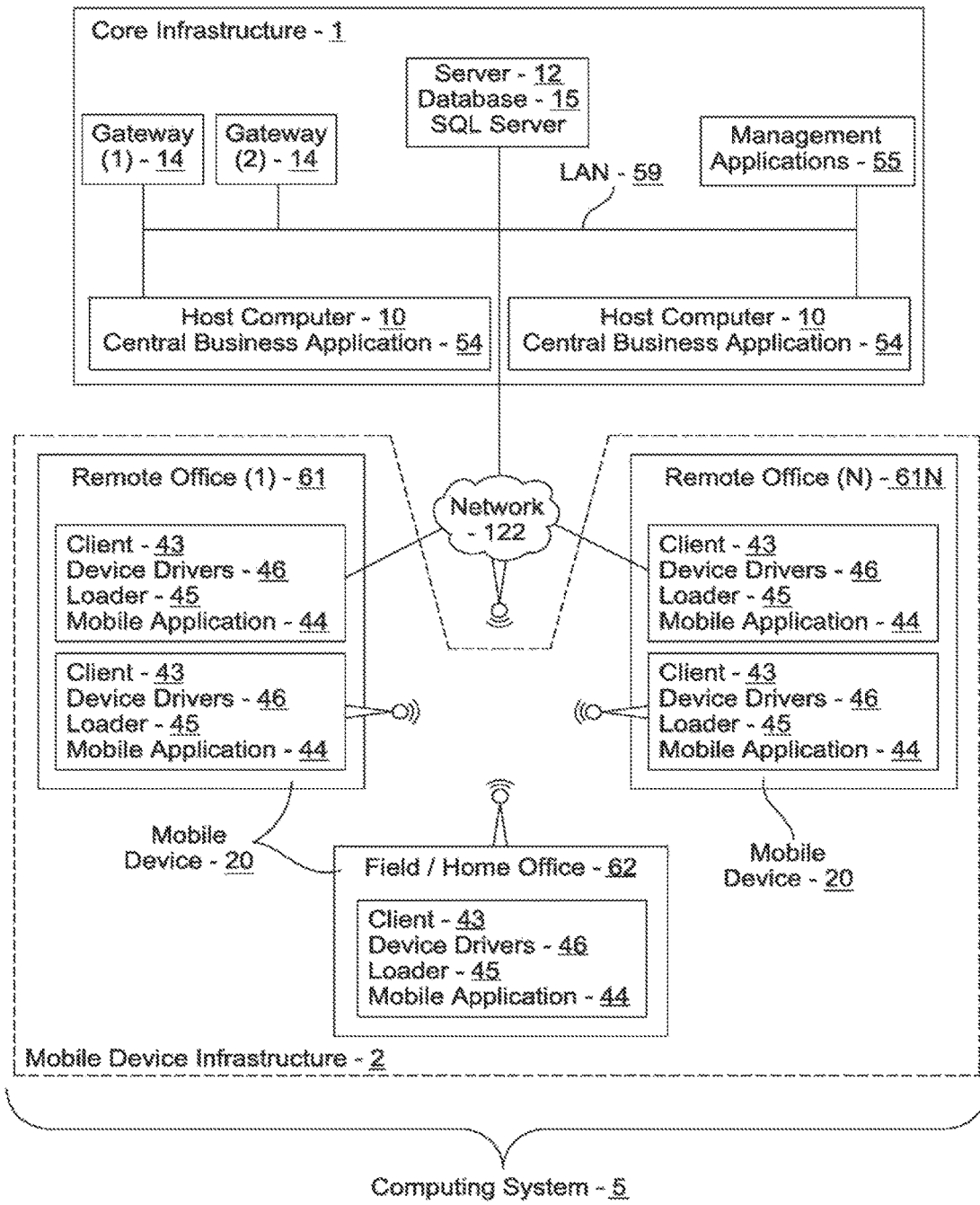

FIGS. 3 and 4 present further embodiments of the computing system 5. In these examples, in a first embodiment, the computing system 5 is implemented with a single host computer 10 (FIG. 3). In a second embodiment, the computing system 5 is implemented with two host computers 10 (FIG. 4). In general, these non-limiting illustrations provide some additional perspective on implementation of components for the computing system 5. It should be recognized that some embodiments of the computing system 5 discussed herein are with reference to implementations of a single host computer 10 (FIG. 3), or a multiple host computer 10 (FIG. 4). Accordingly, aspects of these embodiments are discussed further herein.

Referring to FIG. 3, an exemplary implementation of a single host computer 10 is depicted. Generally, an implementation of the computing system 5 using a single host computer 10 is the easiest and fastest to deploy. It is also the least costly to implement because it assumes that only one computer shall be used to install and run all server-side software components.

An implementation of the computing system 5 that uses a single host computer 10 will be able to make use of many features described herein, including communications management, device management, remote deployment of software packages to mobile devices, mobile device authentication, data compression and encryption, and mobile computing system monitoring. However, some advanced capabilities such as load balancing of communications and data management processes as well as active fail-over to maximize mobile computing system up-time may not be implemented in this architecture. However, as the topology is extendable, additional host computers 10 may be added and removed to provide additional functionality and flexibility.

In an implementation with one host computer 10, all server side applications are installed on the one host computer 10. The database 15 may also be installed on the same host computer 10 or installed on another computer running Microsoft SQL Server. This implementation may be useful when an organization already has an SQL Server installed and does not want to run an additional instance of the SQL Server application for the computing system 5. It is possible to run both the server 12 and the gateway 14 concurrently on one host computer 10.

The illustration of FIG. 3 depicts a single host computer 10 installation with the database 15 installed on the same host computer 10 as all other server-side software components. This single, network attached host computer 10 is shown as part of the server-side core infrastructure 1. All clients 43 running on mobile devices 10 connect using wide-area and local area networks, to the gateway 14 and the server 12 running on this central host computer 10. The Plug-ins 26 may also use the network 122 to access and exchange data with host systems that may be running in the organization, such as an ERP system. The system manager 16 may be installed on any number of network attached desktop or notebook computers to monitor and configure the computing system 5.

As processing power and features may be limited in an implementation that includes a single host computer 10, aspects of a dual computer installation are now discussed.

Referring to FIG. 4, an exemplary implementation of the computer system 5 that uses two host computers 10 is depicted. Generally, in an implementation of the computer system 5 that uses two host computers 10 is capable of supporting all the server-side software components and features described herein. In general, the topology that uses two host computers 10 (or more) would specify that a gateway 14 and server 12 be installed on each of the host computers 10, together with a full complement of all the required Plug-In 26 processes.

By using two computers in this topology, each with a mirror installation software components, each mobile device 20 may be provided with an option to authenticate against either of the two gateways 14 and then perform an exchange of data using a specific Plug-In 26 process on either one of two servers 12. This provides an advantage over the single computer installation (FIG. 3) by providing, among other things, improved fault tolerance. In practice, implementation of the dual host computers 10 helps to prevent interruption of services to mobile devices 20. This redundancy provides for continued services without requiring any immediate intervention by support staff during failure of one of the host computers 10.

Among other things, implementation of dual host computers 10 provides for greater scalability by allowing the peak communications and data processing load to be spread between two (or more) computers.

Component Level Review. Some of the foregoing components and features as well as some additional components and features is now described in more detail (which are also to be construed as non-limiting and merely illustrative).

The Gateway 14. The gateway 14 is a server-side application that functions as an entry point into the computing system 5. This application may run as a service in the operating system of a server-side computer 100, so it does not require a user interface. Each client 43 that submits a request 49 to establish a connection and exchange data 48 in the computing system 5 first connects to the gateway 14 for authentication and forwarding 41. The gateway 14 may also be used to implement push messaging features. The gateways 14 provide the direct push capabilities needed to deliver messages to clients 43 running on targeted mobile computing devices 20 that are accessible within the computing system 5. Push messages are a feature of the computing system 5 that allows the host computer 10 to initiate on-demand communications with a mobile business application 44, as opposed to having to wait for the mobile business application 44 to connect to the server 12. Push messaging provides for greater responsiveness and faster business process execution in a mobile device infrastructure 2.

The Server 12. The server 12 is an application that accepts and handles requests 49 from the client 43 that are redirected from the gateway 14. The server 12 runs as a service in the operating system of a host computer, and hence does not require a user interface. Each mobile device 20 requesting exchange data 48 within the computing system 5 provides a process identifier with each request 49 (called a "process number"). The process number identifies a particular process plug-in 26 that shall be used to handle the request 49 on the server 12. Each request 49 is redirected by the gateway 14 to the server 12 together with an associated process number. The server 12 then uses the process number to determine an appropriate process plug-in 26 to be invoked, thereby allowing the bidirectional flow of business data between the server 12 and the client 43 on the mobile computing device 20.

The Server Console 27. The server console 27 is a server-side application that is generally installed on the same computer 100 as the server 12. Because the server 12 runs as a service on the operating system and does not require a user interface, the server console 27 may be used to provide a view into the operation of the server 12. The server console 27 provides a near real-time, continuous, read-only visual monitor of the communications processing taking place on the server 12. The server console 27 allows observation of handling of communications by the server 12 during daily operations. The server console 27 also provides a detailed view into data being transmitted within each communication session and therefore may be useful when seeking to identify a source of any connection or data management problems.

The Remote Assist Server. The remote assist server is an application that runs as a service in the operating system of a host computer 10. The remote assist server acts as a bridge between the remote assist console application and the client 43 running on a given mobile device 20. Remote assists sessions are driven and controlled through the remote assist server. To use remote assist features in the computing system 5, the remote assist server must be active.

For implementations of the computing system 5 which utilize more than one server 12, it may be useful to install the server console 27 on a remote computer (such as the desktop computer of the mobile computing system administrator) and then register each server 12 to that server console 27 so there will be a single point for server monitoring 24.

The Remote Assist Console. The Remote Assist Console is a Microsoft Windows application (licensed separately) that allows remote assist operators to collaboratively support users of the mobile communication system. Remote assist operators can, for example; remotely connect to and control multiple mobile devices 20; invite other operators to a remote assist session to collaborate and solve problems; initiate a connection to a mobile device 20 and remotely see and control a screen of the mobile device 20 without any interaction with the user; get and send files using standard Windows applications; record video or take screen shots of a remote assist session; as well as other similar tasks.

The System Monitor 24. The system monitor 24 is an application that provides a basic visual indicator of the operating status of servers 12 and gateways 14 within a single computing system 5. The system monitor 24 application is generally installed on a host computer 10 as the system manager 16. However, the system monitor 24 may be installed anywhere where a central monitoring dashboard for the computing system 5 is desired.

The Plug-In 26. The plug-in 26 is an application that is designed to run on the server 12 in the core infrastructure 1. Generally, the plug-in 26 is provided with a specific version of an enabled mobile application 44. The system manager 16 loads files for the plug-in 26 into the computing system 5, which then stores these files and related information in the database 15. Based on the settings defined in the system manager 16, remote servers 12 will automatically extract program files ("plug-ins" 26) from the database 15 and install those files on a local host computer 10. Each installed plug-in 26 is then automatically called by the server 12 to process a specific request (identified by a unique process number) sent to it from a mobile business application 44.

Generally, the plug-in 26 performs the processing of the business data that is exchanged for each request 49 from the client 43. Thus, the plug-in 26 receives data associated with each request 49, processes the data in accordance with programmed business data processing logic and, in some embodiments, responds to the request 49. The processing performed by the plug-in 26 may be limited by, for example, needs of the developer, and resources in the computing system 5.

It is not required that each plug-in 26 be dedicated to processing a single type of request 49. For example, the plug-in 26 is not limited to processing requests 49 that are associated with only one process number. Thus, a single plug-in 26 may support multiple process requests 49a, 49b (multiple types of requests from the mobile business application 44) with each process request 49 in the plug-in 26 having its own unique process number. The extent to which process requests 49 to be handled are aggregated into a single plug-in 26, or conversely the extent to which each plug-in 26 is atomized to handle only one specific process request 49, is discretionary.

It is not necessary that each plug-in 26 run continuously on the server 12. Rather, a separate copy of the plug-in 26 may be loaded into memory 250 and run each time the server 12 calls the plug-in 26 to process a new request 49.

The server 12 creates as many independent, virtual clones of a plug-in 26 as are needed to manage incoming requests 49. The plug-in 26 can exchange data 48 using any number of methods such as the transmission of a file, the direct manipulation of records in a database, interacting with a web service or parsing an XML document and executing a remote function call to a host system. Because the plug-in 26 contains the intelligence to understand the data that is being passed to it, the plug-in 26 can process the data in an event driven style, performing different tasks and starting and stopping different auxiliary systems based on the data and when it is received.

From the foregoing description, it is seen that the plug-in is a special program that is placed into memory by the server 12 when the server receives a request that a communications session be handled by that plug-in. The request illustratively calls for the plug-in by process number, a process name, or by some other form of identification. In addition, the process requested may be but one of a plurality of processes that may be encapsulated in a single plug-in. For example, a plug-in could be named "SAP Integration" and contain a first process, Process Number 1000, named "Submit New Order to SAP", and a second process, Process Number 1250, named "Retrieve Inventory Status for Part No." Each of these Plug-In Processes are essentially atomized chunks of business data processing and integration logic. As described herein, the system itself is agnostic to any business logic—it does not understand the data it transmits. However, a plug-in process, as mentioned above, can interpret the data sent to it, and for example, connect to an SAP ERP host system, use the data received from the mobile application to retrieve new data from SAP, and then hand that data back over to the server for delivery back to the mobile application/device (all within a couple of seconds). Note that the plug-in itself does not contain rules for routing the data etc. The way connections are established and data is routed, is a function of the way the client and the gateway/server communicate together, using their own protocol that is separate from the data being transferred and separate from the data services protocol.

As described above and further below, the plug-ins do not contains rules; that is to say, rules are not updated on plug-ins. Rather, the only thing that plug-in processes receive is input in the form of data that is routed to it through the system (through the client and server) from a mobile business application. A plug-in process can also reference the system code associated with the communication session to identify the user for whom the data exchange is being requested. In addition, the plug-in processes can also obtain as input the value of any plug-in properties that the administrator may have defined values for through the administrator application.

The System Plug-In 25. The system plug-in 25 is a special type of application that is pre-installed with the server 12 and is used to perform system level functions. Exemplary system level functions include tasks such as deploying software packages to the mobile device 20 and remotely configuring the mobile device 20. The behavior of the system plug-in 25 program is controlled by the configuration settings defined in the system manager application 16.

The Test Plug-In. The test plug-in program, available with each computing system 5, is designed to work together with test client applications. The test plug-in program may be used, for example, to verify communications connectivity, and test over-all performance of the computing system 5 within a larger communications infrastructure.

The System Manager 16. The system manager 16 is a server-side application that operates as a control center of the computing system 5. Just about everything that can be configured, tracked and managed in the computing system 5 may be accomplished through the system manager 16 application. Thus, the system manager 16 is an important application available to the administrator of the computing system 5. In general, the system manager 16 is provided with a user-friendly, easy to navigate interface encompassing all modules and related configuration settings. The system manager 16 application may be installed on a separate desktop computer or notebook computer, but may also be installed directly on the computer where other system components, such as the gateway 14, or the server 12, are installed and running.

The system manager 16 application may also be installed on multiple computers 100 to provide a plurality of users with access (o system information. In some embodiments, each person that is added as a user of the system manager 16 is automatically assigned "reader" rights within computing system 5. Reader rights means the user has a read-only view of all configuration settings, while users assigned "administrator" rights shall have an additional option to modify the configuration settings of each module within the computing system 5. Generally, changes to the configuration settings defined in the system manager 16 are valid in the computing system 5 from inception, and therefore these changes will immediately be reflected in the behavior of the computing system 5.

In some embodiments, more than one user at a time may be logged into the system manager 16 as an administrator. If an attempt to edit something in the system manager 16 is made while another user is already editing that same information, or information which has dependencies on the settings you are trying to modify, the system manager 16 shall alert the user to a conflict.

The Packager. The Packager is a stand-alone application that permits bundling files into packages that can be loaded into the system manager 16 for automatic, remote installation to mobile devices 20. These packages may contain the files required to install a client 43, device driver 46 or a mobile business application 44. The Packager application where the files in a package will be installed to be defined, which files should be deleted from the mobile device 20, as well as modification of registry settings in the operating system. The Client 43. The client 43 is an application that is installed on each mobile device 20. The client 43 provides for processing of requests 49 from enabled mobile business applications 44, which may be hosted by any one of a number of device types including hand held computers, tablet computers, and notebook computers. The client 43 provides functionality at the level of the mobile device 20. In general, the client 43 includes one to many self-running mobile applications and DLL (Dynamically Linked Library) files that are installed on the mobile device 20. The client may also include other forms, including a library to be linked with the target mobile business application.

Executable files for the client 43 include functions that directly execute mobile communications. The executable files generally process in cooperation with the device drivers 46 to provide management of the mobile device 20. Functions of the client 43 may also be accessed programmatically from a mobile business application 44, such as via the data services component and associated interface components.

The functions of the client 43 are generally designed to automate steps required to establish a connection between a mobile device 20 and the gateway 14, which may be followed by a connection to a server 12, which will then allow for the reliable and secure exchange data 28 between the mobile business application 44 and the process Plug-In 26*a*, 26*b*. Therefore, the functions provided by the client 43 include those required to establish a connection to a gateway 14 and server 12 using a supported communications adapter on the mobile device 20, functions to manage the automatic exchange of data encryption keys, functions to perform the automatic compression and encryption of data sent by a mobile business application 44 over a connection, as well as functions for receiving and installing new mobile business applications 44 (and new versions of device drivers 46 and the client 43 itself) whenever packages containing these files are loaded centrally into the system manager 16.

he client 43 also performs changes in the configuration settings of the mobile device 20 based on how the device's property settings are defined in the system manager 16. Furthermore, the client 43 may perform dynamic selection of an appropriate connection path to be used between the mobile device 20 and a gateway 14/server 12 based on communication rules defined centrally in the system manager 16. Additionally, the client 43 may collect and transmit back to the server 12 all information regarding the operation of the client 43, as well as events logged by the mobile business application 44 and changes made to settings of the mobile device 20 so that this information may be viewed in log modules of the system manager 16.

Data Services 41. Data services 41 of the computing system 5 generally include a set of interfaces that provide for mobile applications 44 to use communications and data management functions. The data services 41 are included in a client-side executable file, and are part of the client 43. A data service Plug-In 26 is a server-side counterpart of the data service 41 on the client 43.

Mobile applications 44 may register themselves to use data services 41 by storing a configuration file in an application folder on the client 43. After an application 44 is registered to use data services 41, the application 44 can use data service command files to upload and download data (48), which provides for leveraging features of the computing system 5 without having to use low level programming interfaces.

The Device Driver 46. Each device driver 46 includes an application that is designed to work with the client 43 and control a specific type of mobile device 20. Device drivers 46 may be published, for example on the Internet 121, and downloaded as needed. Device drivers 46 so obtained may be installed into the computing system 5 to provide that system with the ability to manage new types of mobile devices 20. New and updated device drivers 46 may be installed using the system manager 16. When a new device driver 46 is installed, the system manager 16 reads the associated information file for the device driver 46 and uses this information to create new entries in the database 15. Entries in the database 15 show that a new type of mobile device 20 is now supported in the computing system 5, and any configuration properties that may be used to remotely modify and retrieve settings for the new mobile device 20.

The Loader 45. The loader 45 is an application that is installed on the mobile device 20 the first time the mobile device 20 is put into use. The loader 45 application is used on the mobile device 20 to register that device 20 to a specific computing system 5. After the registration has been processed in the system manager 16 by an administrator, the loader 45 can connect to a gateway 14 and server 12 for the first time. The loader 45 will automatically download and install to the mobile device 20 the latest versions of the appropriate software packages: the client 43, device drivers, 46, and a mobile business application 44 as well as retrieve the device settings defined for it in the system manager 16 and call on the device driver 46*s* to configure the mobile computing device and all peripherals in the device set. After an enabled mobile business application 44 is installed, this mobile application 44 and the client 43 will cooperate to perform any future software updates on the mobile device 20 as well as update device settings. Therefore, the loader 45 is needed only when a new mobile device 20, or fully reset mobile device, having only an operating system installed, is to be provisioned for use.

The Database 15. The database 15 is generally located on a host computer 10. In some embodiments, the database 15 runs on SQL Server (available from Microsoft Corporation of Redmond Wash.). Generally, the database 15 is the central structured repository of computing system 5 configuration settings that control how a given computing system 5 will operate. The database 15 also stores log transaction information that is created within the computing system 5, all software packages available for distribution to mobile devices 20, and all plug-in (25, 26, test) programs available within the computing system 5. The database 15 may be automatically created, such as during the initial steps of installation of the computing system 5, such as by using a system setup 23 application for the database 15.

Microsoft SQL Server. Components of the computing system 5 operate according to the configuration settings defined in the system manager 16 and stored in the database 15. The Microsoft SQL Server application, which is itself not a component of the computing system 5, handles requests 49 from applications of the computing system 5 to access the database 15. Therefore, the computing system 5 includes access to a properly configured and operational Microsoft SQL Server application and the database 15. Of course, the use of Microsoft SQL Server is merely illustrative and is not limiting of the teachings herein.

Mobile Business Application 44. The mobile business application 44 (or simply "mobile application" 44) is a software program that runs on a mobile device 20. The mobile application 44 is not a component of the computing system 5, per se, even though it can be designed to interact closely with computing system 5 (such as via the client 43) and is a part of a complete mobile business system solution. Indeed, the mobile application 44 may be directed to anything desired by users, developers and the like. The mobile application 44 may serve the needs of a particular industry or organization, it may be simple and require only regular batch transfers of data, or it may be complex and require many different types of on-line data exchanges 48. Enabled mobile business applications 44 that address a wide variety of business needs may be made available from third party developers. Regardless of the intended purpose and complexity, an enabled mobile application 44 is ready to take advantage of the communications, data and device management capabilities of the computing system 5. As discussed above, the mobile business application 44 may be distinguished from other types of applications, such as system applications, that fulfill other functions (such as system maintenance).

In one aspect of the disclosed system, a uniquely identifiable request 49 is used for an exchange of data. The communications process is initiated by the request 49 which identifies a process number (not shown) and which is made to the network 122 by the mobile business application 44 via the data service 41 that resides the client 43 on the mobile device 20. Each process requested by a mobile application 44 is identified by its process number. The network assigns the request 49 to a server 12 based on the process number, and in particular, assigns the request 49 to the server 12 having a plug-in 26 that is associated with the request 49.

The server down-loads to the data service data files contained in the data-plug and used by the data service to configure the mobile device 20 to enable the business application 44 to communicate with die network 122. In this way, the contents of the data files enable the mobile application 44 and the plug-in 26 to both become "aware and synchronized" with respect to how the data that is being sent by each side should be processed and responded to by the other side. The contents of the data files may be settings, data files, software updates, and anything else that the developers of the mobile application 44 and plug-in 26 agree to exchange to enable this communication. Once the mobile application is properly configured, the mobile application 44 and the plug-in 26 are able to freely communicate with each other.

The process request 49 may be as simple as uploading of a file from the mobile device 20 to the host computer 10, but the process request 49 may also be more complex. For example, the process request 49 can involve a series of integrated requests and responses such as when a person uses a mobile application 44 to interrogate an ERP application on-line over a GPRS connection to check the stock status of an item or post a new customer order and schedule product deliveries.

The system will support any and all data transfers with virtually any mobile application and any host system. The data can be text, XML formatted, binary, etc. It can also be pictures, movies, GPS data, device health monitoring data, as well as any other form of business or personal data. Hence, the plug-in may include data of a business or personal or other kind in a wide variety of formats including text, XML, binary, or other format. The process request 49 for the exchange of data 48 is initiated by the mobile application 44 and is routed to the appropriate server 12 and plug-in 26 for processing. Integrity of this process is ensured by use of a unique identifier (the process number).

Although illustrative, data is entered through the graphical user interface, it should be noted that not all data that is to be transmitted has to originate from user input through a mobile business application GUI. For example, data transmission could be triggered based on temperature sensors in the cold storage of a truck's trailer, and the data to be transmitted could be the Device ID, GPS location and temperature data from the sensors. As another example, a trigger may be based on a device location. In this case, a device entering into or out of defined zones (e.g., based on GPS coordinates), could trigger an automatic upload of all data from the device followed by a device wipe. None of these inputs may be user inputs yet each of these inputs could trigger a communication with the network as previously described in connection with automated, self-triggered transmissions.

As discussed, in the computing system 5, each process requested by a mobile application 44 is identified by its process number. Each process number is also associated with a plug-in 26. Thus, a method for establishing communication between a mobile device and a network using a process number which is always routed by the network to the server having the plug-in containing the process that is associated with that process number is provided. The plug-in 26 is responsible for managing the incoming process request from the mobile application 44 (receiving the data, processing the data as needed and responding to the received data as expected according to the data exchange interface agreed upon between the developers of the mobile application 44 and the plug-in 26).

Each plug-in 26 can support one or more processes based on the process numbers encoded in the plug-in 26. The system manager 16 may set rules for the plug-ins 26 installed on the servers 12 including the type of process request 49 and associated process number may be supported by each plug-in 26. The gateway 14 is responsible for authentication of any incoming data request. The gateway may redirect that request to a server 12 based upon which servers 12 are able to manage the incoming process.

Figure 5:
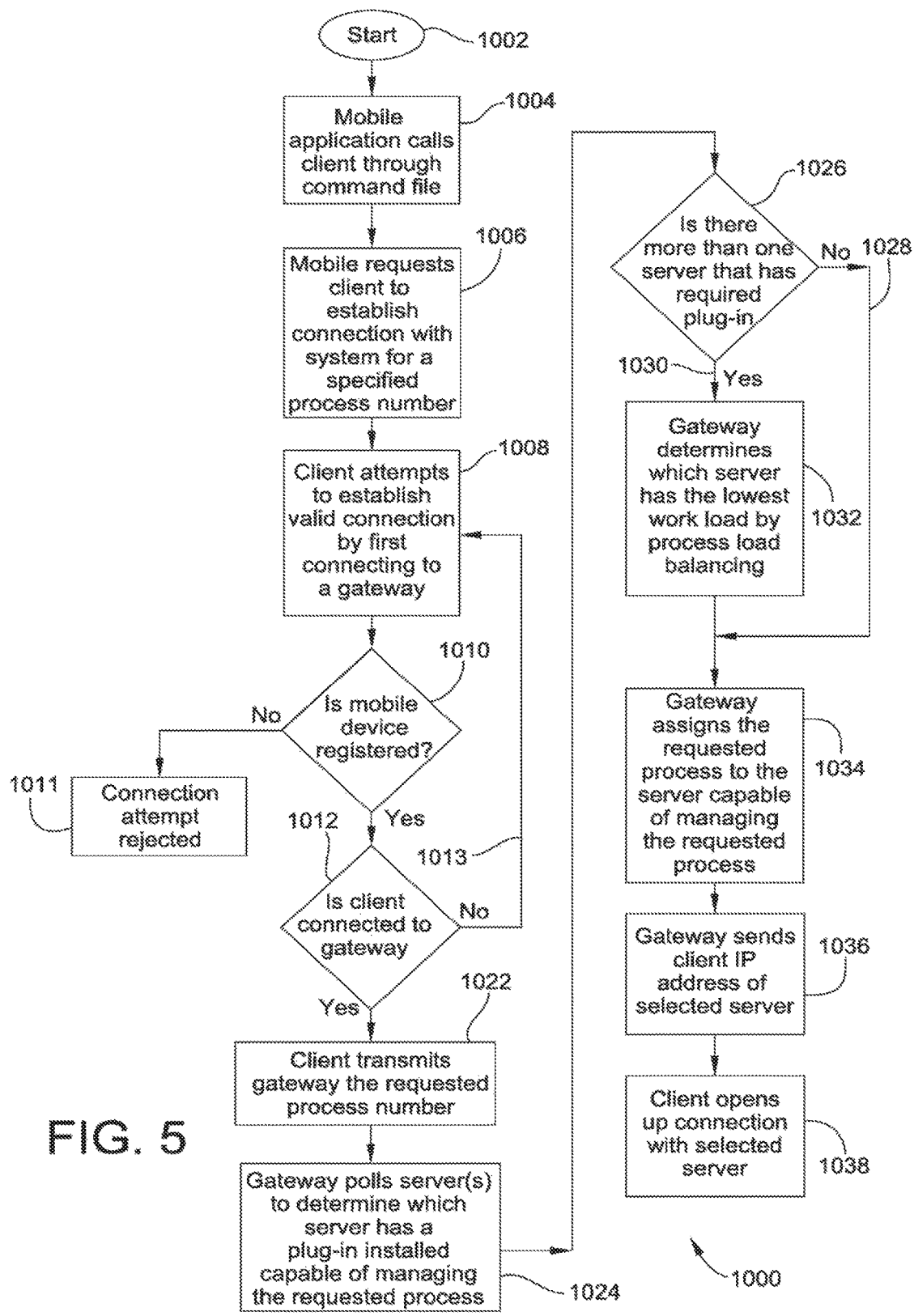
FIG. 5 illustrates use of a uniquely identifiable process request for exchange of data.

FIG. 5 is a flow chart that provides an illustrative method by which the system 5 may route an incoming data request 49 from a mobile application 44 to the server 12 for the purpose of opening up a connection path for communication between the mobile application 55 and the network. The process starts at step 1002. As indicated, at step 1004 the mobile application 44 that will exchange data with a server side computer 10 calls the client 43 through an XML interface of the data service (command file) (not shown). At step 1006, the business application 44 requests from the client 43, via the client XML file, to establish a connection to system (core infrastructure 1 in FIG. 2) for a specified process number. When the client 43 receives a request for a particular process number, from the mobile application 44, at step 1008, the client attempts to establish a valid connection to system (core infrastructure 1 in FIG. 2) by first connecting to the gateway 14 and transmitting to it the requested process number 50. The connection may be by LAN, WiFi, GPRS, or other manner of communication. In this example, it is noted that the business application is signaling the client to initiate the communication with the host system. However, the host computer 10 may also signal the client to initiate a communication session with the client by use of push technology as further described below.

At step 1010, the gateway determines if the mobile device has been registered. If the mobile device has not been registered, the process advances to step 1011 where the connection attempt is rejected. If the device has been registered, the attempt to connect is permitted.

A prerequisite to using the disclosed system is that the mobile device be registered with the gateway. Part of that registration process is the acceptance by the network manager of the request from a mobile device to register. Once registered, the manager assigns the newly registered mobile device appropriate device set templates for provisioning with appropriate device settings for use in the disclosed network communications. Particulars on how a device setting may be used in the management of network communications can be found in application entitled "System and Process for Managing Network Communications" filed contemporaneously herewith which is incorporated herein by reference.

As previously indicated, if the device has been registered, the attempt to connect is permitted and the mobile device can attempt to make a connection with the gateway. At step 1012, if the client is unable to get connected to the gateway, the client returns to step 1008 to attempt to establish a valid connection to the gateway. Once the client establishes a valid connection to the gateway at step 1012, the client transmits to the gateway the requested process number. At step 1024, the gateway polls the servers to determine which servers has a plug-in installed that is capable of managing the requested process. At step 1026, the gateway determines if there is more than one server that has the required plug-in. If the gateway determines that there is only one server that has the required plug in, the process advances to step 1034 where the gateway assigns the requested process to the server having the required plug-in. If at step 1026, the gateway determines that there are more than one server having the required plug-in, the process advances to step 1032 determines which server has the lowest work load by a process of load balancing. At step 1034 the gateway assigns the requested process to the server capable of managing the requested process. At step 1036, the gateway forwards to the client the IP address of the server that the gateway has assigned to manage the communication with the client. At step 1038, the client opens up a connection with the selected server. The gateway 14 is assigned management of the process to server 12 at step 1034 and the forwarding of that IP address of the server to the client that allows the client to open up a connection with the selected server in step 1038. In a private network, the gateway 14 will forward the IP address of the server directly to the client 43. Provisioning of the client 43 with the IP address of the selected server 12 for a public network is described in greater detail below.

As previously discussed, the device driver 46 is an application designed to work with a respective client 43 and control a specific type of mobile computer 20. The device driver enables the client to interact with the mobile computer supported by the driver. The driver application is not registered; rather the client can capture unique information about the mobile computer (e.g.,. its serial numbers) and submit those device identification credentials to the network where they can be accepted or denied by the administrator. Mobile computers that are successfully registered in the system, that is to say, approved by the administrator, can be provisioned for use and begin to exchange data.

In this way, the gateway 14 uses the process number 50 to determine an appropriate server 12 to which the given client 43 may be directed. The gateway 14 determines which server 12 should be used by the given client 43 by determining which servers have a plug-in 26 installed that is capable of managing the requested process, and also taking into consideration which one of these servers 12 presently has the lowest work load according to a load balancing process.

As described above, the mobile application 44 that wants to exchange data 48 with a host computer 10 must make a request to the network to initiate the communication. The mobile application request will identify a process number which will identify to the network the rules that the system has established for the mobile device on which the mobile application resides to communicate with the network. The disclosed system imposes these rules on the mobile device through the system manager 16 in three steps. First, the system manager will code into the system the rules that will apply to the process number associated with the plug-in. Second, die system will route an incoming data request to a server having the plug-in that is associated with the process number identified in the data request. Third, the system will establish a connection between the requesting mobile device and the server on the basis of the rules that the system manager 16 has set for and coded into has assigned the plug-in. By associating communication rules with a process number, storing that process number in a plug-in, and requiring an incoming message from a mobile device to identify that process number in its request for communication with the network, the system 5 may advantageously manage communications between the mobile device 20 and server 12 in the network 122 according to rules. As previously discussed, rules may be coded by the system manager 16 into the plug-ins 26. This is not the case with process numbers which are assigned and used by mutual agreement between the developer of the mobile application 44 and the developer of the plug-in 26 program. More specifically, process numbers are embedded in these cooperative programs and are not modifiable using the system manager 16.

To install a plug-in 26, the system manager 16 will select a PLI file (plug-in information file) for the plug-in 26. The PLI file contains the information needed to install the plug-in 26, such as process numbers, process versions, process properties, process descriptions etc. The system manager 16 will store this information in the database 15 together with a binary copy of the plug-in program 26. The system manager 16 will determine which server or servers will be assigned the plug-in and program that information into the system manager, the plug-in program 26 is automatically installed on a server 12 based on the coded assignment. Once the plug-in program 26 is installed, the system manager 16 may select the property settings, connection paths, and other rules for the plug-in 26 that are to govern the connection that the system may establish between the mobile device with the requesting mobile application and the server. The system provides process load balancing and active fail-over. The particulars are disclosed in application Ser. No. 13/494,978 entitled "Communication Protocol and System for Network Communications" filed contemporaneously herewith incorporated herein by reference.

The Connection Path. A connection path specifies the type of connectivity that can be used by a mobile device 20 to connect to a gateway 14/server 12 to exchange data with each process request 49. It is the type of connection that is available on the network and also supported by the computing system 5 on each mobile device 20. Examples of a connection path may be GSM modem, Ethernet LAN adapter, and an 802.11 Wi-Fi radio. A mobile device that has a built-in and supported GSM modem only, may have the capability of establishing a GSM connection path for communication with the network. A mobile device that has a built-in and supported GSM modem, Ethernet LAN adapter, and an 802.11 Wi-Fi radio has the capability to establish three different types of connection paths for communication with the network 122. However, the capability of the mobile device 20 to establish a particular type of connection with the network 122 does not necessarily mean that the mobile device 20 will be able to establish those connection paths for communication with the network 122. Those connection paths are also governed by the rules that the system manager 16 may impose on those connection paths. For example, a mobile device 20 that has a built-in and supported GSM modem, Ethernet LAN adapter, and an 802.11 Wi-Fi radio, may establish connection paths using all three communication types only if the rules that the manager imposes on that mobile device 20 permit it. If the system manager 16 permits the mobile device 20 to use only the LAN, then the GSM and Wi-Fi radio may not be used to establish communication with the network 122 under the disclosed system 5.

This feature of the system 5 provides a powerful way to manage mobile devices 20 that are operating inside the system 5. No longer is connection of a mobile device 20 determined by the capabilities of the mobile device 20 alone. In the disclosed system, the mobile device 20 must always operate within the system in accordance with the rules that the system manager 16 imposes on the mobile device 20 inside the system. The rules for engagement of a network device inside the network are thus seen to overlay the ad hoc uses that a mobile device 20 typically makes inside of a conventional network. This allows more of the control of mobile devices 20 within the network to be centrally managed by the network. The result is a network that may impose greater control over the operation of mobile device 20 inside the network. The ability of the system manager to impose rules on network devices opens up the possibility of controlling the operation of network devices based on a wide range of conditions.

Figure 6:
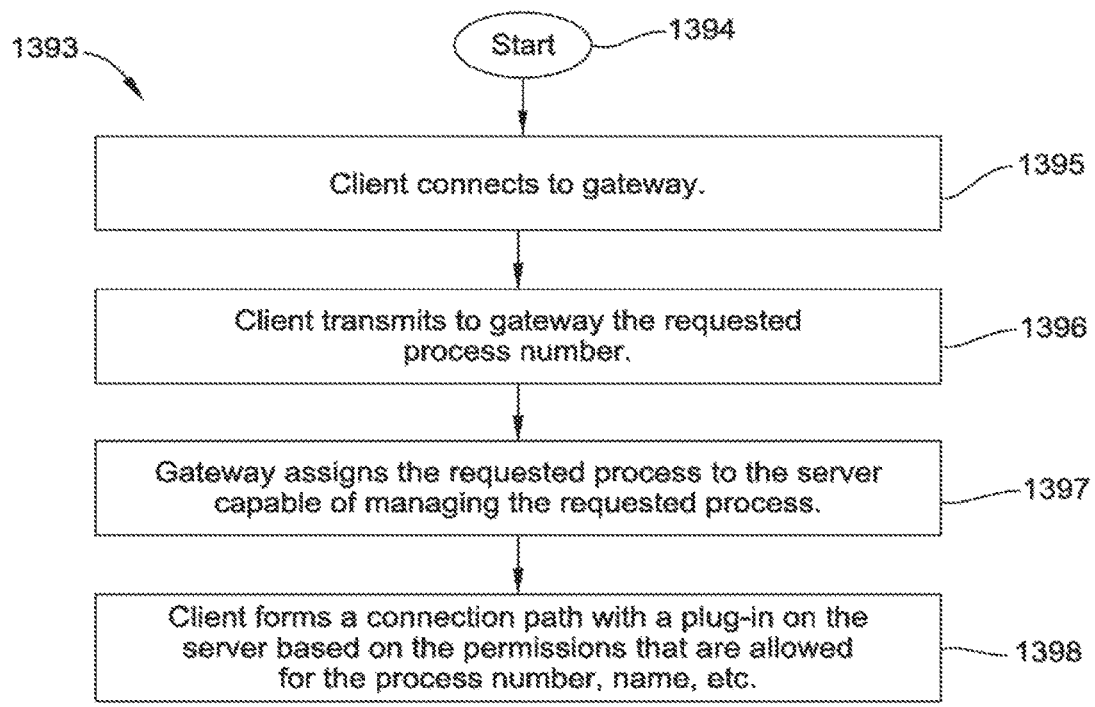
FIG. 6 is a flow chart depicting routing of a data request to opening of a communications path.

FIG. 6 shows the process 1393 by which a communication path or channel is established between the client 43 and the core infrastructure 1. The process starts at step 1394. At step 1395, the client 43 establishes a connection with the gateway 14 after initiating a session with the gateway 14, provided the mobile device has been properly registered with the system as previously discussed. At step 1396, the client 43 transmits to the gateway 14 the requested process number. At step 1397, the gateway 14 assigns the requested process to the server 12 capable of managing the requested process (see step 1034 in FIG. 5). At step 1398, the client forms a connection path with a plug-in on the assigned server 12 to manage the process requested by the client 43 for the purpose of establishing the process requested by the client 43 based on the permissions that are allowed for the process.

From the above description, the connection path is seen to be established from the client on the device to the plug-in process, running on a server. The plug-in process is identified by a process number (but could also be by a process name, etc.) which contains the logic to receive, interpret, transform, and respond to the data sent by the client (on behalf of the mobile business application). The plug-in process may also connect to other server-side host systems to submit data or retrieve additional data requested by the mobile business application.

Using the system manager 16, it is possible to set the permissions or rules that may apply to a process. For example, the rules may define the times during which a particular connection path will be available for use by the client 43. This allows a system to define when the client 43 will be able to establish certain types of network connections for specific plug-in processes 26, thereby allowing greater control over which data (based on the process number) will be exchanged over which communication infrastructure and when such an exchange of data may occur.

As previously discussed, one illustrative rule that may be imposed on a mobile devices 20 in the network is based on the type of connection path that the mobile device 20 may establish on the network. Another rule that may be imposed on a mobile devices 20 in the network is based on the time of day during which the mobile device 20 may be used on the network. For example, the disclosed system may impose a rule on a mobile devices 20 in the network that prohibits a connection path based on a GSM radio being used for downloading of large catalog files during business hours. This purpose for the rule may be to avoid the expense of tying up valuable GSM air lime for this kind of task during business hours which may be more expensive. The rule that the system manager 16 may impose in this case may permit a connection path based on GSM to be used to download large catalog files only between the hours of 5-7 pm.

Is yet another rule that may be imposed, is a rule that assigns priorities to different connection paths that the mobile device 20 may be allowed to establish between the mobile device 20 and the server 12. For example, the system manager 16 may allow a network mobile device 20 that has a built-in and supported GSM modem, Ethernet LAN adapter, and an 802.11 Wi-Fi radio to use all three forms of communication to establish connection paths for communication with the network. In order to provide an orderly use of all three connection paths by the network device in the network, the system manager 16 may impose a rule that prioritizes the type of connection paths that the mobile device may use in the network. In the example involving the downloading of catalog files, the system manager may assign the highest priority to the LAN connection path, a secondary priority to the Wi-Fi connection path, and the lowest priority level to the GSM connection path. If at the time of the attempted downloading of large catalog files, all three connection paths are available, the system rule requires the mobile device 20 to use the LAN connection path to download the large catalog files. If only the Wi-Fi and GSM connection paths are available, then the download will occur by Wi-Fi under the rules. Only if a LAN connection and a Wi-Fi connection are not available will the GSM connection path be used such as when the user of the mobile device 20 is located inside of a hotspot, then the mobile device 20 will attempt to connect to the Wi-Fi connection path.

The foregoing discussion illustrates that it is possible to define in the manager more than one connection path to be made available for each particular process number and also set a priority for each connection path. When the system manager 16 defines multiple connection paths with different priorities for a given process, the client 43 on the mobile device 20 will always attempt to establish a connection for the requested process, in the defined order of connection path priority.

It is also illustrative that that the network connection path priorities are defined based on the administrator's preferences for having the data that will be exchanged as part of a requested plug-in process to be routed in some order of priority, through one of a plurality of supported network type connections (GPRS, WiFi, etc.) In addition, by excluding a supported network connection type from the list of defined connection paths, the administrator can restrict the data that is exchanged in a selected plug-in process from being transmitted through that type of network connection. For example: if the GPRS network connection type is removed from the software update plug-in process, then the client on the device will receive this information as part of the administrator defined communication rules and this restriction will not allow applications on the device to request software updates from this plug-in process, through a GPRS network connection.

Hence, from the foregoing description and description below, a connection path may be essentially a combination of a type of network connection, a plug-in process and a priority, which together with some additional properties including time, etc. can be used to control what plug-ins can be reached through what type of network connection. This information is used by the client to control what network connections it establishes and which plug-in processes can be requested through each connection.

Figure 7:
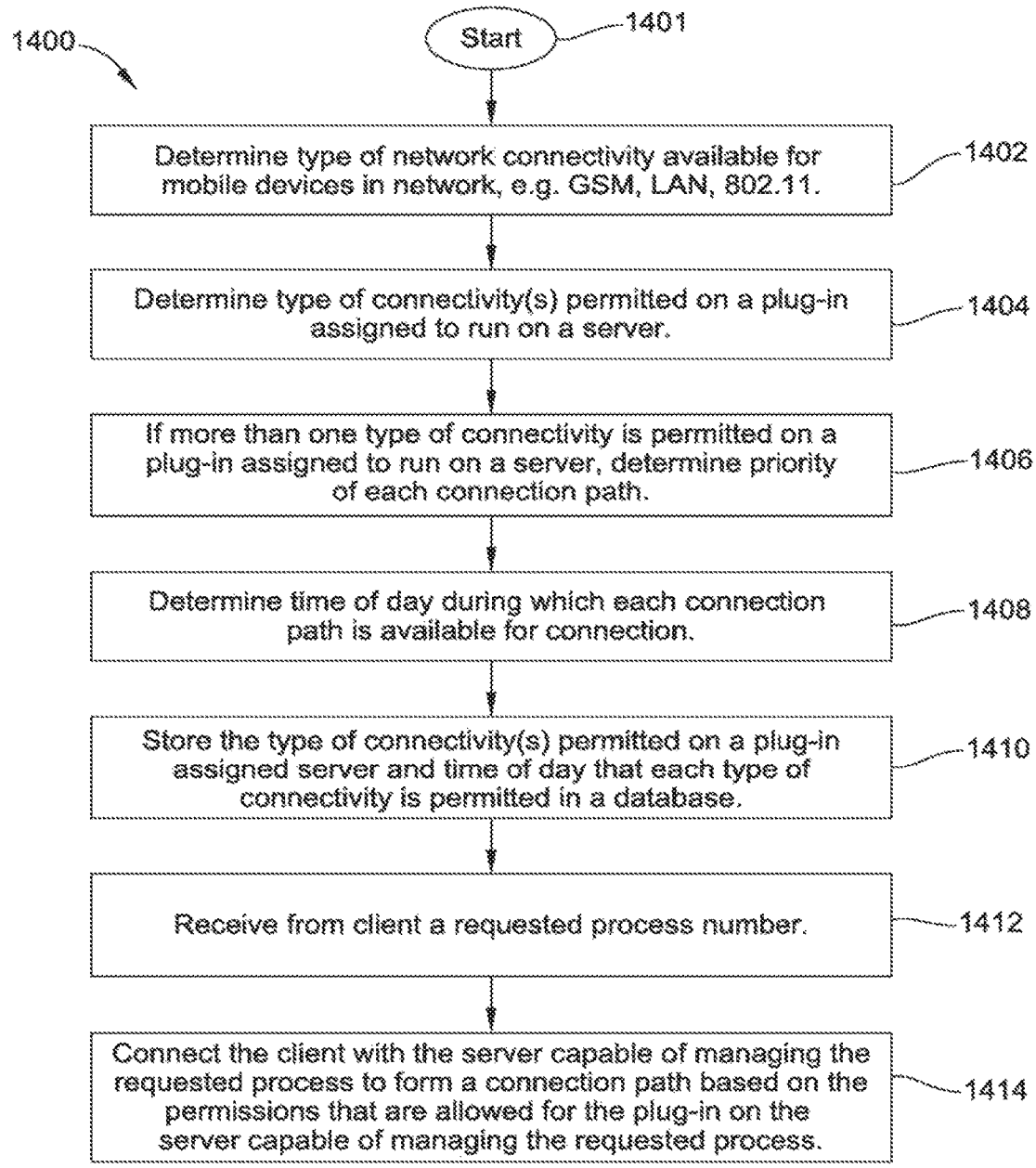
FIG. 7 is a flow chart depicting a process for managing a request from a client by a network according to the present disclosure.

FIG. 7 shows the assignment of a connection path to a client based on the permissions that are allowed for the Plug-in 26. The process starts at step 1401. At step 1402, the server 12 determines the type of network connectivity available for mobile devices 20 in the system 5, such as GSM, LAN, 802.11. At step 1404, the system 5 determines the type of connectivity permitted on a plug-in assigned to run on a server. At step 1406, if the server 12 determines that more than one type of connectivity is permitted on a plug-in 26 assigned to run on a server 12, the server 12 will determine the priority of each connection path. At step 1408, the server 12 will determine the time of day during which each connection path is available for connection. At step 1410, the server 12 stores the type of connectivity(s) permitted in a plug-in 26 assigned to a server 12 and the time of day that each type of connectivity is permitted in a database 15. At step 1412, the server 12 assigned by the gateway 14 has a process number requested by the client 43 receives from the client 43 the requested process number. At step 1414, the server 12 capable of managing the requested process (which the gateway has assigned the management of the requested process) opens a communication channel with the client 43 to form a communication path based on the permission that are allowed for the plug-in 26 on the server 12.

The following is an example of a set of rules that a system manager 16 may assign to a plug-in 26 that contains the process that the client 43 may request by a process number. In this example, the process is the downloading of a large product catalog file to a mobile device 26. The mobile application 44 may request (this process by process number. According to the rule defined by the system manager 16 for this process, this process should not be allowed during specific times of the day. For example, the process is not allowed between 5 am and 6 pm, during normal working hours when an organization's communication infrastructure is already strained with routine business data transfers. The rule further requires that at the off-peak times when this process is allowed, the client 43 must follow these connection path priorities—namely, first try to connect using the LAN adapter of the mobile device 20 if a LAN connection is available since it is the most efficient, as a second best alternative try to connect using the 802.11 Wi-Fi radio in the mobile device if a Wi-Fi access point is available, and only as a third and least desirable alternative, try to connect using the GPRS radio in the mobile device 20.

Figure 8:
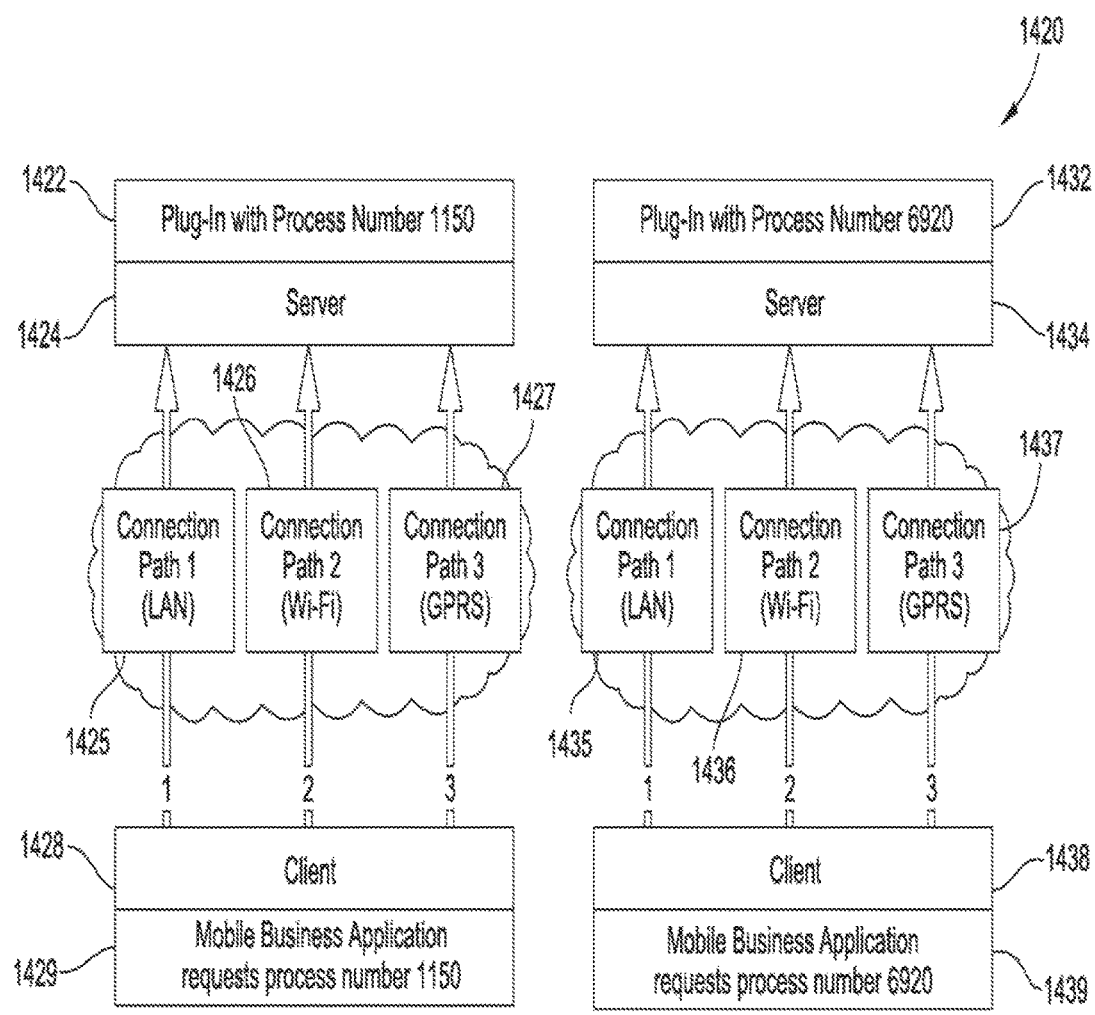
FIG. 8 is a flow chart depicting a process for managing a connection path according to assigned permissions.

FIG. 8 shows the connection path scenarios for this example in a system 1420 that applies this rule to two plug-ins—a first plug-in with process number 1150 depicted as element 1422 and a second plug-in with process number 6920 depicted as element 1432. For the first plug-in 1422 with process number 1150, a server 1424 is enabled to open up three connection paths 1425, 1426, and 1427 for any client that requests process number 1150. Connection path 1425 is for LAN communication, 1426 is for WI-FI, and connection path 1427 is for GPRS. The connection paths may be opened up only during the off-peak hours which according to the example would be between the hours of 6 pm and 5 am. In addition, the rule requires that the connection paths be used in decreasing priority based on the above defined preferences, so that the rule would require the use of the connection path using LAN as priority 1, the one using the Wi-Fi as priority 2 and the one using GPRS as priority 3. Finally, the rule allows the process number that is used by the mobile application to request and receive the large product catalog file from the plug-in to download that catalog by way of all three connection paths.

In the example, a mobile business application 1429 has requested the process number 1150 through client 1428. As previously discussed, this request was made by an API to client 1428 after first initiating a communication session with a gateway (not shown). The gateway has assigned the management of the plug-in with this process number 1450 to server 1424 in this example. If the request of the business application 1429 is made between the hours of 5 am and 6 pm, the communication would not be possible since no connection paths are permitted to be set up by the server during these hours according to the rule. Between the hours of 6 pm and 5 am when the rule permits the server to set up connection paths for process number 1450, the server is enabled to set up either of connection paths 1425, 1426, and 1427. The specific connection path that will be set depends on the availability of LAN, WiFi and GPRS functionality to the mobile device in which the mobile business application 1429 resides. If all three are available, then connection path 1 denoted by the element number 1425 will be used by the client for the download. In other words, the assignment of process number 1150 to connection paths 1 and 2 and 3 in the manager forces the client to first attempt to establish communications for this process using a LAN network and if this is unavailable to use Wi-Fi and if that too is unavailable then to use GPRS. If only Wi-Fi and GPRS is available, then the manager will force the client to establish connections for this process using Wi-Fi, that is by path 2 denoted by element number 1426. If GPRS is the only communication means available, then the manager will force the client to establish connections for this process using GPRS, that is by connection path 3 denoted by No. 1427 to enable mobile business application 1429 to receive process 1150.

In a similar way, the specific connection path that will be set by server 1434 which is managing the plug-in with process number 6920 designated by the element number 1420 depends on the availability of LAN, Wi-Fi and GPRS functionality to the mobile device in which the mobile business application 1439 resides. If all three are available, then connection path 1 denoted by the element number 1435 will be used. If only Wi-Fi and GPRS is available, then connection path 2 denoted by element number 1436 will be used. If GPRS is the only communication means available, then the server will setup connection path 3 to enable mobile business application 1439 to receive process 6920.

As FIGS. 2 and 8 show, the foregoing rules configured the system to allow the large catalog file to be downloaded to a mobile device only during off-peak hours using all three available communication types, however forcing the client to automatically first attempt to download the file using a LAN connection, followed by a Wi-Fi connection and lastly if the prior two connection types are not available then to try to connect and download the file using GPRS. Hence, the protocol of this disclosure provides a platform for enabling the manager assignment of process numbers based on time of day, manner of connection, and other events to control mobile communication costs. For more on automatic triggering of data refer to application Ser. No. 13/494,969 entitled "System and Process for Managing Network Communications" filed contemporaneously herewith which is incorporated herein by reference.

Some other events may include but not be limited to the user of the device, the geographic location of the device—GPS, etc., as well as based on device events, such as a change in device health, reaching some threshold on battery power, signal strength, etc. For example, if battery power falls under 15% shut down the GPRS radio; or if the device happens to exit a defined GPS zone then the protocol could force communications to upload all business data from the device and wipe the device clean of any data.

Figure 9:
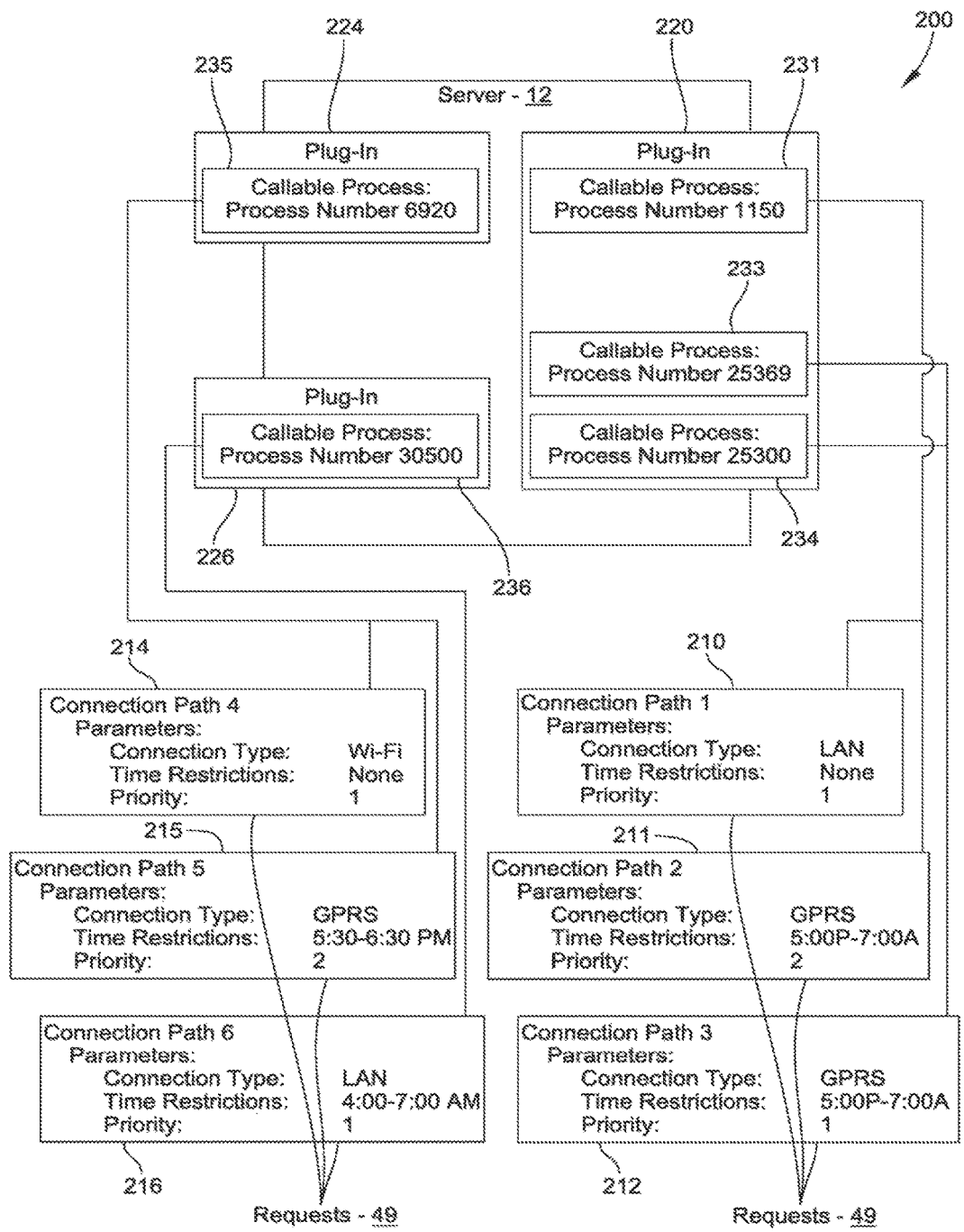
FIG. 9 is an illustration of communications conducted according to assigned priorities.

FIG. 9 further illustrates the use of rules by the network in managing network terminals. As previously discussed, each plug-in 26 can support one or more processes based on the process numbers encoded in the plug-in 26. In this example the manager has installed three process numbers 231, 233, and 234 on plug-in 220. The manager has also defined two additional plug-ins 224, 226. All of these plug-ins reside on server 12. As also previously described, a data request 49 must identify a process number in the data request. In addition, each connection path is defined by the sum total of the rules that are imposed on the connection. This is shown by there being two connection paths—namely, connection paths 1 and 2—associated with plug-in 220, and two connection paths—namely, connection paths 4 and 5—associated with plug-in 224. Both connection paths 1 and 2 were initiated by a data request for the same process number which called the same plug-in, plug-in 220 in this case, and which data request was routed to the plug-in 220 by the network for download of the content from files contained on the plug-in 220. But the rules imposed a connection type rule that connection path 210 be a LAN connection, assigned the LAN connection a priority of 1, and placed no time restriction on the connection with the network. On connection path 211, the rules imposed on connection path 211 are a GPRS connection, restricted for use between 5 and 7 am with a priority of 2. Thus, a data request for process number 1150 will always use connection path 1 provided the LAN line is available. If it is not available then connection path 2 will be used but only between the hours of 5 and 7 am. If neither is available to the device 20, the client returns an error message to the mobile business application 44 indicating that no connection can presently be established for the requested process. Connection paths 4 and 5 illustrate a similar principle. Both connection paths are initiated by a call for the same process number. Connection path 4 which has the highest priority and has no restriction and will always be used provided that Wi-Fi is available. If it not available then GPRS may be used to form a connection path 5 but between 5:30 and 6:30 pm.

As yet another illustrative rule that may be imposed by the system manager, the manager may allow to or more connection types to be used under certain circumstance. For example, in the case where a user was trying to download a large catalog or other large document, the system manager may allow two or more connection types to be used for the download. Thus, the mobile device 20 may be downloading the large catalog in two parts over two connection paths at the same time; shortening the time for the download and increasing efficiencies. Many rules may be defined by the system manager and imposed on network device, giving the system manager 16 greater control over network devices; creating efficiencies and cost savings.

The system manager 16 may be used to define the rules but illustratively these rules may be stored in the client 43. Thus, in the foregoing examples, it is the client 43 that, based on its locally stored communication rules, determines that a requested process can be handled through one or more connection paths establishes a connection with the network based on the connection type, time permissions, priority and other rules that have been assigned for a connection of a business application on the mobile device for a specified process in the network. The client 43 steps through the connection paths in the order of their defined priority to determine which connection to use based upon the rules imposed by the system manager on the device. If no network connections are available, time restrictions, or some other rule applies that prevents the client from establishing a connection with the network at that time, the client will report an error to the mobile business application 44. The particulars of the operation of a client 43 in the network are disclosed in application Ser. No. 13/494,969 entitled "Data Service On a Mobile Device" filed contemporaneously herewith and are incorporated herein by reference. As previously discussed, the disclosed system may use system plug-ins 25 that contain special processes which are used to exchange system data (not business data) between servers 12 and clients 43. These system plug-In 25 processes may have reserved process numbers (such as process numbers starting with 32768 and higher) in order to maintain organization within the computing system 5. It is possible for the system manager 16 to define rules for system plug-ins 25 also that create more efficiencies for the network.

Plug-in processes; device set templates and uses; user specific system codes; enhancing connectivity by use of push messaging; replicating device configuration settings for mobile devices; and use of reassignable TCP/UDP Ports will now be discussed.

Plug-In processes. The plug-in programs that are provided together with each mobile application 44 can be run on any host computer 10 on which the server 12 is installed. In an installation involving a single host computer 10 (see FIG. 3), all of the plug-ins 26 run on the one host computer 10. In a multi-computer installation (see FIG. 4), the plug-ns 26 may be run on any of the host computers 10 that run an implementation of the server 12. Note that in order for a plug-in 26 to run on any specific server 12, the plug-in 26 must first be loaded into the system manager 16, have at least one of its processes assigned to that server 12, and, if that process has any required properties, then those properties must be appropriately configured so that the plug-in 26 can run correctly.

In deciding which plug-in 26 processes to run on which host computer 10, a number of factors may be considered. For example, if fault-tolerance is desired for each plug-in 26, the respective plug-in 26 should be assigned to more than one host computer 10; complex plug-ii 26 processes (e.g., those which are processor and/or memory intensive) should be assigned to host computers 10 that provide adequate processing power and memory to execute the instructions of the plug-In programs at the desired speed; an impact of processor and memory demands of other applications running on the host computer 10 should be considered (e.g., if the host computer 10 is also used to run the Microsoft SQL Server application for access to the database 15); if the plug-in 26 process will interact with an external data source or application (such as an SQL Database or an ERP application), then the plug-in 26 must be able to reach the data source or application from the host computer 10 onto which it is installed; if a plug-in 26 process interacts with an external data source that must be accessed at a remote location, it may be beneficial to have the respective host computer 10 physically located close to the data source to minimize demands for bandwidth; and if a response time for a particular plug-in 26 process is important (such as for a plug-in process that handles on-line in-field credit checks by a GPRS communication path) then assuring availability of computer resources at appropriate times (i.e., during peak loading) may call for assignment to a dedicated host computer 10. Of course, recommendations or requirements specified by the developer should also be considered.

Actual balancing methods used to control processing load of individual host computers 10 within the computing system 5 may be managed by modifying the properties of each server 12 and associated plug-ins 26 as well as selecting the preferred load distribution strategy. Settings for managing these properties may be controlled through the system manager 16.

FIG. 10 illustrates some rules that a system manager 16 may program into a plug-in 26. The rules may include, but are not limited to connectivity permitted, connectivity priority, connectivity availability, data to be managed, system code, process number, process version. The connectivity permitted may include GSM, LAN, 802.11, etc. The priority applies is used by a client if two or more permitted connectivities take priority over the other. The connectivity availability is the time that the connectivity is available, such as 5-7 pm; the data to be managed;. The system code is described below. The process number is described hererin; and process versions also described herein.

Device Management. Setting up mobile devices 20 for operation is accomplished through device management features, which are generally accessible through the system manager 16. Device provisioning 47 (setting up) generally includes such tasks as installing/upgrading the software that will run on each mobile device 20 as well as configuring settings of each mobile device 20 so that the device will operate as required by the software that will be used on the device. In some embodiments, administrators are provided with a graphical user interface through which device management tasks can be remotely executed and automated. The resulting automated, remote device management provides for consistent execution of device provisioning tasks, making it easy to update device options and manage software deployments without the overhead and risks associated with developing custom device management scripts or the limitations of traditional device management software. Aspects of device provisioning 47 and device management are now discussed.

In order to use a mobile device 20 in the computing system 5, it must have appropriate device drivers 46 installed and then be registered in the system 5. In general, in order to install a device driver 46 and register the mobile device 20, necessary files for the driver 46 are provided in one directory folder which can be accessed by the system manager 16. The files describing each driver 46 may be in a common form, such as in XML format to provide for simple installation processing.

Generally, each device driver 46 provides some form(s) of functionality. For example, the device driver 46 may enable obtaining information from a device as well as applying specific settings to the device (such as to configure the device). Each driver 46 for a respective mobile device may include a compilation or list of properties where the driver provides some form of functionality. As a matter of convention, the properties for any given device are classified as one of "shared" and "individual." When a property of a mobile device is designated as "shared," then any modification to a value of the property may be inherited by all mobile devices 20 that share the respective device property. Device properties designated as individual will only be applied to the single device in which the individual device property was modified. Generally, the properties that may be accessed for any given device are determined by the developer of the respective driver 46.

Generally, each device driver 46 includes a classification for a respective mobile device 20. That is, each device may be classified as one of "primary" and "subordinate." In general, a primary device is a computing device on which software is executed. Primary devices may include, for example, any of: industrial handheld computers, PDAs, tablet computers, notebook computers and smart phones. A subordinate device is a type of device that does not directly execute software but may be installed into or attached to a primary device to extend capabilities of the primary device. Examples of subordinate type devices include wired and wireless network adapters, modems, bar-code scanners, RFID readers, mobile printers, and similar peripherals, accessories and other primary device options.

Accordingly, the system manager 16 provides capabilities for efficient management of mobile devices 20. By employing "device set templates" 71, the system manager 16 may take into account the various classifications and relationships of mobile devices 20, and control configurations in a variety of ways. In general, a "device set template" includes a plurality of properties for a given type of device (or devices). The device set template may be edited through, for example, the system manager 16, and more specifically, through a device set templates module of the system manager 16. Generally, updates to a selected device set template are automatically applied to the designated device(s).

FIG. 11 illustrates one device set template 71 comprising device set properties and the devices associated with that device. The devices include a primary device and a secondary listing of devices. The primary device in the device set template 71 is a mobile device having the indicated GPRS Access Point, modem name, connection name, password, IP address, and properties which are indicated to be shared. The secondary devices are listed as printer whose device property is indicated to be shared. This means that any modification to a value of the property may be inherited by all mobile devices 20 that share the respective device property. The secondary device further includes a scan reader whose device properties are indicated to be individual. In other words, any modifications to a value of the property will only be applied to this single device in which the individual device property was modified "Device sets" are identified and then updated by selecting an appropriate device set template and adding to the device set template those types of devices that match requirements of the selected device set template. A complete device set will continuously inherit all "device set templates" that may be used to update properties of a plurality of devices. In some embodiments, the system manager 16 provides for creating device set templates with a structure that is based on the types of devices already supported in the system 5.

In general, each device set template provides for one primary device and may also provide for one or more subordinate devices. Through a user interface in the system manager 16, the administrator is able to access and configure properties for a device. In this manner, the administrator is able to modify values of shared device properties in a device set template. Device configuration settings that will be used by all device sets and which share the same device set template may be modified.

The use of device set templates 71 greatly enhances the simplicity and efficiency of device management. Therefore, as a matter of best practice, a device set template 71 should be created to represent each different combination of devices that will share device settings. The administrator will then be able to modify shared device properties for each device set template 71 and have those property values automatically applied to all devices sets assigned to use that device set template 71.

Still referring to FIG. 11, this illustration shows a relationship between device sets and the device set template 71 upon which the device sets are based. The device set template defines the shared device properties that all such device sets will inherit from the template. Device sets specify specific items of actual hardware (i.e., a mobile computer 20, or peripherals for use with the mobile computer 20. Device set templates 71 specify the types of hardware that are needed to complete the device set.

Figure 12:
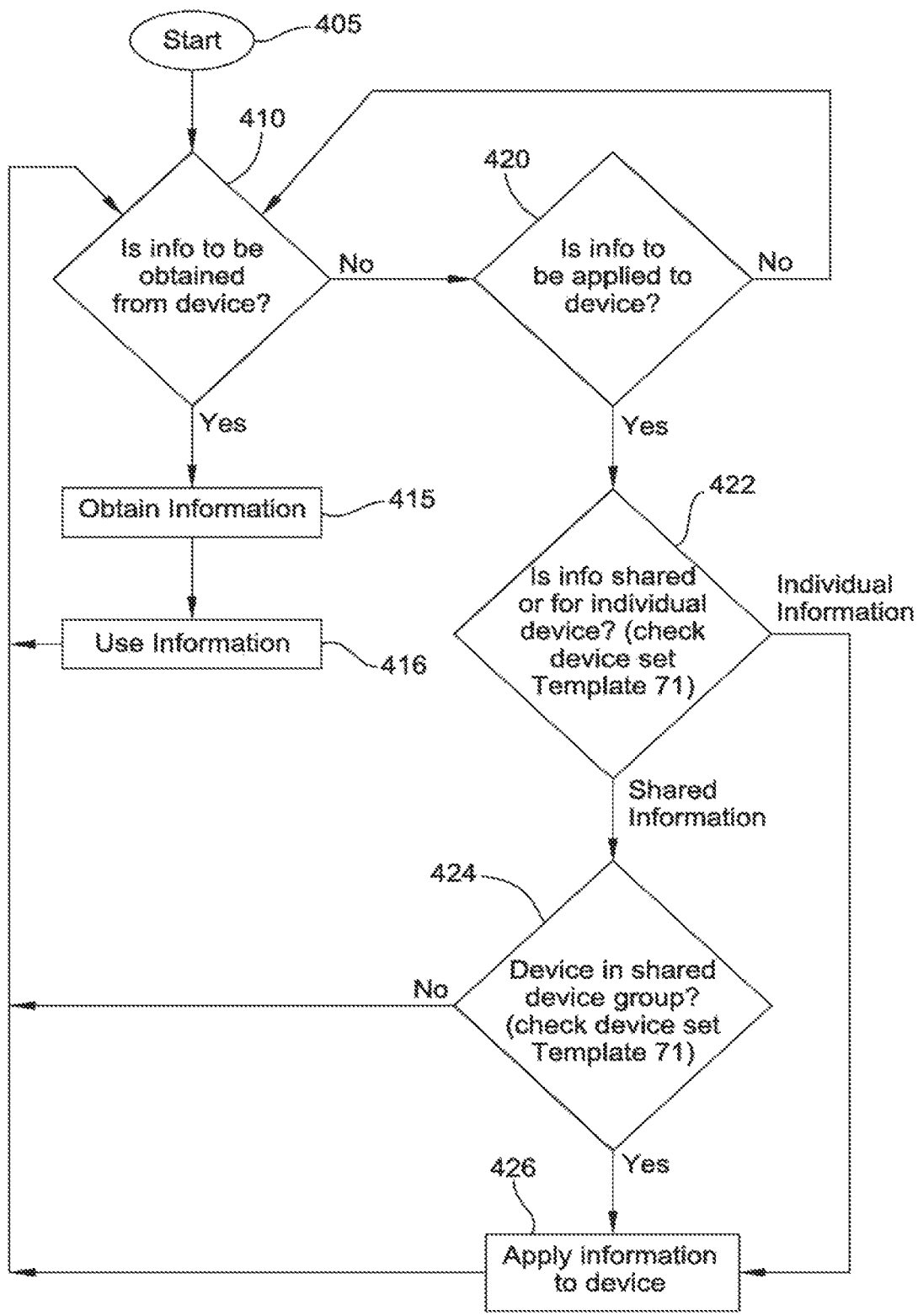
FIG. 12 illustrates a device set template that includes device set properties and identified associated devices.

As shown in FIG. 11, the device set template includes a set of device properties such as the IP address of the primary device 262 (see IP address 264 under device properties. The device set template 71 further includes a listing of devices 260 which are grouped according to whether the device is a primary device 262 or a secondary device 266. The primary device in FIG. 12 is a mobile device 264 having the device properties 264 shown. The secondary device is a group of devices including a printer 267. Advantageously, the device set template may include one or more rules such as the time of day that the device may be permitted to use the network or whether a device is a shared or an individual resource. In FIG. 12, device properties 268 of a printer 267 is shown to be a shared resource whereas device properties 271 of a scan reader 270 is indicated to be individual property. 272. This means that any update of the setting for printer 267 will automatically update the like setting in all printers associated with this property. Any update of the setting for the scanner will cause only the settings in the indicated scanner to change.

The device set thus provides a way for the system manager 16 to set rules for devices operating in the network (e.g., time of day the device is permitted to be active, shared resource, etc.) These rules provision each device 20 and, in the case of shared devices 20, provision all devices 20 that share that property. These rules provide a layer of rules for the system manager 16 to use in managing network devices that are additional to the rules that may be imposed on the devices 20 by the system manger 16 using the process that is associated with a process number associated with a plug-in 26 residing on a server 12.

Advantageously, the device set template 71 enables the system manager 16 to have the final say as to what configuration will be used by the mobile device 20 in connection with all settings that the device set template allows the system manager to set. For example, without the device template, when connecting to the internet a mobile device may obtain its IP Address from a DHCP service. The device set template 71 may advantageously enables the system manager 16 to overrule that decision of a mobile device 20 by imposing a rule that will use a fixed IP Address to define its device configuration settings. As another example, without the device set template 71, the mobile device 20 may need to determine for itself what configuration to use to connect the mobile device 20 to a set of devices associated with the mobile device 20. The device set template 71 advantageously enables the system manager 16 to assume and manage that responsibility centrally. As another example, the device set template 71 may advantageously set properties setting 265 to be a shared setting 265 thereby allowing every mobile device 20 that the system manager associates with these settings to be updated every time the system manager 16 updates one of the shared properties (e.g., GPRS Access Point Name, Modem Name, Connection Name). The device set template 71 may advantageously set the time of day during which a device may use the network. If the rime zone for a group of devices located within the same geographic region is to be the same, the device set template can provide a setting for time zone. If the time zone is a device property that the system manager 16 sets to be a shared device property, then all devices 20 that are associated with this device property will have their time zone updated every time the system manager updates the time zone of the shared time zone setting. As another example, if the system manager 16 decides that any device that is associated with this shared device property is to no longer be associated with this device property, the system manager 16 can change the shared setting of that device over to an individual setting and set the time zone of that device individually. Alternatively, the system manager 16 may update the device set template 71 to associate the time zone property of the device 20 with a new group of devices that share the new time zone of the device.

More broadly, a method for managing communications between a mobile device and a network, the method comprising the steps of: providing a device set template for a source including one or more settings for device set properties and one or more settings to identify one or more devices; and setting the one or more device set property settings in the source device set template to one or more device set properties to be associated with a mobile device; and/or setting the one or more devices settings in the source device set template to the one or more devices to be associated with the mobile device; and defining one or more shared network settings on the source device set template; and associating the one or more device set property settings in the source device set template with the one or more shared network settings and/or associating the one or more device set property settings in the source device set template with the one or more shared network setting; wherein setting or changing the setting of the one or more device set property settings in the source device set template and/or the one or more device set property settings in the source device set template causes the setting or changing of each of the one or more device set property settings in the one or more object device set templates associated with the shared network settings and/or each of the one or more device set property settings in the one or more object device set templates associated with the shared network settings to also be set or change.

FIG. 12 shows a process for provisioning a mobile device according to the settings in a device template. The process starts at step 405. At step 410, a determination is made by the network whether information needs to be obtained from the device. If YES, the network obtains the information at step 415, uses that information at step 416 for the purpose it needed, (e.g., such as to update its information), and returns to step 410 to determine whether information is needed. If at step 410, NO information is needed, the process advances to step 420 where the network determines whether the information is to be applied to a device. If NO, the process returns to step 410 to determine whether it needs to obtain information from the device. If at step 420 the answer is YES, the network determines whether the information is to be shared or is for an individual resource. If INDIVIDUAL, the process advances to step 425 and applies the information to the individual device. If SHARED, the process advances to step 424 where a determination is made as to whether the device is in a shared group. If YES, the network applies the information to the device. If NO, the process advances to step 510 where the network determines whether it needs to obtain information from the device. Similarly, after, step 426 s finished applying the information to the device, the process advances to step 410 to determine whether it needs to obtain information from the device.

Figure 13:
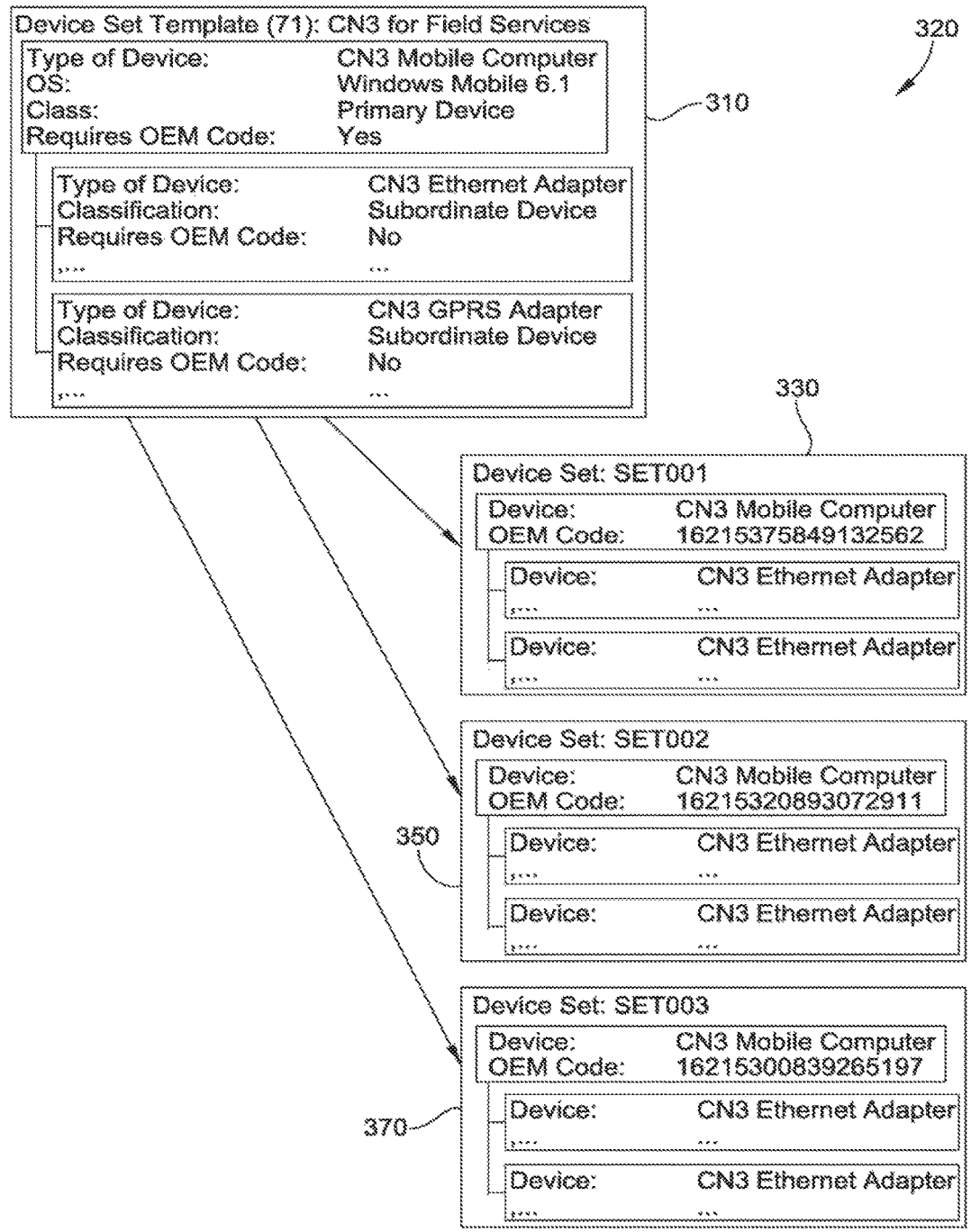
FIG. 13 is a flow chart depicting a process for applying a device set template.

FIG. 13 shows that a form template 310 may be created and populated for each of device sets 330, 350, and 370. This allows a system manager 16 to quickly and easily populate and modify to create and populate device set template 71 populated with a relationship between device sets 320 and the device set template 310 upon which the device sets are based. Note that each device set template may appear as an empty framework that defines the types of devices that will be required in any device set that uses it and defines the shared device properties that all such device sets will inherit from the template. For clarity, it may be considered that device sets specify specific items of actual hardware (i.e., a mobile computer 20, or peripherals for use with the mobile computer 20), whereas device set templates 71 specify the types of hardware that are needed to complete the device set. FIG. 9 provides a flow chart that includes a summary of updating processes for managing device properties through the device set templates 71.

Figure 14:
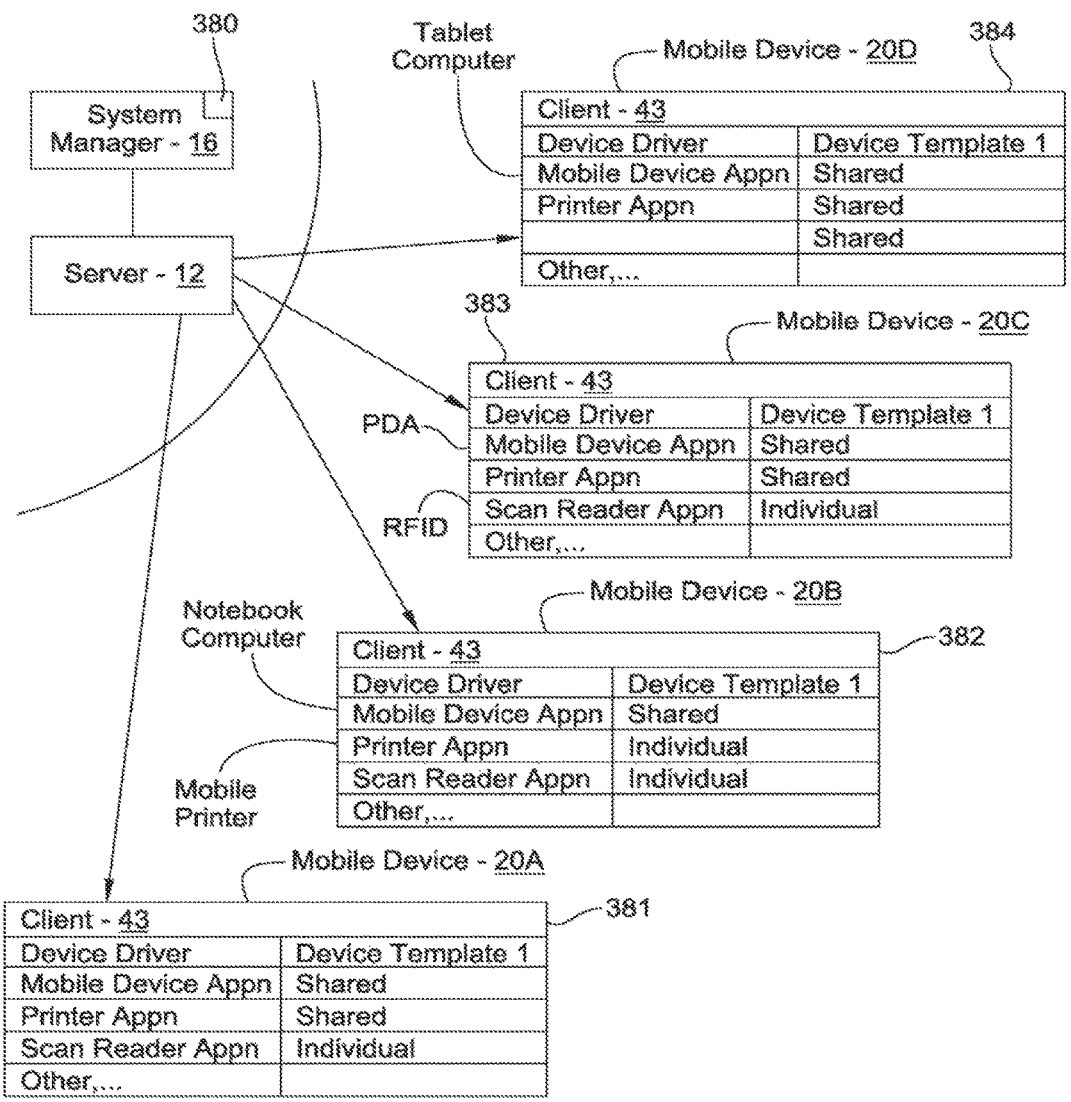
FIG. 14 is a diagram illustrating application of a device set template to subordinate devices.

FIG. 14 provides a system level view of the use of a device set template 380 in the system. As shown, a device set template 380 may be configured by the system manager 16 to create a separate device set 381, 382, 383, and 384 for each of mobile devices 20 a-d, respectively. Any settings that may be set or changed by the system manager involving an individual setting will only change the setting of the individual device that is associated with that setting. Any settings or changes to settings that are made involving a shared setting are automatically made to each of the mobile devices that share that setting.

Figure 15:
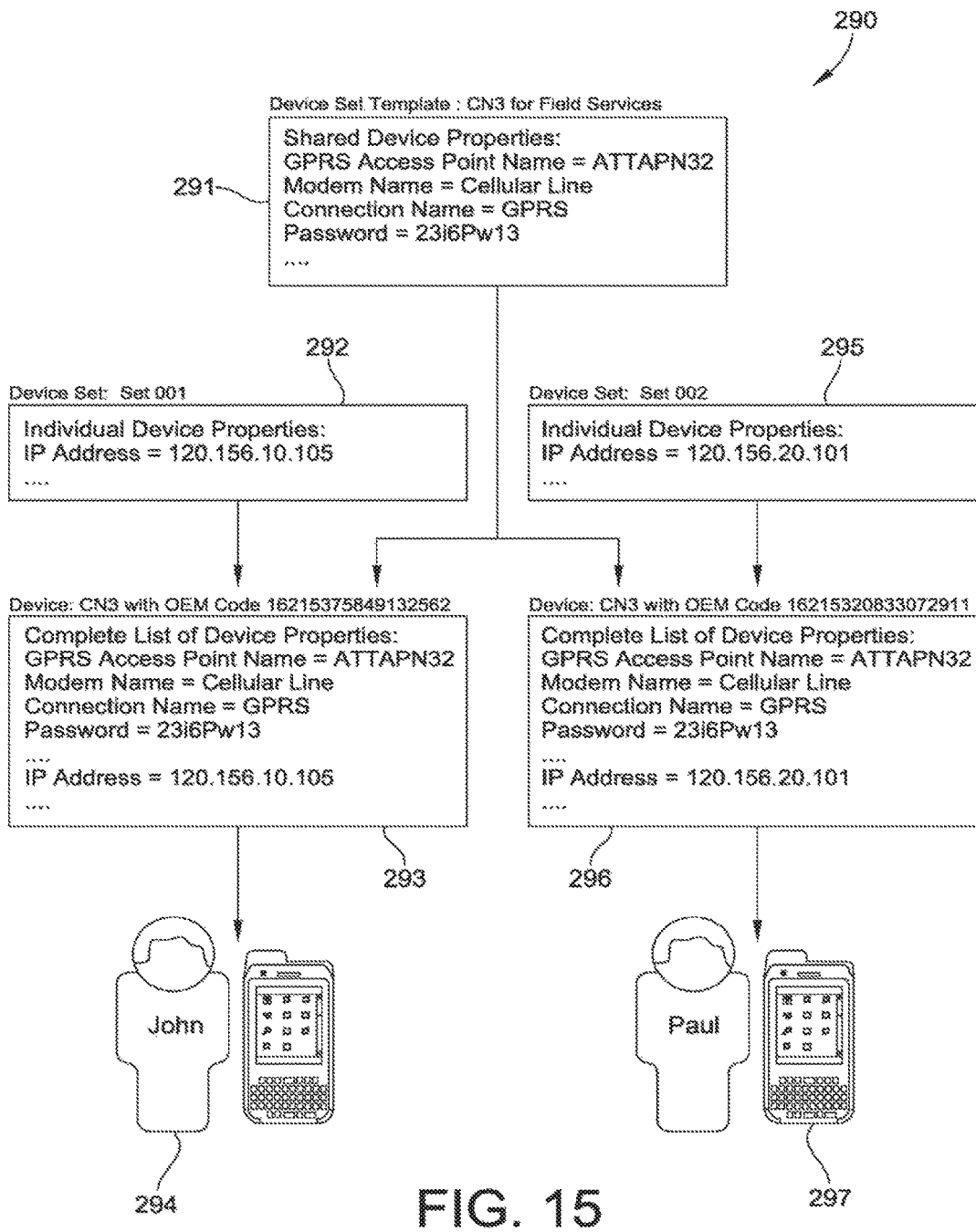
FIG. 15 is a system level view of the use of the device set template.
Figure 16:
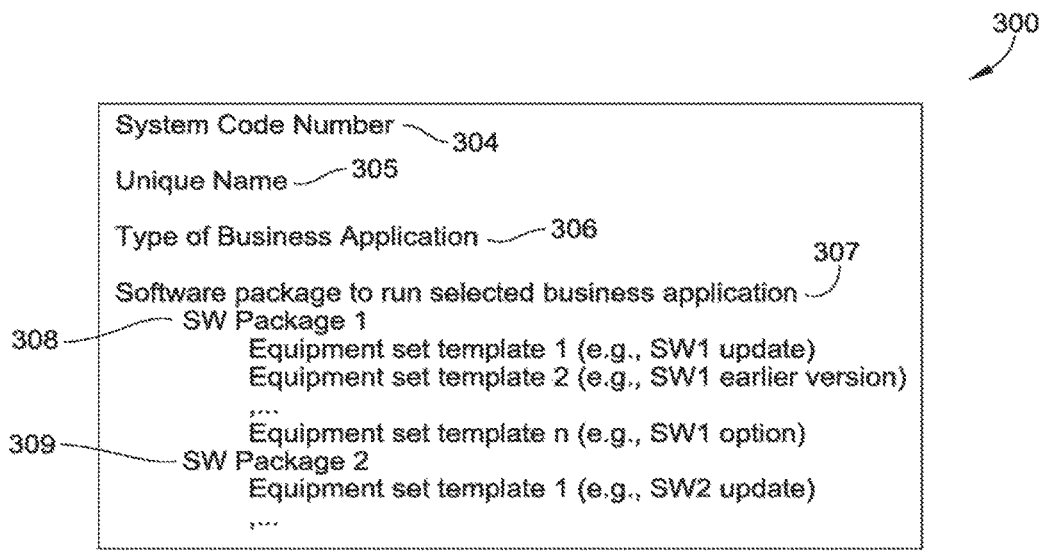
FIG. 16 is an illustration of how shared properties may be set or changed using device set templates.

FIG. 15 illustrates how the shared property settings that are set or changed to a device set template 291 by the system manager automatically updates all of the properties 293, 296 that are shared between two mobile devices 294, 297 that the system manager has associated with that shared property setting. FIG. 16 also shows how properties 292, 295 that are individual properties unique to each device 294, 297, such as the IP address, are unchanged by the shared device setting. To change these properties, the system manager will change these properties for each of devices 294, 297, individually.

System Codes. The term "system code" generally refers to a value that is used to identify a specific device user (when device users are known persons) or to identify a device being used in a specific role (when device users are unknown). System codes allow device users to uniquely identify themselves within the computing system 5 regardless of which mobile device 20 set they may presently be using. The term "OEM Code" is automatically generated by the client 43 and submitted to a gateway 14 during remote device registration and also during authentication, is forever bound to the hardware on which it is generated. The system code may be used by the network for user level authentication since it identifies a user. The OEM Code may also be used by the gateway 14 for devicc level authentication since the OEM Code identies the hardware device. The system code may also be managed by a host system using a system code integration interface, which is an interface that allows the host system to set or change system settings. In some embodiments, the system code can be further supplemented with a password.

The source code provides another way for a system manager to impose restrictions on a device within the network and so provides another rule useable along with rules that the system manager may define for connection paths and rules that the system manager may define for device set templates to manage the network. In using system codes, illustratively, the system manager 16 enforces the rule that each system code must always be assigned to one and only one deployment group.

Figure 17:
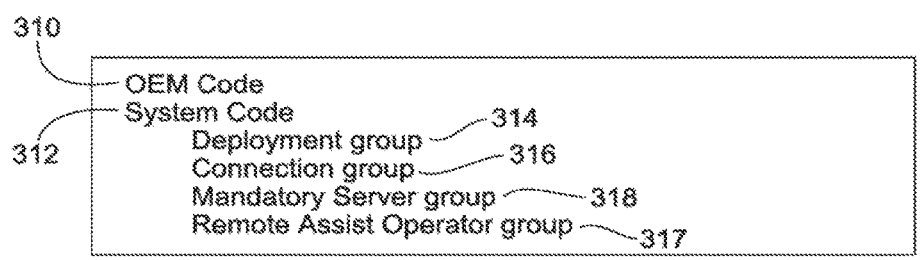
FIG. 17 depicts an association of device configurations with a system code.
Figure 18:
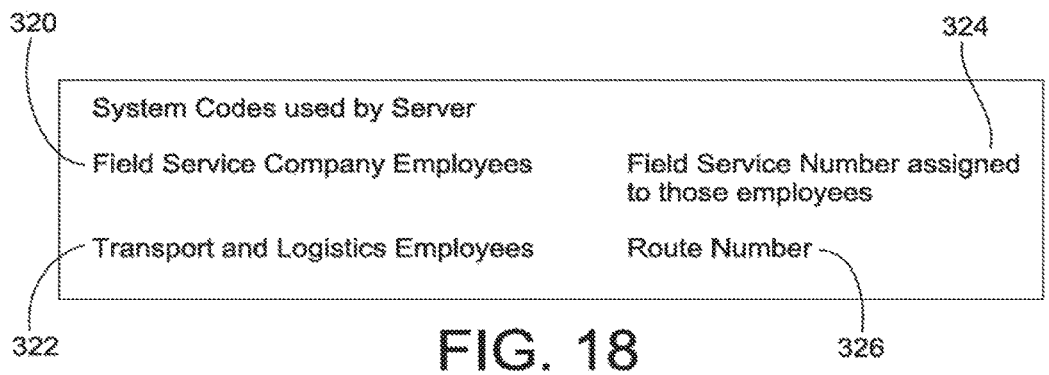
FIG. 18 depicts use of system codes to allow organization of network users by groupings.

FIG. 16 illustrates some kinds of properties 300 that may be associated with a system code 304. The system code may have a unique name 305 and be associated with a particular type of business application 306. The system manager may associate with the system code a particular business application 307 and even identify predetermined software packages 308,309 that may be use with the business application. FIG. 18 illustrates four different groups that may illustratively be used as system code but these groupings are not exhaustive. There are many other ways that a system manager may define groups within a network which the system manager may employ in the management of the network. The source code groupings shown include deployment group 314, connection group 316, mandatory server group 318, and remote assist operator group 317. FIG. 17 shows still further codes that may be used the network. In this illustration the users are grouped based on type of work. The system code includes a group 320 made up of field service company employees and a group 322 made up of transport and logistics employees. In this example, the group of field service employees 320 is further categorized by field service No. assigned to those employee 324. This allows the System Code to personally identify each field service employee within the system. The transport and logistic employees group 322 may be further grouped by route number. Here, the system code will only identify a route but not the specific person that serviced it In both cases however, the system Code will be used by a server 12 to provision a user's device set with the right software and business data needed to perform their work.

This is advantageous since a transport and logistics company often as changing independent subcontractors to perform daily pickup and delivery tasks. The grouping by route number may be the equivalent of a route number that represents the pickup and delivery route assigned each day to a contractor. Thus, system codes allow any network to organize its network users by groupings. All that is needed is for a network to identify the groups it wants to use to organize the network device use of the network. This leads to a flexible way to organizing a network based on commonality between network users. The network may tailor the rules for each group in a way that may maximize the network uses of the devices 20 within the group based on their usage patterns.

From the foregoing description, it is seen that the system code identifies either a specific device user or it can identify a "virtual user." A virtual user is a generic user for whom specific data are needed regardless of who the actual device user is. For example, in some cases a system code may identify "John Smith" because it's important that John Smith receives specific data needed to complete his work. However, a system code could also identify "Route 1250" which is not a specific person but rather a "virtual user" to whom specific data will be provided to complete their work to deliver products on Route 1250. In either case, the system code identifies the user within the system, and is used by the system, together with additional information such as the type of device the user is presently using, to automatically provision the device with the correct software for the work to be done, setup the device with the right settings to run the software successfully, and to associate data exchange requests from mobile applications with this user so that the plug-in processes that will be called through communication sessions established by the client on the device, will be able to submit and retrieve from host systems (i.e. SAP, Oracle database, file store, etc.) the appropriate business data for this user.

Also from the foregoing disclosure, the system code is seen to be a virtual identifier used throughout the system to identify the device user and perform a number of mobility system management tasks (i.e. provisioning a device on demand based on the user presently logged into a specific type of device.) The system code can be a name, an employee number, a route ID. It could even be a code generated based on a fingerprint used to validate access on the device. The system code may be essentially anything that will allow the system to associate a user to the device.

The system manager 16 enforces the rule that each system code must always be assigned to one and only one deployment group. As previously described in connection with FIG. 18, each deployment group has a unique name and specifies one type of business application. Bach deployment group may contain more than one set of software packages that can be deployed to a mobile device to install and run the selected business application. Each set of software packages (base package and update packages) must have assigned to them the equipment set templates that represent those device sets that are compatible with the software in each package. By allowing one business application to have multiple sets of software packages, different compilations of essentially the same application may be deployed to the appropriate device sets based on the device set templates that contain the types of devices that are compatible with the software compilation in each package. In use, the servers 12 will automatically determine the specific business application software packages to deploy to each device set by determining: what deployment group the submitted system code is assigned to and which software packages in the relevant deployment group have assigned to them the device set template that is used by the device set from which the System Code was submitted.

If no software packages compatible with the user's device set are found (meaning no packages have assigned to them the same device set template 71 that is assigned to the user's device set) or if the user's device set, as presently specified in the device sets module of the system manager 16, does not exactly match the structure of the device set template 71 that is assigned to it, then no business application packages will be deployed to the device set This is a safety mechanism that helps to assure that device sets (or incomplete device sets) do not have deployed to them software packages with which they are not compatible. This is an advantageous feature of system codes since deploying incompatible software to a device set may cause the primary device to report software installation and execution errors, and in the worst case even lock-up the primary device thereby precluding any further work with the device until it is cold booted to restore its default factory settings.

To illustrate this feature, consider a company that operates a mobile computing system for two types of applications—one for "direct to store deliveries" and the other for "field services." Each of these applications are packaged in two compilations: the first compiled to execute on a mobile device having a StrongARM processor and the other compiled to execute on a mobile device with an x86 compatible processor. In this example, the system manager 16 would use the system code submitted by each device user to determine, based on the deployment group to which the system code is assigned, which business application—the one for "direct to store deliveries" or the one for "field services"—is intended for the given user. However, this information by itself is insufficient for the system manager to determine which specific package of the business application—the one compiled to execute on a StrongARM processor or the one compiled to execute on an x86 compatible processor—should be deployed to the user's device. To determine which is the appropriate package to be deployed, the system code will determine which of the packages have assigned to them the same device set template that is assigned to the user's device set. Those packages will then be deployed to the user's device to install the intended business application.

System Codes in Mandatory Server Groups

The system supports the distributed operation of servers 12 in a system. When a company's business data is also distributed across various geographic locations, the use of distributed servers 12 can provide additional communications and data management benefits. By installing server(s) on high-speed local networks at each location where the company's business data is stored, it is possible to force selected processes to exchange business data between host systems and relevant mobile devices over the local area network thereby reducing bandwidth utilization on the company's wide-area network as well as minimizing the time required to complete communications. To illustrate this feature of the system, consider a company that has its customer database stored at each depot and only one server 12 installed at their head office. In this scenario each mobile device that docks at the depot and requests the process that updates their customer data would cause the relevant server 12 plug-in process to begin pulling that data from the depot database up to the server 12 over the WAN only to turn around and have that data sent back down through the WAN to the requesting mobile device. This movement of business data through the WAN would be unnecessary if a second server 12 was installed at the depot so that the exchange of business data between the customer database, server 12 and the mobile device could all take place through the depot LAN.

By the creation of mandatory server groups (318 in FIG. 17) in the system manager 16, each mandatory server group will have assigned to it select server(s) and processes as well as select system codes. With these assignments of servers to mandatory server group made, the logic used by gateways 14 to allocate incoming process requests to servers 12 will be restricted such that only those servers and process assigned to the mandatory server group to which the system code also belongs, may be useable by that user associated with that system code. Thus, by assigning system codes to a single mandatory server group that are relevant for device users at a specific geographic location, the system advantageously forces those device users to exchange business data in selected processes with the servers that are designated servers 12 of the mandatory server group (318 in FIG. 17).

System codes may be included in plug-in processes to serve as yet another rule or conditions imposed upon the connection that may be established by the plug-in. The rule is a flexible one that may easily be changed by the system manager, providing even greater flexibility in the management of the system 5.

As previously discussed, once a connection path is established between a server and the client, the server down-loads to the data service data files contained in the data-plug and used by the data service to configure the mobile device to enable the business application to communicate with the network. In this way, the contents of the data files enable the mobile application 44 and the plug-in 26 to both become "aware and synchronized" with respect to how the data that is being sent by each side should be processed and responded to by the other side. The contents of the data files may be settings, data files, software updates, and anything else that the developers of the mobile application 44 and plug-in 26 agree to exchange to enable this communication. The advantages to a software developer in reference the system code in their plug-in is illustrated with an example involving a company with a large field service workforce organized according to territory. In this case, the plug-in process which downloads customers to the user's device could make use of the system code as rule imposed on the connection path that allows only those customers that are relevant to the service person's territory to be downloaded. Without this feature, a system would download the entire company's customer database to each user which is inefficient but also ties up the air interface as well as the storage capacity and processing power of a network device.

As previously described, the system code allows software deployment to network devices to be done more efficiently According to this disclosure, the packager application may create packages containing deployable software. Illustratively, these packages may be of three types, namely a client package, a device driver package or a business application package. Each of these packages can be added to a system using the system manager 16. The client 43 package contains all the files that comprise a specific version of the client 43, which provides the client-side functions associated with communications, security and device management; This package will be automatically deployed to each device set in the system whose primary device as included in the device set template uses the same operating system as that supported by the given client 43.

The system manager 16 may assign systems codes to control the deployment of business applications 44 to device sets 20, to control the routing of process requests to mandatory servers, and to facilitate the business data management performed by plug-in processes. For example, system codes may be assigned to deployment groups to specify what business application software 44 will be deployed to a device set 20; connection groups to specify what communication rules will be followed by a device set; mandatory server groups to optionally specify which servers 12 will handle process requests coming from a device set; remote assist operator groups to specify which group of remote assist operators will receive in coming support requests from a device set and other similar groups. In addition, a system code may be used by a plug-in process 26 to determine in real-time what business data should be exchanged with each device set.

Since the system code is device independent, a user can submit their respective system code from any device set and have that device set provisioned correctly. This on-the-fly provisioning improves system management flexibility and efficiency by allowing device sets to be swapped between device users as needed while assuring that any device set presently being used is always properly provisioned for the work being done by its user.

System Code Management. In general, a system code will be related to some other unique identifier presently being used by the company, for example, an Employee Number, a Terminal ID, or a Route Number. System codes may be managed in various ways. For example, system codes can be created and managed manually in a systems codes module of the system manager 16 or they can be managed directly by a host system, such as through use of a code integration interface. The latter approach allows host systems which are already responsible for the management of a company's equivalent unique identifiers to also directly manage the system codes used within the computing system 5 and thereby avoid their additional manual administration through the system manager 16. One example of this approach is where human resources enterprise software is used to manage employee numbers, which are then translated into system codes in the background.

Consider two examples for deployment of system codes. In this example, the system codes used by a field service company may be the equivalent of the employee number assigned to each of the field service employees. In another example, the system code for a transport and logistics company that uses many independent subcontractors to perform daily pickup and delivery tasks may be the equivalent of a route number that represents the pickup and delivery route assigned each day to a contractor.

In the first case above, the system code will correlate with and personally identify each field service employee. In the second case, the system code will correlate with and identify a route, but not the specific person that serviced it. In both cases however, the system code will be used by the server 12 to provision a respective device set with the right software and business data needed.

Aspects of how system codes are used to control the deployment of business applications 44 to device sets 20, to control the routing of process requests to mandatory servers, and to facilitate the business data management performed by Plug-In 26 processes are now reviewed.

First, consider use of system codes in deployment groups. The system manager 16 enforces the rule that each system code must always be assigned to one and only one deployment group. Each deployment group has a unique name and specifies one type of business application 44. Each deployment group may contain more than one set of software packages that can be deployed to a mobile device 20 to install and run the selected business application 44. Each set of software packages (base package and update packages) should have assigned to them the device set templates 71 that represent those device sets that are compatible with the software in each package. While these rules are not necessarily unbreakable, it is advisable to follow them, such that integrity of the business applications 44 is maintained.

The server 12 will automatically determine the specific software packages for a given business application 44 that should be deployed to each device set. Generally, in this evaluation, the server 12 will consider: what deployment group the submitted system code is assigned to; and which software packages in the relevant deployment group have assigned to them the device set template 71 that is used by the device set from which the system code was submitted.

If no software packages compatible with the user's device set are found (meaning no packages have assigned to them the same device set template 71 that is assigned to the user's device set) or if the user's device set, as presently specified in the system manager 16, does not match a structure of the device set template 71 that is assigned to it, then no business application packages will be deployed to the device set. This helps to assure that device sets (or incomplete device sets) do not have incompatible software packages deployed to them. Deploying incompatible software to the device set may cause the primary device to report software installation and execution errors, and may even lock-up the device thereby precluding any further work with the device until it is cold booted to restore its default factory settings.

Consider the following example. In this example, a company called "SouthWind Inc." operates a mobile computing system for two types of applications—one for "direct to store deliveries" and the other for "field services." Each of these applications 44 are packaged in two compilations: the first compiled to execute on a mobile device having a Strong ARM processor and the other compiled to execute on a mobile device with an x86 compatible processor.

FIG. 350 illustrates the system code number 350, deployment group 352, the software sets 356, 359, 362, 365 and the associated applications/device set templates 357/358, 360/361 for this example. Software set 362 is shown without a device set template. In this example, the system 5 would use the system code submitted by each device user to determine, based on the deployment group to which the system code is assigned, which business application 354 (i.e., the one for "direct to store deliveries" or the one for "field services") is intended for the given user. However, this information by itself is insufficient to determine which specific package of the business application 354 (i.e., the one compiled to execute on a StrongARM processor or the one compiled to execute on an x86 compatible processor) should be deployed to the user's device.

To determine which is the appropriate package to be deployed, the system 5 will determine which of the packages have assigned to them the same device set template 71 that is assigned to the user's device set. In this example the package is device set template 364. Those packages will then be deployed to the user's device 20 to install the intended business application 44.

In some embodiments of the system 5 (e.g., an embodiment with multiple host computers 10) distributed operation of servers 12 is supported. When business data is also distributed across various geographic locations, the use of distributed servers 12 can provide additional communications and data management benefits. By installing servers) 12 on high-speed local networks at each location where business data is stored, it is possible to force selected processes to exchange business data between host systems and relevant mobile devices over a local area network thereby reducing bandwidth utilization on the company's wide-area network as well as minimizing the time required to complete communications.

Consider an example of a company that has a customer database stored at each depot and only one server 12 installed in a central office. In this scenario, each mobile device 20 that docks at the depot and requests the process that updates customer data would cause the relevant Plug-In process 26 to begin pulling data from the depot database 15. This would issue a request 49 up to the server 12 over the WAN only to turn around and have that data sent back down through the WAN to the requesting mobile device 20. This movement of business data through the WAN would be unnecessary if a second server 12 was installed at the depot so that the exchange of business data 48 between the customer database 15, server 12 and the mobile device 20 could all take place through the depot LAN.

Accordingly, "server groups" may be established in the system manager 16. As a matter of convention, these server groups are referred to as "mandatory server groups," however the server groups should be considered as optional (such as to provide desired local database access). Each Mandatory Server Group will have assigned to it selected server(s) 12 and plug-in processes 26 as well as selected system codes. When this is complete, the logic used by the gateway 14 to allocate incoming process requests 49 to servers 12 will be constrained such that only those severs 12 and processes assigned to the mandatory server group to which the system code also belongs, will be considered. By assigning the system codes that are relevant for device users at a specific geographic location to a single Mandatory Server Group, those device users may be forced to exchange business data in selected processes using a designated server(s) 12.

The computing system 5 allows the processes within a Plug-In 26 to reference the system code that has been submitted by the device user when the connection to the server 12 was established. This allows a process to include the system code as a variable in its conditional data management logic, thereby giving each Plug-In 26 process great flexibility in its execution.

To better understand why a software developer may want to reference the system code in their plug-in 26, consider an illustrative data management scenario. Assume a company with a large field service workforce is organized according to territory. In this case, the plug-in process 26 which downloads customers to the user's device could reference the system code as a variable selector for only those customers that are relevant for each service person's territory. Without the benefit of referencing the system code, this process would have to resort to downloading to each user's device the entire company's customer database. This is inefficient from a communications standpoint, places a greater burden on the storage capacity and processing power of each user's mobile device 20, and, perhaps most importantly, can risk exposure of a substantial quantity of company data should the mobile device 20 be lost or compromised.

Deploying Software to Mobile Devices

Software deployment is an integral part of the device management process. Deployable software is contained in packages created by the Packager application. This application supports the creation of these three types of packages: client 43 package, Device Driver package or a Business Application package. Each of these packages can be added to a system using the system manager 16.

A client 43 package contains all the files that comprise a specific version of the client 43. The client 43 provides the client-side functions associated with communications, security and device management. This package will automatically be deployed to each device set in your system where its primary device uses the same operating system as that supported by the given client 43.

"Pull" and "Push" Data Communications. In various embodiments, the computing system 5 supports both "pull" and "push" data communications. Push and pull communications in the disclosed system is described in application Ser. No. 13/494,978 entitled application "Communication Protocol and System for Network Communications" filed contemporaneously herewith which is incorporated by reference.

Network Address Translation

The system 5 supports the automatic translation of IP Addresses in network topologies where mobile computing devices 20 connect through a public network (for example: through the Internet, a GPRS APN, etc.) and need to access gateways 14 and servers 12 located within a private network, behind a firewall or router, that is using NAT (Network Address Translation). Using the system manager 16, IP Address translation can be configured uniquely for each connection path and type of connection (GPRS, Wi-Fi, LAN, etc.).

The system 5 supports Network Address Translation at the boundary between a private network containing the gateway 14/server 12 applications and a public network within which mobile computing devices are running the client 43. It is not possible to perform Network Address Translation between gateways 14 and servers 12 located in different networks—it is assumed that all gateways 14 and servers 12 are directly IP Addressable to each other within the private network (as they would be within a single LAN).

Updating Mobile Business Applications

Mobile business applications are designed to receive, process and output business data in accordance with the data structures and data processing rules developed for the business application. As a consequence, the business applications 44 have built-in dependencies with respect to what data they need and how that data is expected to be provided. Due to these data dependencies, the process of updating mobile business applications in prior art computing systems can be complex and generally calls for coordinated execution updates of mobile device software with updates of host system software.

The disclosed computing system 5 is designed to help make the entire process of updating mobile business applications 44 easier, faster, more flexible and with less risk. One of the features that make this possible is the use of version controlled plug-In processes 26 that are requested as needed by the mobile business application 44. By specifying the process being requested and its version, the mobile business application 44 is able to connect to and exchange business data 48 with those processes that are compatible with its data dependencies. When the mobile business application 44 is updated in such a way that its data dependencies change, then the developer of the mobile business application 44 will include in the updated application logic the new version number of the process with which it is now compatible. Because each mobile business application 44 will request only those process versions with which it is compatible, one may deploy and maintain within one mobile computing system different versions of the same mobile business application 44 without compromising the integrity of host system data integration interfaces.

The ability to operate multiple versions of the same mobile business application 44 at the same time provides a simplified deployment process for mobile business applications 44, avoids tedious and costly communication synchronization planning for the update process, and also offers unique advantages in software piloting and phased software rollouts.

Updating Mobile Business Applications 44.

To assure that updated mobile business applications 44 will have access to their required process versions, all new plug-ins 26 must be installed and configured and then new business applications 44 must be added to a business applications module that is a part of the system manager 16.

Registering and Provisioning New Mobile Devices 20.

Before any mobile computer 20 can connect to the computing system 5, it must be registered for use in that computing system 5. To facilitate this process the mobile computer must have a live network connection through which a gateway 14 and server 12 can be reached. The loader 45 application on the mobile computer is then launched and the user must click the register button. If a message indicating successful registration is displayed on the mobile device, this means that the authentication credentials generated for the given computer's hardware was successfully received by a gateway 14. After an administrator accepts the remote device registration in the system manager 16 (and assigns the newly registered device set to the appropriate device set template) the registered device will be able to reconnect which will automatically provision the mobile computer with the correct device settings and software.

In the event that a registered mobile computer 20 is cold booted (thereby resetting the mobile computer 20 to a default factory state) it is not necessary to re-register the mobile computer 20 to provision it. The loader 45 application on the computer simply needs to be launched and the connect button clicked to initiate the provisioning process.

Defining Communication Rules

The system allows a system manager to manage communications between mobile devices and host systems by grouping system codes into connection groups. These groups are used to define the communication rules used by mobile devices 20 to determine what type of network connection to open and which open network connection should be used to exchange different types of business data. Each system 5 must have at least one connection group established before any mobile device communications can take place.

Each connection group is comprised of one or more connection paths and a list of system codes that have been selected and assigned to the group. The connection paths collectively define all the different types of network connections (LAN, Wi-Fi, GPRS, CDMA, etc.) that the client 43 may open from the mobile device. Each connection path that is created will specify one type of network connection and the time period during which use of that type of connection is allowed. Each connection path will also have assign to it those processes that may be requested by the business application to exchange business data over that type of connection. For each assigned process, the priority with which that type of connection should be used may also be specified.

Defining Communications Rules

Automatic Selection of Connection Paths

By default, the client 43 will automatically select the connection path to use each time the mobile business application requests a specific process. This automated selection process is based on the connection path rules defined by the administrator in the system manager 16. The automatic selection of connection paths allows the administrator to establish and enforce least-cost connection routing rules that are in-line with business process objectives.

Figure 20:
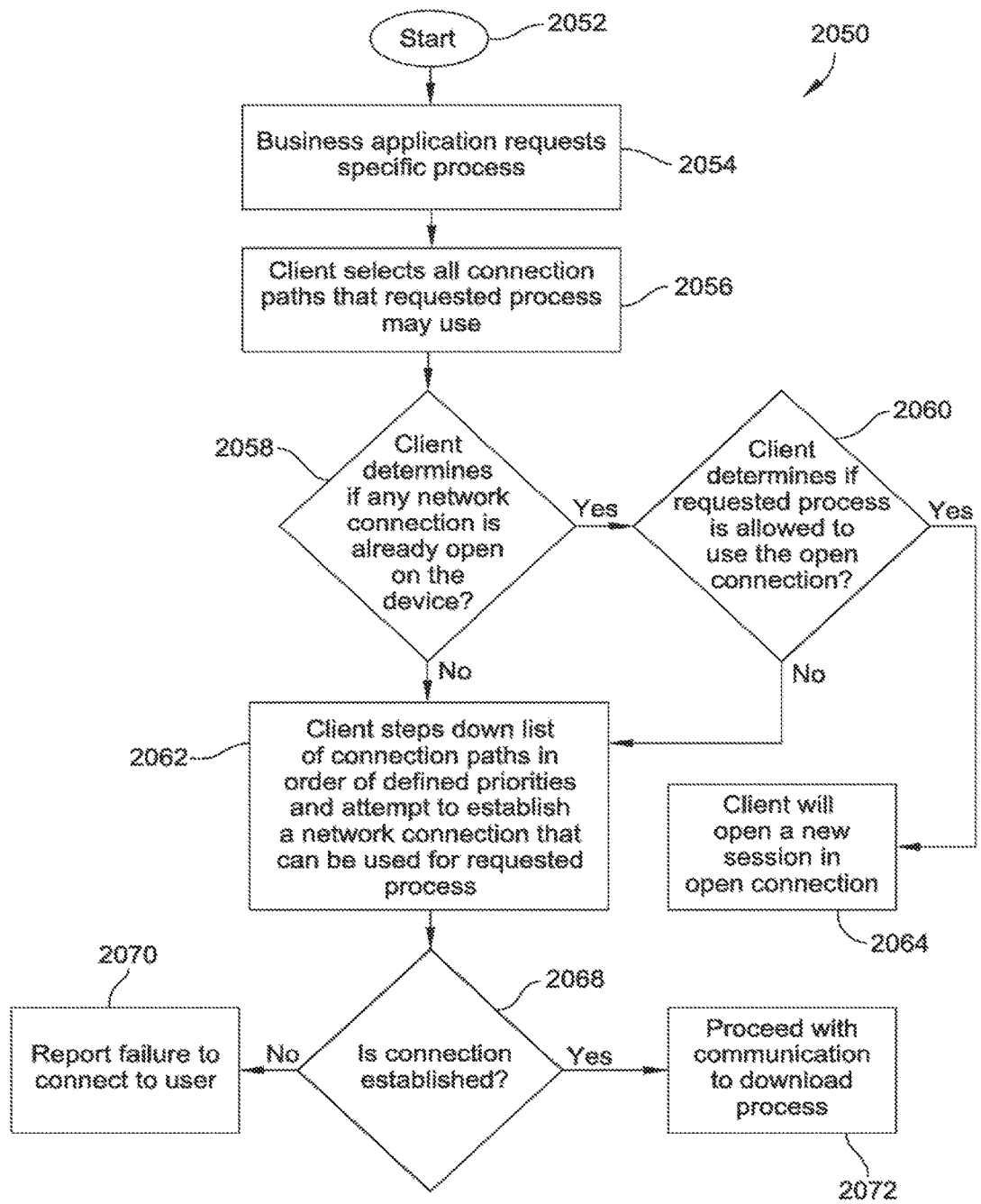
FIG. 20 is a flow chart showing exemplary logic for determining a connection path.

FIG. 20 shows a process 2050 for determining which connection path should be used. The process starts at step 2052. At step 2054, the business application requests a specific process. At step 2056, for each requested process, the client will select all connection paths that the requested process may use. At step 2058, the client will check to see if any network connection is already open on the device. If a connection is already open then the process advances to step 2060 where the client will check to see if the requested process is allowed to use the open network connection. If an open network connection is of the type that can be used for the requested process, at step 2064, the client will use it to open a new session in the open communication. If it is not one of the allowed types of network connections or no open network connection exists then at step 2062, the client will step down the list of connection paths, in the order of their defined priorities, and at step 2068 attempt to establish a network connection that can be used for the requested process. If no network connection can be established (for example, if the device presently has no network connectivity options available to it) then at step 2070, the client will report this event to the mobile business application as failure to connect. If a network connection can be established, then at step 2072 the client proceeds with communication over the connection to download the process.

Manual Selection of Connection Paths

In some business scenarios it may be beneficial to allow the automatic connection path selection process on the device to be overridden by the device user. In these scenarios the client 43 can always provide the mobile business application 44 with a list of all the connection paths that may be used for its requested process. The mobile business application can display this list to the device user and use the user input to select the type of network connection to use, regardless of the administrator's predefined connection path priorities.

Allowing the manual selection of connection paths typically makes most sense in cases where there exists many network connection options for each device 20, yet at any given time and location the device user knows that only one of the lower priority connection paths is feasible. In these cases the ability to jump directly to the use of that type of network connection can be faster than the automated connection path selection process which must discover the feasible connection by stepping through its connection path rules.

Figure 19:
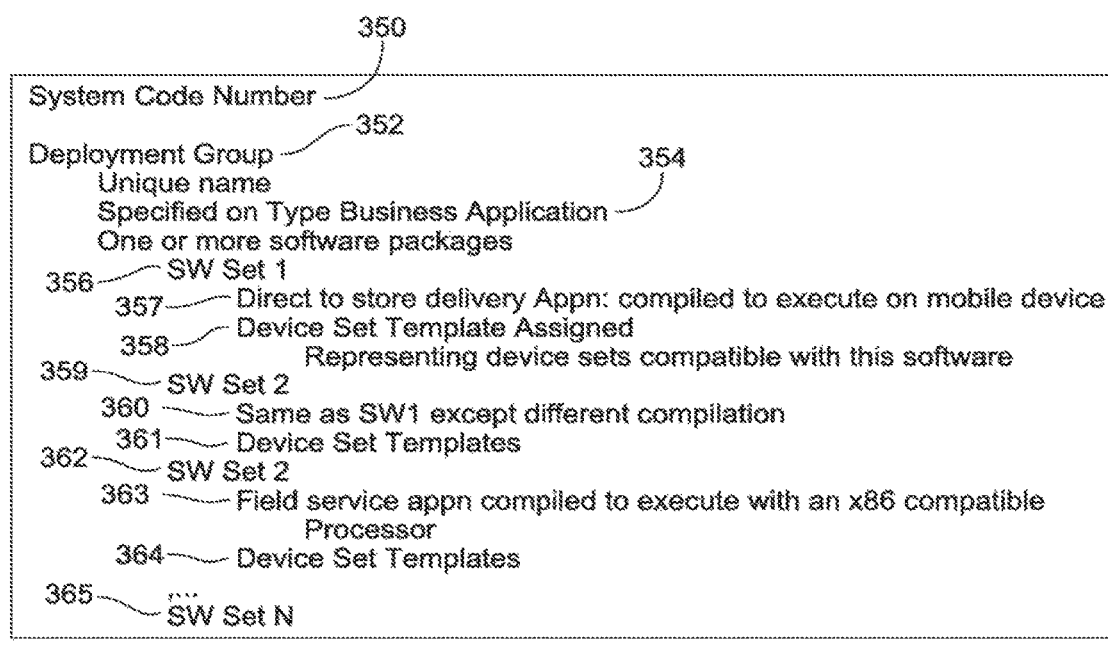
FIG. 19 illustrates use of a system code in conjunction with use of a device set template.
Figure 21:
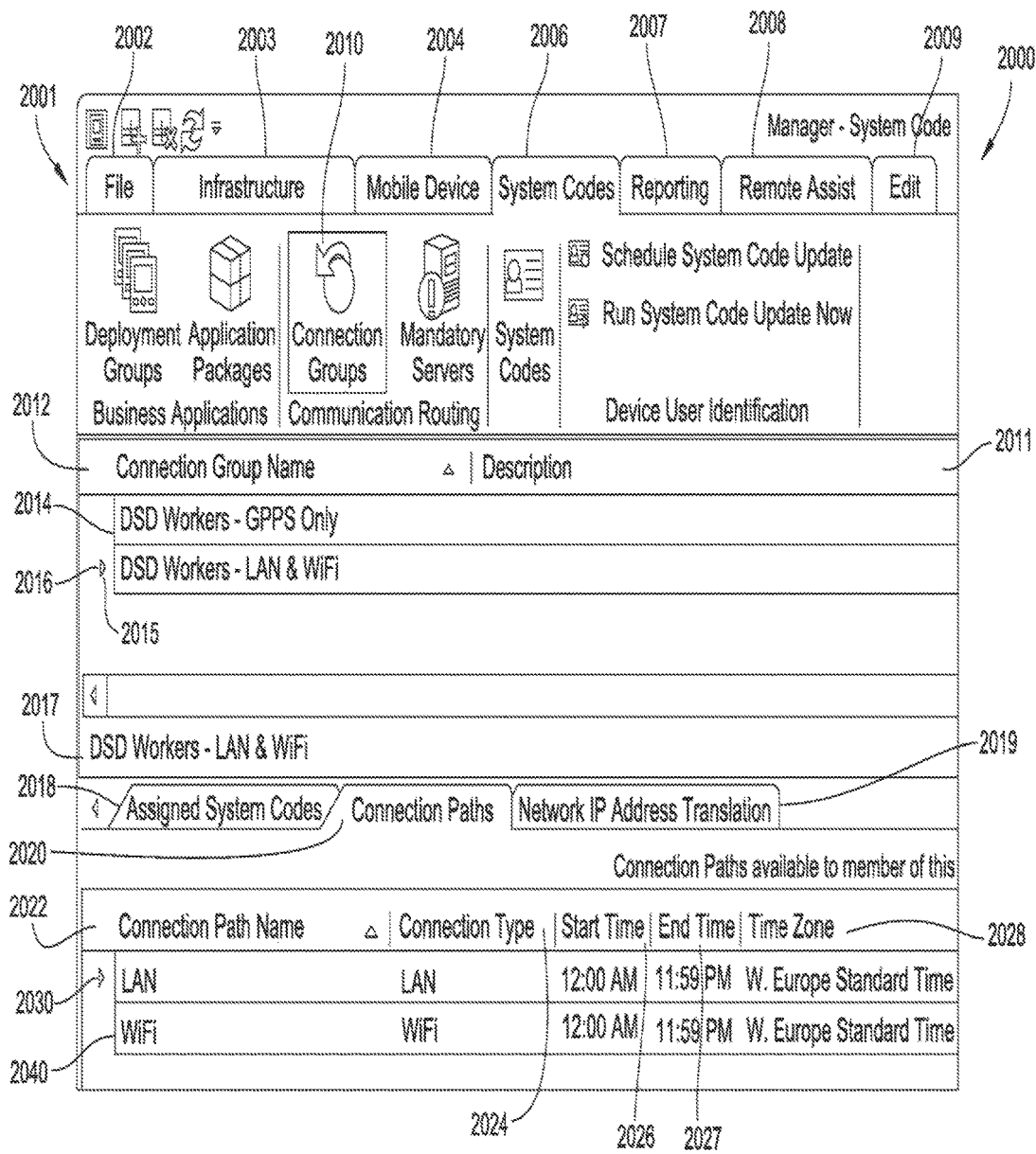
FIGS. 21, 22, and 23 are an illustration of an exemplary user interface to the system manager.

FIG. 21 shows a window 2000 that may appear on a display (not shown) of the system manager 16 illustrating the management by a client of communications between mobile devices and host systems by grouping system codes into connection groups. The window 2000 shown in FIG. 19 displays a toolbar 2001 that allows the user to display files by activating a file tab 2002, infrastructure by activating an infrastructure tab 2003, mobile devices by activating a mobile devices tab 2004, system codes by activating a system codes tab 2006, reporting by operating a reporting tab 2007, remote assist by activating a remote assist tab 2008, and edit by activation of an edit tab 2009 functions. FIG. 19 illustratively shows the display appearing after the toolbar system codes tab 2006 has been activated followed by the activation of a connection groups tab 2010. The display shows a connection group listing 2012 including a first connection group 2014 DSD Workers-GPPS Only and a second connection group 2016 DSD Workers—LAN & WiFi. The arrow 2015 indicates that the second connection group 2016 DSD Workers—LAN & WiFi has been selected for display in a window 2017 appearing inside of the window 2000. Inside window 2017 is a tab 2018 which a user may use to navigate through the assigned system codes 2018, a tab 2020 which a user may use to navigate through connection paths, and a tab 2019 which a user may use to navigate through network IP address translation. In this illustration, the Connection Paths tab has been selected to display a tab 2022 for connection path names, a tab 2024 for connection types, a tab 2026 for start time, a tab 2027 for end time, and a tab 2028 for time zone.

As FIG. 21 shows, connection group listing 2012 includes one or more connection paths 2012 available to workers appearing on the listing. The arrow 2015 indicates that the second connection group 2016 DSD Workers—LAN & WiFi has been selected for display in the window 2017. In particular, from among different types of network connections (LAN, Wi-Fi, GPRS, CDMA, etc.) connection group 2014 which is DSD Workers are permitted to use GPRS only. These are the types of network connections that the client may open from the mobile device. On the other hand, connection group 2016 is DSD workers and they are permitted to use both LAN and WiFi.

As previously indicated, the arrow 2015 indicates that the second connection group 2016 DSD Workers—LAN & WiFi has been selected for display in the window 2017. Under the connection path name listing 2022 appears both LAN and WiFi connections that the connection group 2016 is permitted to use. As the window 2017 further shows each connection has been assigned its own set of privileges. In other words, a rule has been defined for each connection that defines when that connection may be used. To show this, the window 2017 has further listings for start time 2026, end time 2027, and time zone 2028. The LAN connection type 2030 is only permitted to be used between 12 am and 12 pm W Europe standard time. The Wi-Fi connection type 2040 is likewise limited to for use during these same times.

By creating various connection groups with different connection paths and assigned processes it is possible to establish different communication rules to meet the needs of different groups of device users. Each time a user modifies the parameters of a connection path or its assigned processes the user is modifying the rules that will be used by the client to manage mobile communications. Each device user will have his device provisioned with the communications rules specified by the connection group to which their submitted system code is assigned.

Figure 22:
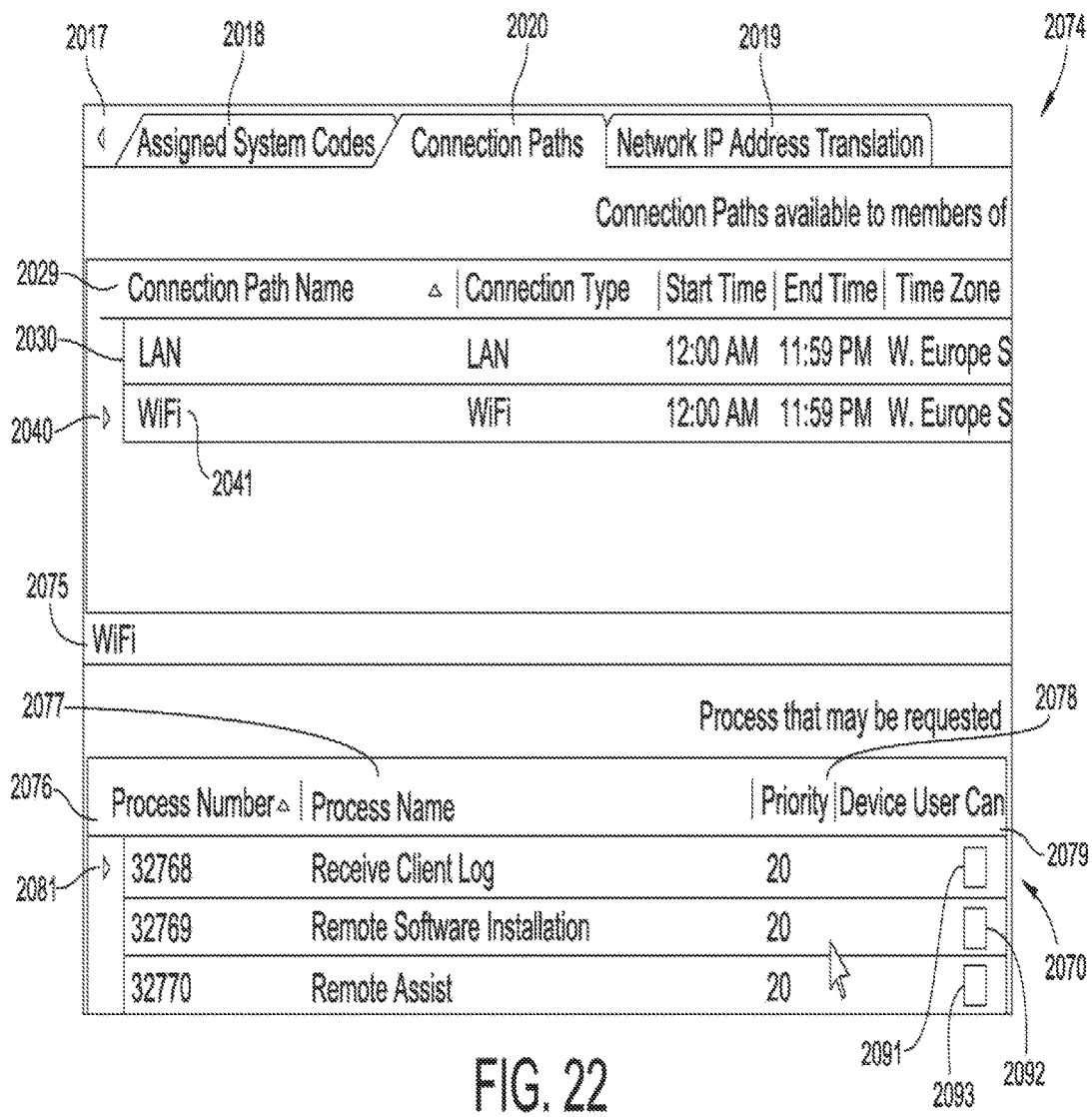

FIG. 22 shows a window 2074 that may appear on a display (not shown) of the system manager (16 in FIG. 1) illustrating the management by the system manager of communications between mobile devices and host systems (1 in FIG. 1) by connection paths. Inside window 2074 appears a window 2017 which in FIG. 21 is in some respects similar to the window 2017 shown in FIG. 19 with two main differences. First, the window 2017 in FIG. 22 is displayed at the system manager (16 in FIG. 1) whereas the window 2017 in FIG. 19 is displayed at the mobile computer. Second, as a system manager-level window, window 2017 contains settings that may be edited by the administrator of the system (5 in FIG. 1) unlike the illustrated window 2017 in FIG. 19 which is readable only. The arrow 2040 in FIG. 21 indicates that the Wi-Fi connection path 2041 has been selected for display in a window 2070 appearing inside of the window 2074.

Under a process number listing 2076 appears a listing of three process numbers 32768, 32769, and 32770. Under a process name listing 2077 appears a listing of three process names that are associated with the foregoing process number. More specifically, process the process name "Receive Skynax Client Log" is associated with process number 32768; the process name "Remote Software Installation" is associated with process number 32769; and the process name "Remote Assist" is associated with process number 32770. Under a priority setting 2078 appears a listing of three priority settings which are all set to priority. Under a device priority setting listing 2079 appears three priority settings 2091, 2092, 2093 associated with each of the three process numbers. Each priority setting may be checked by the manager to allow a device user to change the priority of these priority numbers. In FIG. 21, the priority settings are shown unmarked so that the window 2017 displayed on the mobile computer (20 in FIG. 1) is not editable as previously discussed. However, if any or more of these priority settings is marked, then the priority of those settings may be altered by the user at the device level. This illustrative example demonstrates the ease with which the manager may manage the network. By simple setting or unsetting of rules that have been defined for the network, the manager is able to easily add or modify rules that are applicable to mobile computers operating in the network.

To allow manual selection of connection paths the administrator must mark the associated check box in the Device User Can Change Priority field that is visible in the list of processes that may be requested through each connection path in the Connection Paths tab. This lower pane tab can be found in the Connection Groups module of the system manager 16.

Connection Path Priorities

When a process is assigned to more than one connection path, the value entered in its priority field will determine the relative order in which the client will use each connection path when the given process is requested by the mobile business application.

The number entered for the connection path priority can be any positive integer value. Lower values may have higher priority (a value of "1" is the highest priority, likewise a priority value of "50" will have higher priority than a value of "100"). When assigning processes to a connection path the manager (16 in FIG. 1) automatically pre-assigns priority values which the administrator can later modify. The manager increments the priority value each time a process is assigned to an additional connection path thereby giving that connection path the lowest priority in the list of connection paths that may be used for the selected process. Thus, assigning processes to connection paths in the order that they are intended to be used by the client may allow the manager to quickly complete the setup of connection paths.

To allow easy changes to be made in connection path priorities, the manager may use non-consecutive priority values (for example, avoid using 1, 2, 3, 4 . . . or 20, 21, 22 . . . ). By using with reasonable increments (for example, 10,20,30,40 . . . ) the administrator will have the future flexibility of entering a new priority for a new connection path such that it can logically come between two existing connection path priority values, without having to first modify the priorities of existing connection paths.

Each process, identified by its unique process number, has its own priority numbering sequence across all connection paths. For this reason it is possible to see two different processes assigned to the same connection path, having the same priority value. The priority value is therefore significant for each process across all connection paths to which it is assigned but it has no meaning relative to the other processes assigned to any one connection path.

The manager enforces the rule that no two connection paths can have assigned to them a process with the same priority value (such a condition would otherwise result in an ambiguous connection path selection priority for the client and is therefore not allowed). This will however, not prevent the manager from assigning the same process to two or more connection paths using different priorities and/or overlapping valid time periods for their use.

Assigning Processes to Connection Paths

Every process that can be requested from the mobile computer (20 in FIG. 10 must be assigned to a connection path (64 in FIG. 1). All processes not assigned to a connection path will be unreachable. Therefore, a process must be assigned to a server (12 in FIG. 1), its respective plug-in (26 in FIG. 1) properties must be configured appropriately and the process must be assigned to a connection path in order for that process to be callable from the mobile computer (20 in FIG. 1). The connection path to which the process is assigned must be one of the types of network connections that are supported by the mobile computer from which the process may be requested. (For example, if the process is assigned to a GPRS based connection path then the user's device must have a supported GPRS adapter, otherwise the client (43 in FIG. 1) will determine that no connection path is presently available for the requested process.)

Figure 23:
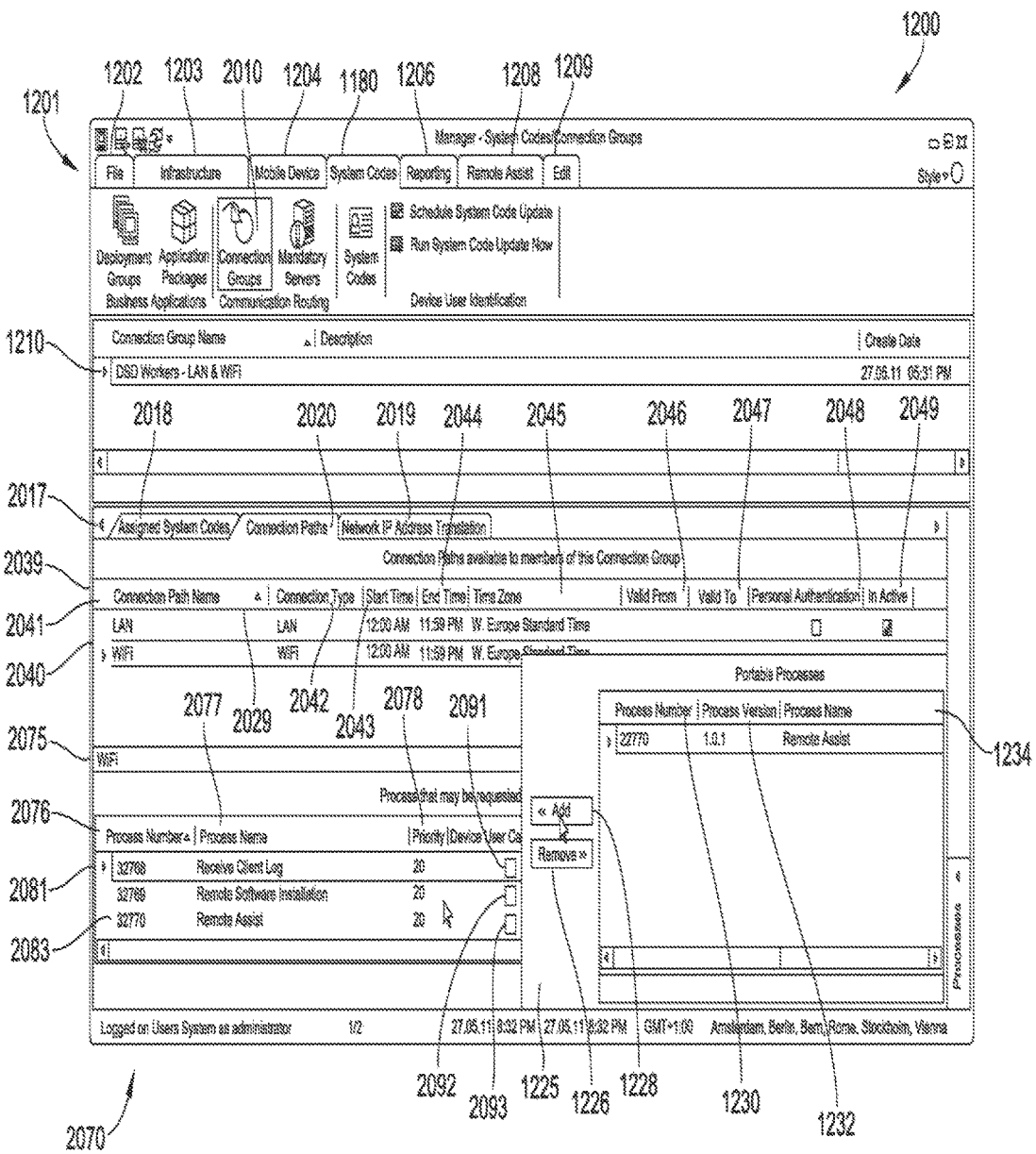

The assignment of processes to connections by a manager (16 in FIG. 1) is shown in FIG. 22. FIG. 22 shows a window 1200 which displays a toolbar 1201 that allows the user to display files using tab 1201, infrastructure using tab 1203, mobile devices under tab 1204, system codes under tab 1180, reporting under tab 1206, remote assist functions under tab 1208, and edit functions under tab 1209. In FIG. 23, the tool bar 1180 for system codes is activated along with tab 2020 to show connection paths. A window 2017 is displayed having a tab 2041 for connection path name, a tab 2042 for connection type, a tab 2043 for start time, a tab for end time 2044, a tab 245 for tune zone, a tab 2046 for start time for validity, a tab 2047 for end time for validity, a tab 2048 for external authentication, and a tab 2049 indicating whether the rule is active. Window 2017 in HG. 22 is in some respects similar to the window 2017 shown in FIG. 19 with two main differences. First, the window 2017 in FIG. 22 is displayed at the system manager (16 in FIG. 1) whereas the window 2017 in FIG. 19 is displayed at the mobile computer. Second, as a system manager-level window, window 2017 contains settings that may be edited by the administrator of the system (5 in FIG. 1) unlike the illustrated window 2017 in HG. 19 which is readable only. Some of the settings that window 2017 in FIG. 22 provides the manager (16 in FIG. 1) include settings start time (tab 2046), end time (2047), authentication (tab 2048), and indication of the rule being active (tab 2049). In FIG. 22, activity tab 2049 is shown set for "active" which is why connection paths LAN 2039 and WiFi 2040 appear on the display 2000 of the mobile computer (20 in FIG. 1) for the client (43 in FIG. 1) to manage. As previously discussed, the tabs 2091, 2092, and 2093 appearing in window 2075 provide settings for the manager to use in allowing a user to change the priority of a process level at the client level. In addition, a pop-up window 1225 that was activated by clicking on process number 2083 shows buttons 1226 and 1228 for adding and removing, respectively, process numbers to the system (5 in FIG. 1). These are but a few illustrate of many rules that the manager has available to him from the disclosed system for the purpose of managing the operation of mobile computers (20 in FIG. 1) in computing system (5 in FIG. 1).

When the manager performs an initial configuration of connection paths in a new system, it is preferable to begin by assigning all processes to all connection paths. Using this approach assures that all processes are callable through all network connections which will facilitate the initial testing and piloting of the system (5 in FIG. 2). After confirming that everything is working correctly, the administrator can begin to remove from each connection path only those processes that the administrator explicitly want to exclude from using the selected type of network connection.

Each mobile computer 20 obtains only those communication rules that are relevant to the connection group of which its submitted system code is a member. Therefore, if a user enters a new system code on his device, and this System Code belongs to a different connection group with different communication rules, those rules are unknown to the client (43 in FIG. 2) and cannot be applied until they are updated on the device. These rules will be updated on the device the first time the client connects to the server (12 in FIG. 2). Therefore, if device users belonging to different connection groups may swap devices without requiring any communications before starting their work, it is advisable to assign all processes used by each connection group to the other group as well, thereby assuring that both mobile business applications will be able to call their required processes regardless of the present device user.

Communication Rules Taking Effect

Figure 24:
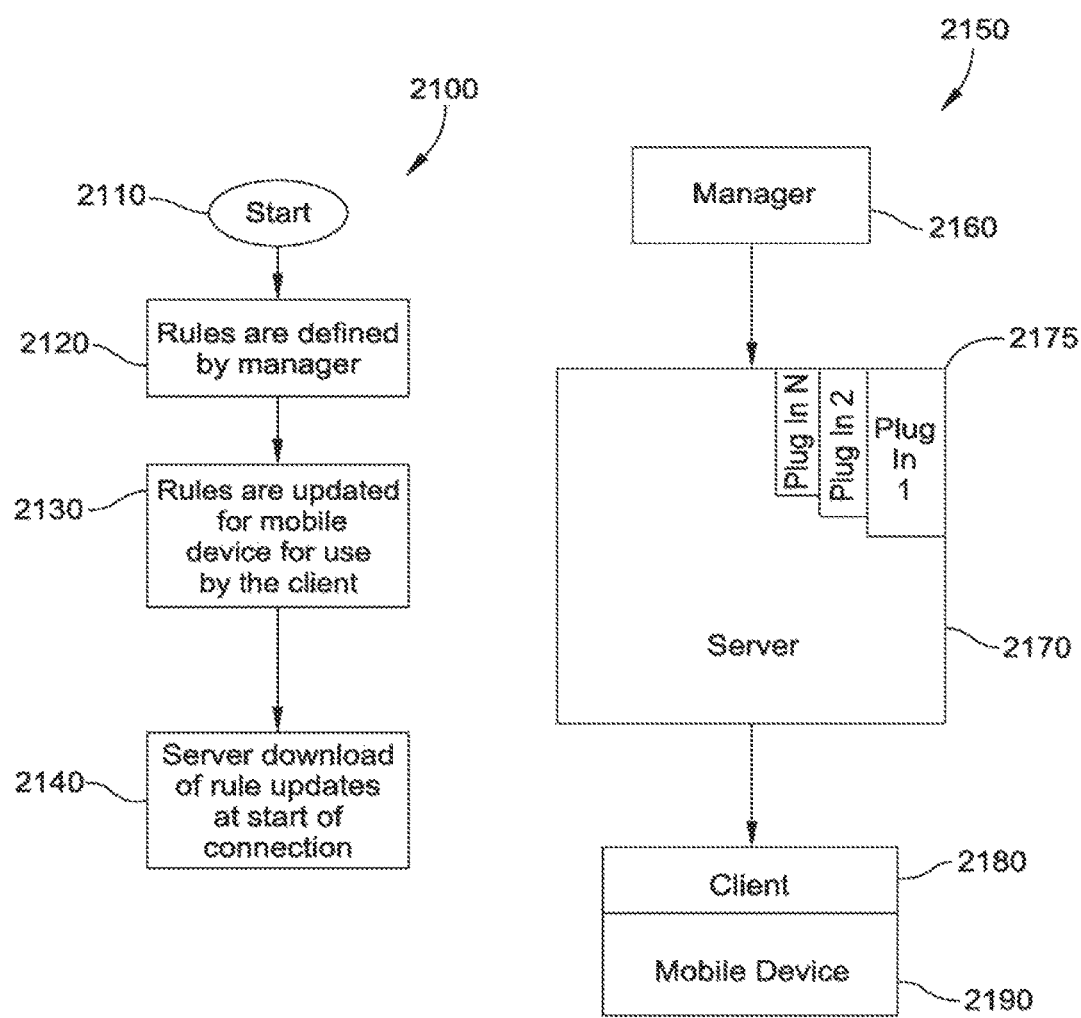
FIG. 24 shows an embodiment of a functional diagram and a process for updating connection rules onto a client according to the present invention.

FIG. 24 shows a functional diagram 2150 and a process 2100 for updating connection rules on a client 2180. The communication rules are defined centrally in the manager 2160 and must be updated on a mobile device 2180 before the client on that device can interpret these rules and modify its communication management behavior accordingly. The updates to the rules that are made by the manager appear in the plug ins 2175 residing on a server 2170. Communication rules are automatically updated on the device 2190 as needed, by a system plug-in, each time the client connects to a server 2170. According to the process 2100, at step 2120 the manager defines the rules. At step 2130, the rules are uploaded on the mobile device for use by the client. In step 2140, the server downloads the updates at the start of a connection between a client and the servers. In this process, each device obtains those communication rules that relate to the connection group of which the submitted System Code is a member.

From the foregoing description, it is seen that rules are updated on the remote mobile device for use by the client. Rules are not updated on the plug-in. The plug-in is a program that is loaded centrally into the system, and can be assigned to run on any number of the system's geographically distributed servers.

A Summary of Connection Path Processing

Figure 25:
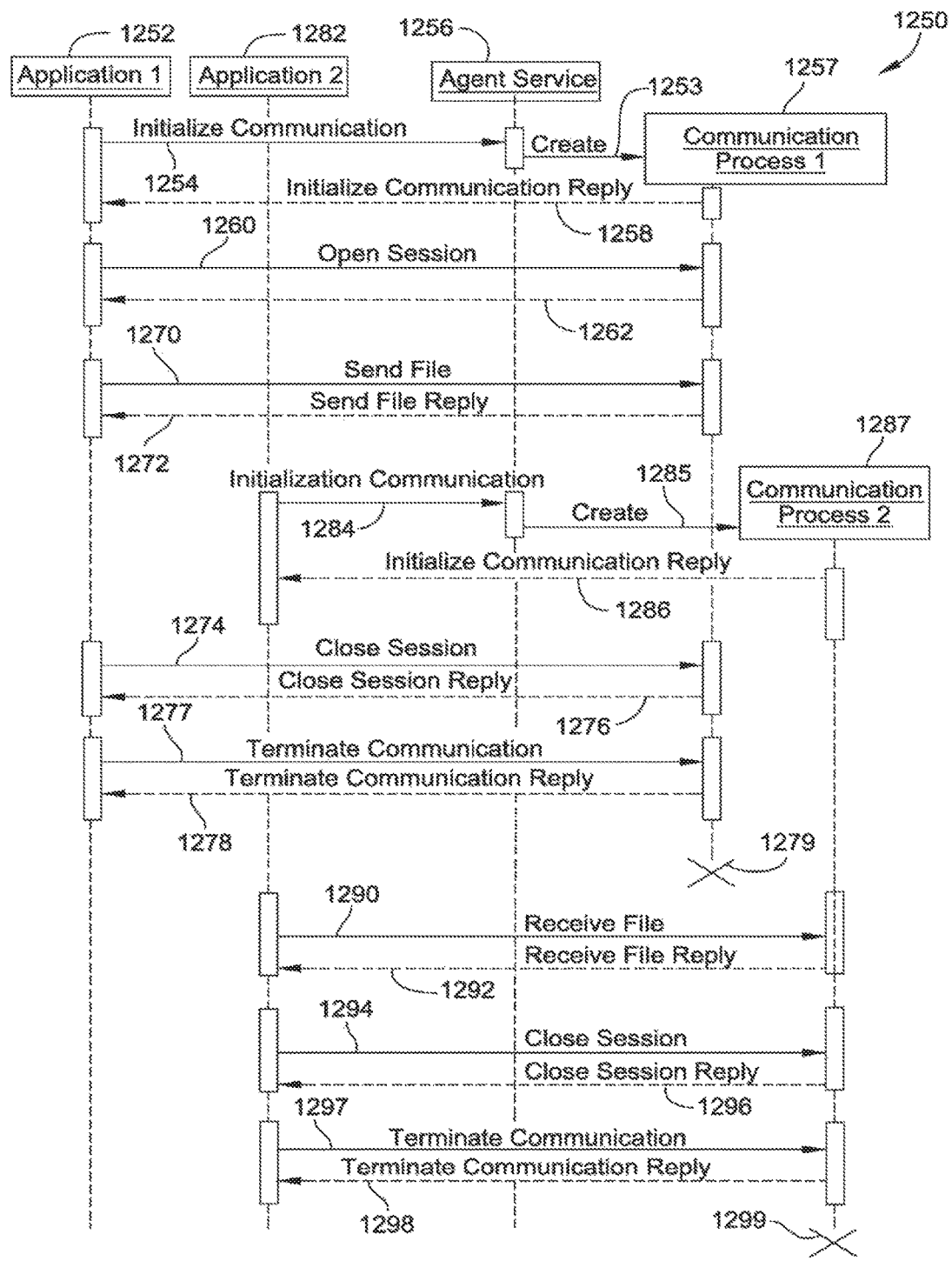
FIG. 25 shows an illustrative embodiment of the system setup and management of connection paths according to the present disclosure.

FIG. 25 shows in greater detail the system setup and management of connection paths. FIG. 5 illustrates aspects of establishing communications within a computing system. More specifically, FIG. 5 illustrates a timing diagram for establishing communications between various mobile applications 1252, 1282 and the servers (12 in FIG. 1) of a computing system (5 in FIG. 1). FIG. 5 shows a server 12 and a gateway (14 in FIG. 1) performing certain actions in conjunction with two mobile applications 1252, 1282 via a single data service 1256 (of a client 43 in FIG. 1) which is shared there between. Indeed, in some cases the mobile device (20 in FIG. 1) and/or the client thereof is configured so that all business applications 1252, 1282 on the mobile device must route all of their process requests through the data service. The computing system of embodiments can also be configured to help enforce the routing of all data exchange requests through the data service 1256 through, perhaps, refusing to establish communications from any other source.

FIG. 25 illustrates mobile application 1252 initiating a communication request by, for instance, requesting that a particular process be executed by the server. See reference 1254. The data service 1256 receives the request from the mobile application 1254 and, routes it (along with the applicable process number) to the gateway. More specifically, the data service 1256 determines which type of connection is appropriate (based on the process number and priority) and makes its own communication request over an appropriate connection. See reference 1253. The gateway subsequently selects a server for handling the process request. At reference 1258, the selected server returns a reply to the request to initialize communications by the mobile application 1252 to that mobile application over the connection selected by the data service 1256.

With communications thereby established, the mobile application 1252 opens a session with the server (with the aid of the data service 1256 in some embodiments). Sec reference 1260. Responsive thereto, the server sends a reply acknowledging the opening of the session as illustrated by reference 1262. When the mobile application 12252 is ready to receive the data from the pertinent process, it sends a request for a data exchange (and/or file) within that connection. See reference 1270. The server, responsive thereto, executes the requested process and sends the resulting data at reference 1272.

At some point it might be the case that mobile application 1282 requests that a process be initiated so that it too can exchange data with some server of the computing system. Reference 1284 illustrates such a process request. The data service 1256 again determines which type of connection is indicated by the requested process number and the priority of the connection type. It then establishes a connection of the indicated type over a connection of the indicated type and forwards the process request and number to the gateway. See reference 1285. The server selected by the gateway sends a reply acknowledging the request to the business application 1256 thereby establishing a connection (with, in some embodiments, the aid of the data service 1256). See reference 1286. Note that, if circumstances warrant it, the exchange with the mobile application 1256 could result in either a brand new connection or a new session within the connection already established with mobile application 1252 as further below. In the current scenario it can be assumed that a new session is created within the existing connection. That is, the existing connection is of a type suitable for the process requested by mobile application 1282. However, it could also be the case that the data exchange with mobile application 1282 occurs by way of an other session even though this is not illustrated.

With continuing reference to FIG. 25, at reference 1274, the mobile application 1252 could close its session with the server. Reference 1276 illustrates the server sending a reply acknowledging the closure of the session. If all such sessions between mobile application 1252 and the server are closed, mobile application 1252 can send a message to the server indicating that communications are to be terminated with it. See reference 1277. At reference 1278 the server can acknowledge the termination of the communication with the mobile application 1252. Such an exchange ends the communications between the mobile application 1252 and the server in the current scenario. But the ending of the session with mobile application 1252 advantageously does not end the connection that exists between the data service 1256 since the data service, and not the mobile application is controlling that session on the client-side and so the control of that connection is in the hands of the data service and not the mobile application. This control enables more efficient use of connections between the network and the mobile device which leads to more efficiencies and better management of mobile devices on the network.

The other mobile application 1282, in the meantime, could have reached a condition in which its programming indicates the desirability of receiving a file from the server in which it is in communication. It therefore sends a message to the server indicating that the requested process should execute so that it can receive the file. See reference 1290. Responsive thereto, the server can send a reply (with, perhaps, the requested file) at reference 1292.

Furthermore, once the requested file is received (or the requested data exchange ends), the mobile application 1282 and the server can close the session through which they have exchanged that data. See references 1294 and 1296. If, moreover, all sessions over the connection between the mobile application 1282 and the server are thereby closed (and all other sessions on that connection are closed), the mobile application 1282 and the server can terminate communications and/or close that connection. See references 1297 and 1298.

In the previous illustrative example, the term "File" was used. It should be noted that the term "File" as used in this example does not need to be a file in the conventional sense of the term, but more generally speaking it is "Data". For example, the "Data" may be data that is transmitted between a host system and a mobile business application, through the disclosed system, that may only be kept in memory as an array and never actually take the form of a file in the classical sense. Hence, in more real time operations via HTTP, web services, etc., the disclosure is not limited to classical files being transmitted but more generally may include streaming data in a dialog between the mobile business application and host system, via the disclosed system.

System Plug-In Processes and Connection Paths

All process numbers starting with a specified process number, such as 32768, and higher may be reserved for use by plug-in processes of the system (5 in FIG. 1). These special processes are used to manage the exchange of configuration, status and operating information between the clients (43 in FIG. 1) and the servers (12 in FIG. 1). They do not handle the exchange of any business data.

In the reserved process number range, the process numbers 32768 to 65535 inclusive, for example, are illustrative system plug-in processes that may be assigned/unassigned to selected connection paths. Processes with a process number starting with 65536 and higher are System Plug-In process that may be automatically assigned to all connection paths; they can't be unassigned by the administrator) and their properties are also automatically configured (i.e., the properties used by these processes are not modifiable).

Some system plug-in processes may be unassigned from selected connection paths to allow the administrator to optimize specific communication scenarios. For example, by removing from a GPRS based connection path the System Plug-In process that handles the deployment of new business applications to devices, the administrator can prevent large application updates from taking place over GPRS, and instead allow them to be handled over other lower-cost, higher bandwidth network connections (such as LAN or Wi-Fi).

System plug-in processes perform key functions in the system (5 in FIG. 1) and for this reason they are automatically assigned to all new connection paths by default. It is desirable to assign the system plug-in processes to all connection paths, unless determined in specific communications scenarios that a given process negatively impacts communications performance or communications costs, and that this process can be unassigned from the selected connection path without causing other problems.

Routing Connections in Public and Private Networks

The system may be used to route connections in public and private networks. Details are provided in application Ser. No. 13/494,978 entitled "Communication Protocol and System for Network Communications" filed contemporaneously herewith which is incorporated herein by reference.

The Structure of Communications Connections

Each client 43 is capable of initiating one connection with one server 12 at a time. Each connection is established using one of the supported connectivity options that the mobile device is capable of using, such as GPRS, Wi-Fi, LAN, etc. On the receiving side, each server 12 is capable of handling many connections from many different clients 43 at the same time. The maximum number of connections that can be handled by any given server 12 is based primarily on the characteristics of the computer on which the server 12 is installed and the number and complexity of plug-in processes assigned to that server. The server 12 assigns each received connection a virtual identification number called a "Channel ID" which is used to identify that specific connection when providing information about it to a server 12 Console application. Therefore, a "channel" in the server 12 console application is equivalent to a "connection" that is formed between a client 43 and the monitored server.

Working with TCP/UDP Ports

Figure 26:
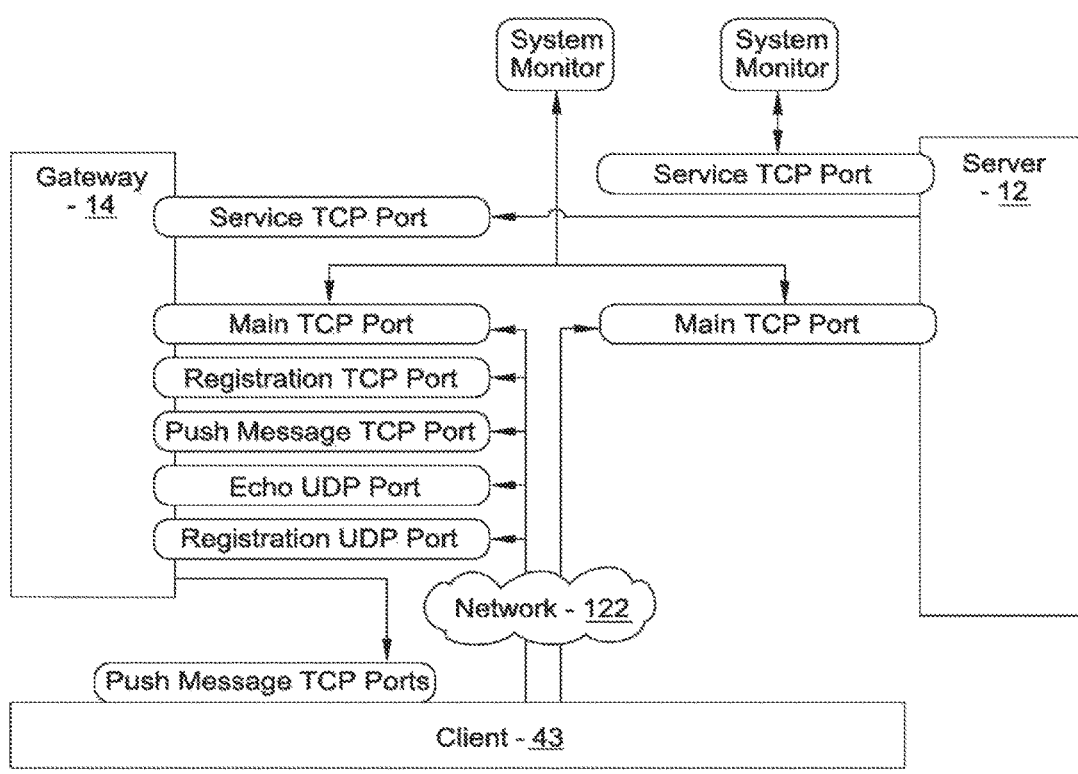
FIG. 26 shows an embodiment of the relationship between the TCP/UDP ports and the client according to the present invention.

The system illustratively uses its own range of TCP and UDP Ports for handling communications. See FIG. 26. Each service within the system uses its own TCP/UDP Port and protocol to provide specific data exchange services. To facilitate the implementation of the system with various networks, the system allows most TCP Ports that it uses to be redefined. However, this may also be implemented in other ways including as an HTTP or HTTPS encapsulated data stream to one or more administrator defined TCP Ports. Particulars are provided in application Ser. No. 13/494,978 entitled "Communication Protocol and System for Network Communications" filed contemporaneously herewith which is incorporated herein by reference.

Figure 27:
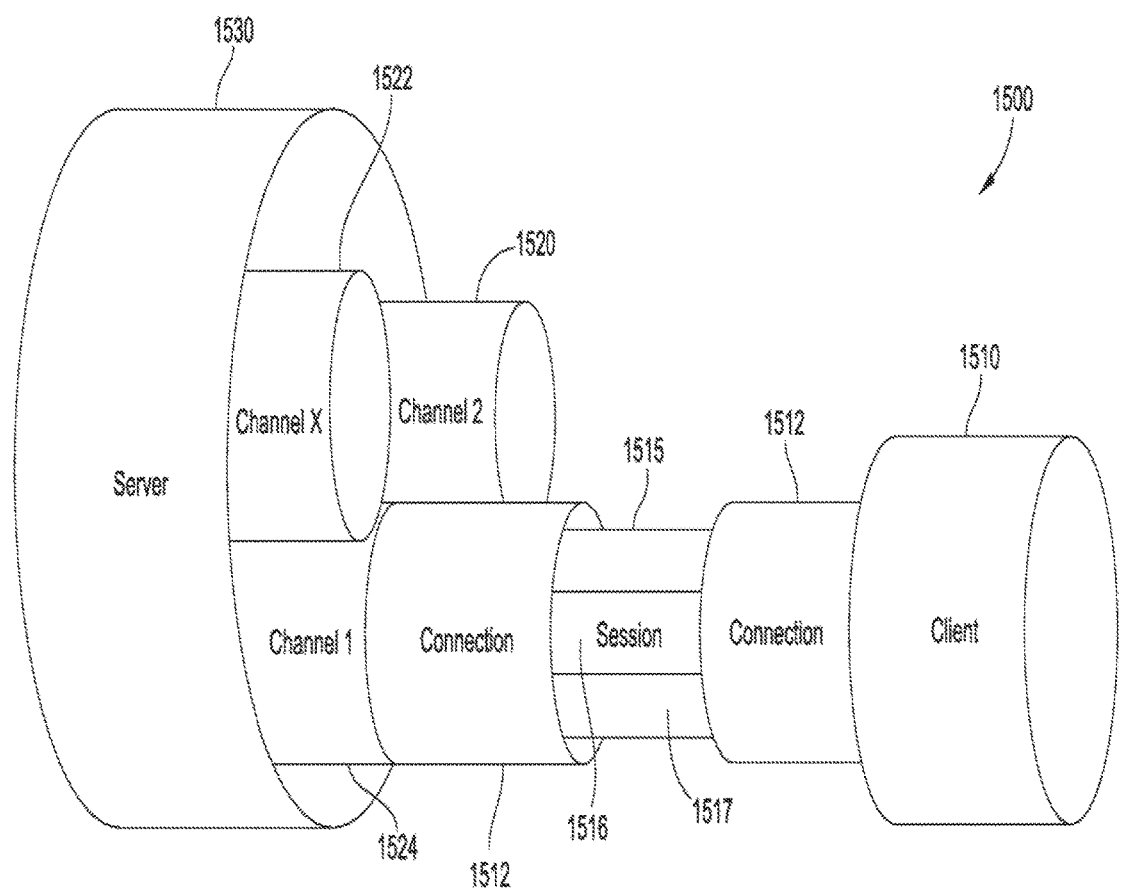
FIG. 27 shows an embodiment of a structure of communication connections according to the present disclosure.

Each connection is further divided into sessions—each connection may contain one or more sessions. See FIG. 27. Particulars are provided in application Ser. No. 13/494,978 entitled "Communication Protocol and System for Network Communications" filed contemporaneously herewith which is incorporated herein by reference.

Mobile Business Applications

The communication protocol and system disclosed enables network communications between the data service (41 in FIG. 2) residing on the client (43 in FIG. 2) that provides network communications between a plurality of mobile applications (44 in FIG. 1) on the mobile computer (20 in FIG. 2) and the network (1 in FIG. 2) for the process number (50 in FIG. 2). The shared data service process takes care of details such as initiating network communications, opening a network connection to a gateway server, determining the server with which it will communicate, etc. The network takes care of managing each data service process in the network and the process numbers requested by the business applications through the shared data service. In one example, the protocol includes a data field in the message architecture that identifies the message as coming from the shared data service in network communications between the plurality of mobile applications on a source and the network for the process number.

In another embodiment, the protocol assigns network communications between a plurality of mobile applications on mobile computing device and a server through a shared data service from a gateway to a server based on the capability of managing the requested process. In some embodiments, the protocol triggers active fail-over to inactivate one or more servers that may manage the requested process from the business applications through the shared service that have not responded to a poll and reactive the non-responding polls on notifications. In some embodiments, the disclosure provides a protocol and system for establishing network communications between a plurality of mobile applications on a mobile computing device and a server based on permissions that are allowed for the requested process.

Process Load Balancing. Each gateway (14 in FIG. 2) continuously monitors the status and processing load of all servers running in a system. Active Fail-Over. In the event that any server (12 in FIG. 2) should fail to respond to the special server monitoring service of a gateway (14 in FIG. 2) (such as may happen when there is a physical hardware failure of the server's computer or the server's computer is inadvertently shut down) the gateway will automatically trigger active fail-over functionality which will inactivate the problematic server in the list of available servers and redirect all subsequent client process requests to other servers capable of managing the specific processes. CheckPoint Restart on Downloads In the event that during the download of a file to the mobile computing device (20 in FIG. 2), the connection to the mobile computing device is dropped, for any reason, before the download can be completed, then when a connection is reestablished and the same file is requested again, the download will continue at the point of previous interruption. Particulars are provided in application Ser. No. 13/494,978 entitled "Communication Protocol and System for Network Communications" filed contemporaneously herewith which is incorporated herein by reference,. Installing the database 15

The database 15 is always installed on only one computer, typically the computer on which the Microsoft SQL Server application is running. In a single computer installation where the computer is also running the SQL Server, the database 15 is installed directly on this computer. If, however, the single computer installation does not include an SQL Server running on the same computer but instead uses an SQL Server running on another computer in the network, then the database 15 must first be installed on that remote SQL Server. The gateway 14 and server 12 must always be able to access the database 15 from each computer on which they are installed.

Installing the Gateway 14 and Server

The gateway 14 and server 12 are standalone applications that run as a service on the operating system of the computer. These applications are cooperative but not dependent. The gateway 14 and server 12 share and exchange information with each other whenever an instance of either application is available within a system, however neither application fails to operate because an instance of the other application would not be available. This cooperative but non-dependent nature of the gateway 14 and server 12 allows implementation of a system topology that will provide the performance and fault-tolerance you desire.

Within a single system there can exist many gateways 14 and servers 12. However, each system must have its own gateway(s). This however, does not preclude having more than one system, perhaps using different topologies, running within one computer network.

Inside a Device Driver

Each Device Driver is published as a collection of two files both of which are required to successfully add or replace a Device Driver in a system. To install a Device Driver both of these files must be located in the same directory folder and this folder must be accessible from within the system manager 16. (The first file in a Device Driver installation set has a LFI or LFX extension and is the information file used by the system manager 16 to determine how the Device Driver should be installed. The second file has the same name as the information file, however with a DLP extension. The DLP file is a compressed package that contains the files needed to install the Device Driver on a primary device.)

Device Drivers may have an information file with either an LFI extension or an LFX extension. Both files contain the same information and serve the same purpose however, each is stored in a different format. The newer LFX files use an XML format that provides faster installation processing whenever a new Device Driver is being added to a system.

Device Drivers classify all the types of devices they support as either "primary" or "subordinate." A primary device is the central computing device on which software is executed. Primary devices include any of these types of devices: industrial handheld computers, PDAs, tablet computers, notebook computers and even smart phones. Subordinate devices are those types of devices that do not directly execute software but are installed into or attached to the primary device to extend its capabilities. Subordinate types of devices include wired and wireless network adapters, modems, bar-code scanners, RFID readers, mobile printers, and similar peripherals, accessories and primary device options.

Device Driver Packages

A device driver package contains all the files that comprise a specific version of a device driver. Each device driver supports a specific type of device hardware, exposes device properties that allow that type of device to be configured in the system manager 16 and enables client 43 control of the device. This package will automatically be deployed to each device set in your system where at least one of the types of devices used in the device set matches the type of device supported by the Device Driver.

Business Application Packages

A Business Application package contains the files that will be deployed to a device set to provision it with the mobile business application intended for the given device user. These packages are typically created and customized for the specific mobile business application installation requirements of each customer.

Unlike the client 43 and device driver packages, business application packages can be classified as being either a "base package" or an "update package." A base package will contain all the files needed to install a given version of the mobile business application. Update packages typically contain only the files that need to be changed or added to the current installation of a mobile business application to update it Using update packages for your base package allows you to limit the amount of data that needs to be transmitted to all your device sets each time you update the mobile business application. Whenever the primary device in a device set is being fully re-provisioned it will have deployed to it the base package and all update packages. If you delete the base package then all its update packages shall also be deleted. Device sets will then be re-provisioned with whatever new base package you add in the place of the deleted one.

The system uses base package and update packages to manage the progressive deployment of business application software updates to mobile devices. The disclosed methods and apparatus provide a reliable and highly scalable mobile communications system. This system may be integrated with security, data management, device management, and extensible business application support features to effectively deploy and manage mobile computing systems. This is made possible through, among other things, use of a flexible, configurable, and scalable software architecture.

The system is capable of managing large numbers of mobile computing devices over a heterogeneous communications network. This is achieved by, among other things, a level of abstraction from the specifics and peculiarities of various mobile devices, networks, and information technology infrastructures. The abstraction is used with respect to specific mobile business applications, and allows the system to achieve a goal of providing a standard software platform (non-customized but open to organizational specific extensions) which can be used in a variety of mobile computing system implementations.

The system and method allows improved management of communications. With conventional systems, typically each mobile application would independently, only for its own use, establish a communications session, through any network that was available, to any host system and the administrator has no way to monitor or manage what mobile applications are communicating from the device, with what server side resources, what data is being requested and submitted between the device/application and host system, who was the device user associated with the data exchange, how long the session took, through what network its being executed, etc. Using the disclosed system and method, any number of mobile business applications running on the same device (and running on any number of devices and device types) can exchange data in parallel with any number of host system resources. The disclosed system and method provides the unified system through which all these data exchanges take place (without restricting the content, formatting, type of data being transmitted or even restricting the dialog of the data exchange between the mobile application and the host system), while still controlling the integrity, security of the data, and providing the monitoring, auditability and manageability functions that mobile system administrators need.

Improved mobile communication flexibility and reliability, enhanced data transmission security, better mobile device management and mobile application support, extensive control over mobile data exchange transactions, comprehensive monitoring of all communications and data processing. In order for to provide an open, flexible, secure and extensible platform to manage large numbers of mobile computing devices over a heterogeneous communications network, a certain level of abstraction from the specifics and peculiarities of various mobile devices, networks, and information technology infrastructures is required. The same level of abstraction is used with respect to any specific mobile business application. This hardware and application specific abstraction allows to achieve the goal of providing a standard software platform (non-customized but open to organizational specific extensions) which can be used in all mobile computing system implementations.

The system and method disclosed enables improved mobile communication flexibility and reliability, enhanced data transmission security, better mobile device management and mobile application support, extensive control over mobile data exchange transactions, comprehensive monitoring of all communications and data processing. The provides for an open, flexible, secure and extensible platform to manage large numbers of mobile computing devices over a heterogeneous communications network. The system provides a standard software platform (non-customized but open to organizational specific extensions) which can be used in all mobile computing system implementations.

The system and method disclosed enables a reliable and highly scalable mobile communications system. This disclosure enables a system integrated with security, data management, device management, and extensible business application support features that organizations need to effectively deploy and manage mobile computing systems. The system makes possible the use of a flexible, configurable, and scalable architecture that allows organizations to configure and operate the system according to the size and complexity of their information technology (IT) environment and business requirements.

The system and method disclosed enables an open, flexible, secure and extensible platform to manage large numbers of mobile computing devices over a heterogeneous communications network. This is achieved by, among other things, allowing the specifics and peculiarities of various mobile devices, networks, and information technology infrastructures. The abstraction is used with respect to specific mobile business applications, and allows the system to achieve the goal of providing a standard software platform (non-customized but open to organizational specific extensions) which can be used in a variety of mobile computing system implementations.

It will be apparent to those skilled in the art that various modifications and variations can be made to the disclosed system and method. Other embodiments will be apparent to those skilled in the art from the consideration of the specification and practice of the disclosed system and method. It is intended that the specification and examples be considered as exemplary only, with a true scope being indicated by the following claims and their equivalents.

What is claimed is:

1. A system comprising:
a server connected to a computing device via a specific connection path on a network;
a plug-in residing on the server, the plug-in associated with a process number;
data files on the server associated with a business process being requested from the server, the data files configured for synchronizing the plug-in on the specific connection path to an application on the computing device;
wherein the process number identifies the requested business process; and
wherein the process number is identified in a request for the server to perform the business process, the request initiating data communication and the network assigning the request to the server having the plug-in that is associated with the process number.

2. The system of claim 1, wherein the plug-in receives and processes business data for the requested business process in accordance with programmed business data processing logic.

3. The system of claim 2, wherein the plug-in responds to the requested business process.

4. The system of claim 1, wherein the plug-in is associated with multiple process numbers, each process number being associated with a different business process.

5. The system of claim 1, comprising a system manager configured for applying rules to the process number associated with the plug-in, wherein the system is configured for:
routing an incoming data request to a server having a plug-in associated with a process number identified in the incoming data request; and
establishing a connection between a computing device that sent the incoming data request and the server having the plug-in associated with the process number identified in the incoming data request based on the rules applied by the system manager.

6. The system of claim 1, comprising a gateway for authenticating a valid connection to a mobile computer and polling servers to determine which server has a plug-in capable of managing a process requested by the mobile computer.

7. The system of claim 1, comprising a server console for providing a visual monitor of communications processing taking place on the server.

8. The system of claim 1, wherein the system provides a computing device with an option to authenticate against multiple servers on each of which a plug-in associated with a process requested by the computing device resides.

9. The system of claim 1, comprising a gateway supporting push-messaging based on-demand communications.

10. The system of claim 1, wherein the server creates as many independent, virtual clines of a plug-in as are needed to manage incoming requests.

11. A system, comprising:
a server on a network;
a plug-in residing on the server, wherein the plug-in is associated with a process number, wherein the plug-in manages data communication over the network between a plurality of applications and the plug-in, wherein the process number identifies a business process requested by a client, wherein the process number is identified in a request received from any application from amongst the plurality of applications, wherein the request is for initiating the data communication and the network assigns the request to a server comprising the plug-in associated with the process number; and
a database of predetermined rules for establishing network communications between the applications and the plug-in, the predetermined rules comprising at least one of (i) a set of data on the properties corresponding to computing devices processing the plurality of applications that are permitted to use the plug-in within the network and (ii) a set of data on the priorities corresponding to the computing devices and associated permissions to use the plug-in is to follow when establishing network communication.

12. The system of claim 11, wherein the plug-in receives and processes business data for the requested business process in accordance with programmed business data processing logic.

13. The system of claim 12, wherein the plug-in responds to the requested business process.

14. The system of claim 11, wherein the plug-in is associated with multiple process numbers, each process number being associated with a different business process.

15. The system of claim 11, comprising a system manager configured for applying rules to the process number associated with the plug-in, wherein the system is configured for:
routing an incoming data request to a server having a plug-in associated with a process number identified in the incoming data request; and
establishing a connection between a computing device that sent the incoming data request and the server having the plug-in associated with the process number identified in the incoming data request based on the rules applied by the system manager.

16. The system of claim 11, comprising a gateway for authenticating a valid connection to a mobile computer and polling servers to determine which server has a plug-in capable of managing a process requested by the mobile computer.

17. The system of claim 11, comprising a server console for providing a visual monitor of communications processing taking place on the server.

18. The system of claim 11, wherein the system provides a computing device with an option to authenticate against multiple servers on each of which a plug-in associated with a process requested by the computing device resides.

19. The system of claim 11, comprising a gateway supporting push-messaging based on-demand communications.

20. The system of claim 11, wherein the server creates as many independent, virtual clines of a plug-in as are needed to manage incoming requests.

21. A system, comprising:
a server on a network;
a plug-in residing on the server, wherein the plug-in is associated with a process number, wherein the plug-in manages data communication over the network between a plurality of applications and the plug-in, wherein the process number identifies a business process requested by a client, wherein the process number is identified in a request received from any application from amongst the plurality of applications, wherein the request is for initiating the data communication and the network assigns the request to a server comprising the plug-in associated with the process number;
data files on the server associated with a business process being requested from the server, the data files configured for synchronizing the plug-in on the specific connection path to an application on the computing device; and a database of predetermined rules for establishing network communications between the applications and the plug-in, the predetermined rules comprising at least one of (i) a set of data on the properties corresponding to computing devices processing the plurality of applications that are permitted to use the plug-in within the network and (ii) a set of data on the priorities corresponding to the computing devices and associated permissions to use the plug-in is to follow when establishing network communication;

wherein the set of data on the priorities corresponding to the computing devices and associated permissions to use the plug-in is to follow when establishing network communication comprises first set of devices having a primary priority and a second set of devices having a secondary priority.

22. The system of claim 21, wherein the plug-in receives and processes business data for the requested business process in accordance with programmed business data processing logic.

23. The system of claim 22, wherein the plug-in responds to the requested business process.

24. The system of claim 21, wherein the plug-in is associated with multiple process numbers, each process number being associated with a different business process.

25. The system of claim 21, comprising a system manager configured for applying rules to the process number associated with the plug-in, wherein the system is configured for:

routing an incoming data request to a server having a plug-in associated with a process number identified in the incoming data request; and establishing a connection between a computing device that sent the incoming data request and the server having the plug-in associated with the process number identified in the incoming data request based on the rules applied by the system manager.

26. The system of claim 21, comprising a gateway for authenticating a valid connection to a mobile computer and polling servers to determine which server has a plug-in capable of managing a process requested by the mobile computer.

27. The system of claim 21, comprising a server console for providing a visual monitor of communications processing taking place on the server.

28. The system of claim 21, wherein the system provides a computing device with an option to authenticate against multiple servers on each of which a plug-in associated with a process requested by the computing device resides.

29. The system of claim 21, comprising a gateway supporting push-messaging based on-demand communications.

30. The system of claim 21, wherein the server creates as many independent, virtual clines of a plug-in as are needed to manage incoming requests.

* * * * *